United States Patent
Qiao

(10) Patent No.: US 12,401,389 B2
(45) Date of Patent: Aug. 26, 2025

(54) FREQUENCY HOPPING METHOD AND APPARATUS, AND USER EQUIPMENT, BASE STATION AND STORAGE MEDIUM

(71) Applicant: Beijing Xiaomi Mobile Software Co., Ltd., Beijing (CN)

(72) Inventor: Xuemei Qiao, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 82 days.

(21) Appl. No.: 18/576,050

(22) PCT Filed: Jul. 8, 2021

(86) PCT No.: PCT/CN2021/105342
§ 371 (c)(1),
(2) Date: Jan. 2, 2024

(87) PCT Pub. No.: WO2023/279348
PCT Pub. Date: Jan. 12, 2023

(65) Prior Publication Data
US 2024/0313822 A1  Sep. 19, 2024

(51) Int. Cl.
H04W 72/0446 (2023.01)
H04B 1/713 (2011.01)

(52) U.S. Cl.
CPC ........ *H04B 1/713* (2013.01); *H04W 72/0446* (2013.01)

(58) Field of Classification Search
CPC .... H04B 1/713; H04B 1/7143; H04B 7/0626; H04B 7/0404; H04B 7/0695; H04B 7/024; H04B 7/0456; H04B 7/0639; H04L 5/0053; H04L 5/0012; H04L 1/08; H04L 5/0094; H04L 5/0044; H04L 5/0051; H04L 5/0048; H04L 5/0055; H04L 5/001;
(Continued)

(56) References Cited

U.S. PATENT DOCUMENTS

2018/0279296 A1* 9/2018 Hosseini ............... H04L 5/0053
2018/0323932 A1* 11/2018 Huang ................... H04L 5/0012
(Continued)

FOREIGN PATENT DOCUMENTS

WO  2019097658 A1  5/2019

OTHER PUBLICATIONS

"Joint Channel Estimation for PUSCH", Ericsson, 3GPP TSG-RAN WG1 Meeting #105-e, R1-2105654, e-Meeting, May 10-27, 2021, 18 pages.
(Continued)

*Primary Examiner* — Eva Y Puente
(74) *Attorney, Agent, or Firm* — Finnegan, Henderson,, Farabow, Garrett & Dunner, L.L.P.

(57) ABSTRACT

A frequency hopping method is performed by a user equipment (UE), and includes: obtaining an instruction configured by a base station for instructing to perform intra-slot frequency hopping; obtaining symbol resources allocated by the base station for data transmission in a special slot; performing intra-slot frequency hopping on an uplink slot and determining available symbols in the special slot; and performing intra-slot frequency hopping on the available symbols in the symbol resources, or not performing intra-slot frequency hopping on the special slot.

20 Claims, 29 Drawing Sheets obtaining an instruction configured by a base station for instructing to perform intra-slot frequency hopping, and obtaining symbol resources allocated by the base station for data transmission in a special slot — 101 performing intra-slot frequency hopping on an uplink slot, and determining available symbols in the special slot; and performing intra-slot frequency hopping on the available symbols in the symbol resources, or not performing intra-slot frequency hopping on the special slot — 102

(58) Field of Classification Search
CPC ............. H04W 72/0446; H04W 72/23; H04W 72/1268; H04W 72/21; H04W 72/0453; H04W 72/232; H04W 72/04; H04W 72/231

See application file for complete search history.

(56) References Cited

U.S. PATENT DOCUMENTS

| | | | |
|---|---|---|---|
| 2022/0311472 A1* | 9/2022 | Ly | H04B 1/7143 |
| 2022/0369331 A1* | 11/2022 | Berger | H04B 1/713 |
| 2023/0291523 A1* | 9/2023 | Hasegawa | H04L 5/0094 |

OTHER PUBLICATIONS

Notice of Reasons for Refusal issued by the Japanese Patent Office on Feb. 4, 2025, in corresponding Application No. JP 2024-500404, 8 pages.

* cited by examiner

FREQUENCY HOPPING METHOD AND APPARATUS, AND USER EQUIPMENT, BASE STATION AND STORAGE MEDIUM

CROSS-REFERENCE TO RELATED APPLICATION

This application is a national phase of International Application No. PCT/CN2021/105342, filed on Jul. 8, 2021, the entire content of which is incorporated herein by reference.

TECHNICAL FIELD

The disclosure relates to the field of communication technologies, and more particularly, to a frequency hopping method, a frequency hopping apparatus, a user equipment (UE), a base station, and a storage medium.

BACKGROUND

In a communication system, when there are few uplink slot resources, uplink symbol resources in a special slot allocated by a base station are usually used for uplink transmission block processing over multi-slots transmission (TBoMS), to reduce the transmission delay and improve the coding efficiency. Moreover, when intra-slot frequency hopping is enabled for the uplink TBoMS transmission on the regular slot, intra-slot frequency hopping also needs to be enabled for the uplink TBoMS transmission on the special slot. When intra-slot frequency hopping is enabled for the uplink TBoMS transmission on the special slot, it needs to determine a symbol position of each hop in the special slot.

SUMMARY

A frequency hopping method provided in an aspect of the disclosure is performed by a user equipment (UE), including: obtaining an instruction configured by a base station for instructing to perform intra-slot frequency hopping; obtaining symbol resources allocated by the base station for data transmission in a special slot; performing intra-slot frequency hopping on an uplink slot and determining available symbols in the special slot; and performing intra-slot frequency hopping on the available symbols in the symbol resources, or not performing intra-slot frequency hopping on the special slot.

A frequency hopping method provided in another aspect of the disclosure is performed by a base station, including: determining to perform intra-slot frequency hopping, and configuring an instruction for instructing to perform intra-slot frequency hopping to a UE; determining a parameter, and determining symbol resources for data transmission in a special slot according to the parameter; performing intra-slot frequency hopping on an uplink slot, and determining available symbols in the special slot; performing intra-slot frequency hopping on the available symbols in the symbol resources, or not performing intra-slot frequency hopping on the special slot.

A communication device provided in still another aspect of the disclosure includes a processor and a memory. The memory stores a computer program and the processor executes the computer program stored in the memory, so that the device performs the method as described in the aspect above.

BRIEF DESCRIPTION OF THE DRAWINGS

The above and/or additional aspects and advantages of the disclosure will become apparent and understandable from the following description of the embodiments in conjunction with the accompanying drawings, in which.

DETAILED DESCRIPTION

Figure 1:
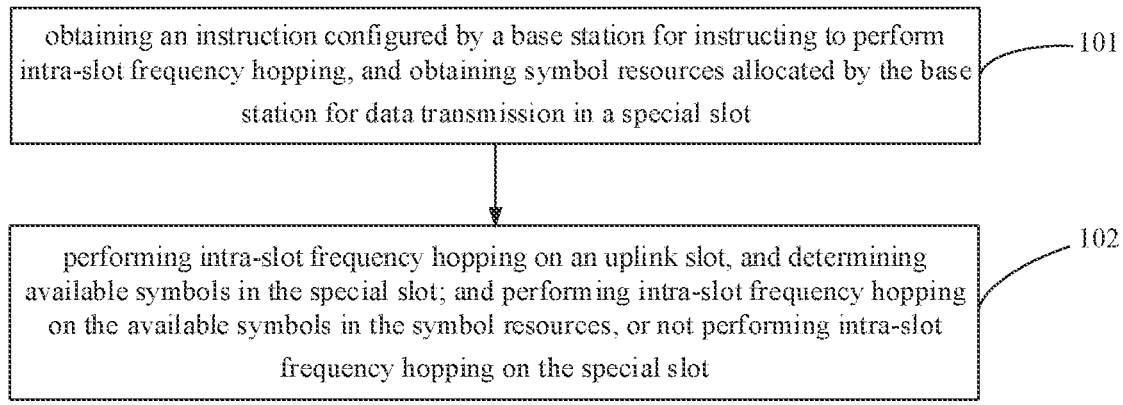
FIG. 1 is a schematic flowchart of a frequency hopping method according to some embodiments of the disclosure.

Reference will now be made in detail to some embodiments of the disclosure, examples of which are illustrated in the accompanying drawings. The following descriptions refer to the accompanying drawings in which the same numbers in different drawings represent the same or similar elements unless otherwise represented. The implementations set forth in the following descriptions of some embodiments do not represent all implementations consistent with embodiments of the disclosure. Instead, they are merely examples of apparatuses and methods consistent with aspects related to the embodiments of the disclosure as recited in the appended claims.

The terms used in the embodiments of the disclosure are only for the purpose of describing specific embodiments and are not intended to limit the embodiments of the disclosure. The singular forms of "a" and "the" used in the embodiments of the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in the embodiments of the disclosure to describe various information, the information should not be limited to these terms. These terms are only used to distinguish the same type of information from each other. For example, without departing from the scope of the embodiments of the disclosure, the first information may also be referred to as the second information, and similarly, the second information may also be referred to as the first information. Depending on the context, the word "if" as used herein may be interpreted as "when", "while" or "in response to determining".

In the related art, the symbol position of each hop in the special slot is made to be the same as the symbol position of each hop in the regular slot. However, under normal circumstances, some symbols at the top of the uplink symbol resources in the special slot may be unavailable (such as downlink symbol(s) or guard symbol(s) for uplink and downlink switching). Based on this, when the symbol position of each hop in the special slot is determined by the manner in the related art, the number of unavailable symbol(s) in the first hop in the special slot may be larger, which may cause the failure of the uplink TBoMS transmission on the first hop, resulting in the waste of resources.

The embodiments of the disclosure are described in detail below. Examples of the embodiments are illustrated in the accompanying drawings where the same or similar numbers throughout indicate the same or similar elements. The embodiments described below by reference to the accompanying drawings are illustrative and are intended to interpret the disclosure and are not to be construed as a limitation of the disclosure.

In a frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

The frequency hopping method, the frequency hopping apparatus, the UE, the base station, and the storage medium, provided in the disclosure, will be described in detail below with reference to the accompanying drawings.

FIG. 1 is a schematic flowchart of a frequency hopping method according to some embodiments of the disclosure. The method is performed by a UE. As illustrated in FIG. 1, the frequency hopping method may include the following steps.

Step 101, an instruction configured by a base station for instructing to perform intra-slot frequency hopping, is obtained, and symbol resources allocated by the base station for data transmission in a special slot, are obtained.

In some embodiments of the disclosure, the symbol resources allocated by the base station for data transmission in the special slot may be symbol resources for uplink transmission block processing over multi-slots transmission (TBoMS) in the special slot. In some embodiments of the disclosure, the symbol resources for uplink TBoMS may include a start symbol position S and a symbol length L, and the symbol resources for uplink TBoMS may be symbols with positions between [S, S+L−1] in the special slot.

It should be noted that, in some embodiments of the disclosure, when a physical uplink shared channel (PUSCH) mapping type is different, the start symbol position and the symbol length may also not the same.

In detail, in some embodiments of the disclosure, when the PUSCH mapping type is type A, the protocol stipulates that the start symbol position S should be the $0^{th}$ symbol position, that is, S=symbol #0, and the symbol length L may be between [4, 14], that is, L∈[4, 14] and 4⩽S+L⩽14. For example, assuming that the PUSCH mapping type is type A, the start symbol position S is symbol #0 and the symbol length may be 5, so that it may be determined that the symbol resources allocated by the base station for uplink TBoMS is: symbol #0~ symbol #5 in the special slot.

In other embodiments of the disclosure, when the PUSCH mapping type is type B, the protocol stipulates that the start symbol position S∈[symbol #0, symbol #13] and the symbol length L may be between [1, 14], that is, L∈[1, 14] and 1⩽S+L⩽14. For example, assuming that the PUSCH mapping type is type B, the start symbol position S may be symbol #2 and the symbol length may be 5, so that it may be determined that the symbol resources allocated by the base station for uplink TBoMS is: symbol #2~symbol #7 in the special slot.

In addition, it should be noted that, in some embodiments of the disclosure, the symbol resources for uplink TBoMS may be determined by the UE according to a parameter configured and/or indicated by the base station. The specific manner for determining the symbol resources according to the parameter will be introduced in detail in subsequent embodiments.

Step 102, intra-slot frequency hopping is performed on an uplink slot and available symbols in the special slot are determined; and intra-slot frequency hopping is performed on the available symbols in the symbol resources or intra-slot frequency hopping is not performed on the special slot.

In some embodiments of the disclosure, the manner for determining the available symbols in the special slot may include: determining unavailable symbol(s) in the special slot according to a slot format indication (SFI) dynamic indication signaling and/or a semi-static slot format configuration signaling and/or other dynamic indication signaling and/or other radio resource control (RRC) configuration signaling, sent by the base station, and determining that the available symbols are symbols in the special slot other than the unavailable symbol(s).

In some embodiments of the disclosure, the unavailable symbol(s) may include at least one of:
 a guard symbol for downlink to uplink switching;
 a downlink symbol for downlink transmission;
 a symbol for synchronization signal block (SSB) transmission;
 a symbol allocated for a common search space (CSS) (e.g. CSS #0);
 a symbol occupied by a cancel indication (CI); or
 a symbol for service transmission with a higher priority than current data transmission.

In some embodiments of the disclosure, when a certain symbol in the special slot satisfies any of the above conditions, it is determined that the symbol is the unavailable symbol.

It should be noted that, in some embodiments of the disclosure, the time-domain resources allocated by the base station in step 101 above may include unavailable symbol(s). In other embodiments of the disclosure, the time-domain resources allocated by the base station in step 101 above may not include unavailable symbol(s).

In some embodiments of the disclosure, when intra-slot frequency hopping is performed on the uplink slot, intra-slot frequency hopping may be performed on the available symbols in the symbol resources only. In other embodiments of the disclosure, when intra-slot frequency hopping is performed on the uplink slot, intra-slot frequency hopping may not be performed on the special slot.

It should also be noted that, in some embodiments of the disclosure, when intra-slot frequency hopping is not performed on the special slot, the frequency-domain position of the special slot is the same as the frequency-domain position of any hop in the uplink slot. For example, in some embodiments of the disclosure, the frequency-domain position of the special slot may be the same as the frequency-domain position of the second hop in the uplink slot.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 2:
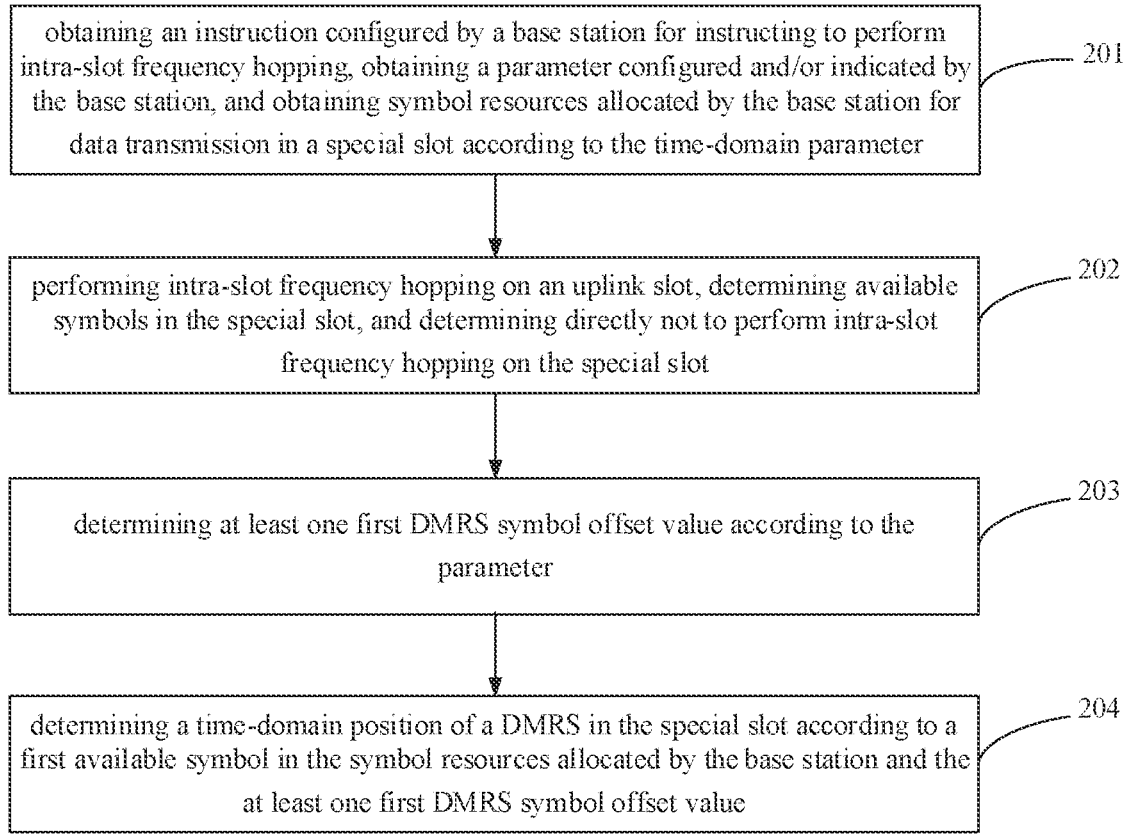
FIG. 2 is a schematic flowchart of a frequency hopping method according to other embodiments of the disclosure.

FIG. 2 is a schematic flowchart of another frequency hopping method according to some embodiments of the disclosure. The method is performed by a UE. As illustrated in FIG. 2, the frequency hopping method may include the following steps.

Step 201, an instruction configured by a base station for instructing to perform intra-slot frequency hopping, is obtained, a parameter configured and/or indicated by the base station is obtained, and symbol resources allocated by the base station for data transmission in a special slot are obtained according to the parameter.

In some embodiments of the disclosure, whether to perform intra-slot frequency hopping is determined by a frequency hopping flag bit, a frequency-domain resource allocation type (type 1), or a frequency hopping type configuration.

The frequency hopping type is configured by a RRC high-layer parameter, frequency hopping (FH), which may be configured as intra-slot FH and inter-slot FH, or this parameter does not exist, and if it does not exist, intra-slot frequency hopping is not enabled.

The frequency-domain resource allocation type may be configured as {type 1, type 2, dynamic switching} by a RRC high-layer signaling, where type 1 is a continuous frequency-domain resource allocation pattern and type 2 is a discontinuous frequency-domain resource allocation pattern. When it is configured as the dynamic switching, it is determined whether it is type 1 or type 2 according to an indication of a downlink control information (DCI) dynamic signaling, and only when it is configured or indicated as type 1, intra-slot frequency hopping is enabled.

The frequency hopping flag bit is dynamically indicated by 1 bit in the DCI signaling, in which "1" indicates that intra-slot frequency hopping is performed and "0" indicates that intra-slot frequency hopping is not performed.

In some embodiments of the disclosure, the above parameter may include at least one of:
 a PUSCH mapping type, in which the PUSCH mapping type includes type A and type B;
 a symbol length for data transmission in the special slot; or
 a start symbol position for data transmission in the special slot.

The specific manner for the UE to obtain the parameter configured and/or indicated by the base station will be described in detail below.

In some embodiments of the disclosure, the manner for obtaining "the PUSCH mapping type, or the symbol length for data transmission in the special slot, or the start symbol position for data transmission in the special slot" in the parameter may include: obtaining by a high-layer signaling sent by the base station and a dynamic indication of the base station.

In detail, in some embodiments of the disclosure, the manner for obtaining the PUSCH mapping type, or the symbol length for data transmission in the special slot, or the start symbol position for data transmission in the special slot, by the high-layer signaling sent by the base station and the dynamic indication of the base station may specifically include: obtaining, by the UE, a time-domain resource allocation table sent by the base station through the high-layer signaling, in which the uplink time-domain resource allocation table includes at least one group of time-domain resources, each group of time-domain resources corresponds to an index, and each group of time-domain resources includes at least one of: the PUSCH mapping type, the symbol length for data transmission in the special slot, or the start symbol position for data transmission in the special slot; and obtaining an index dynamically indicated by the base station, so as to determine the time-domain resources matching the index from the time-domain resource allocation table according to the dynamically indicated index.

For example, Table 1 is an uplink time-domain resource allocation table according to some embodiments of the disclosure.

TABLE 1

| index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | J | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 2

| μ | j |
|---|---|
| 0 | 1 |
| 1 | 1 |
| 2 | 2 |
| 3 | 3 |

A corresponding relationship between a value of u and a subcarrier spacing of a bandwidth part (BWP) where the current transmission is located as illustrated in Table 2. The value of u may be determined according to the corresponding relationship and the subcarrier spacing of the BWP where the current transmission is located. The corresponding relationship may be: when the subcarrier spacing is 15 KHZ, μ=0; when the subcarrier spacing is 30 KHZ, μ=1; when the subcarrier spacing is 60 KHZ, μ=2; and when the subcarrier spacing is 120 KHZ, μ=3. In some embodiments of the disclosure, the corresponding relationship between the value of u and the subcarrier spacing of the BWP where the current transmission is located may be obtained by the base station through the RRC high-layer signaling.

As illustrated in Table 1 and Table 2, there are multiple indexes, and different indexes correspond to different time-domain resources. In detail, the time-domain resources corresponding to index=4 include: the PUSCH mapping type being Type B, $K_2$=j, the start symbol position S=2 for data transmission in the special slot, and the symbol length L=10 for data transmission in the special slot.

Based on this, in some embodiments of the disclosure, assuming that the index dynamically indicated by the base station is 4, the UE may directly determine the PUSCH mapping type, or the symbol length for data transmission in the special slot, or the start symbol position for data transmission in the special slot, according to the parameter. Then, in combination with the above content, the UE may successfully obtain the parameter configured and/or indicated by the base station.

Further, in some embodiments of the disclosure, after the UE obtains the parameter configured and/or indicated by the base station, it may determine the symbol resources for uplink TBoMS in the special slot according to the parameter. In detail, in some embodiments of the disclosure, the manner for determining the symbol resources for uplink TBoMS in the special slot may specifically include: setting symbols with the symbol positions between [S, S+L−1] in the special slot as the symbol resources for uplink TBoMS.

Step 202, intra-slot frequency hopping is performed on an uplink slot, available symbols in the special slot are determined, and it is directly determined not to perform intra-slot frequency hopping on the special slot.

In some embodiments of the disclosure, the specific manner for performing intra-slot frequency hopping on the uplink slot may be a manner in the related art, and details in some embodiments of the disclosure will not be described herein.

Step 203, at least one first demodulation reference signal (DMRS) symbol offset value is determined according to the parameter configured and/or indicated by the base station.

In some embodiments of the disclosure, the parameter configured and/or indicated by the base station may further include at least one of:

a DMRS-additional position;
a number of DMRS ports;
whether to enable intra-slot frequency hopping; or
a DMRS-type A position.

It should be noted that, in some embodiments of the disclosure, the DMRS-type A position parameter is a parameter for PUSCH mapping type A. Based on this, when the PUSCH mapping type is type B, the DMRS-type A position parameter is invalid. When the PUSCH mapping type is type A, the DMRS-type A position parameter is valid.

Further, in some embodiments of the disclosure, the UE may query the following table 3 according to the configuration type of the DMRS and the number of DMRS ports in the above parameter to determine whether the symbol type of the DMRS is single-symbol DMRS or double-symbol DMRS. In some embodiments of the disclosure, the configuration type of the DMRS may be configured by the base station to the UE through an RRC high-layer parameter. In some embodiments of the disclosure, the configuration type of the DMRS include type 1 and type 2.

TABLE 3

| DMRS duration | l' | Supported antenna ports $\tilde{p}$ | |
|---|---|---|---|
| | | Configuration type 1 | Configuration type 2 |
| single-symbol DMRS | 0 | 0-3 | 0-5 |
| double-symbol DMRS | 0, 1 | 0-7 | 0-11 |

As illustrated in Table 1, under a case that the configuration type of the DMRS is type 1, when the number of ports is less than or equal to 4, it is determined as the single-symbol DMRS, and when the number of ports is greater than 4, it is determined as the double-symbol DMRS. Under a case that the configuration type of the DMRS is type 2, when the number of ports is less than or equal to 8, it is determined as the single-symbol DMRS, and when the number of ports is greater than 8, it is determined as the double-symbol DMRS.

The specific manner for the UE to obtain the parameter configured and/or indicated by the base station will be described in detail below.

In detail, in some embodiments of the disclosure, the manner for obtaining the "DMRS-additional position" in the parameter may include: obtaining through the RRC high-layer signaling sent by the base station.

In some embodiments of the disclosure, the manner for obtaining the "DMRS-type A position" in the parameter may include: obtaining through a system broadcast message, a master information block (MIB), sent by the base station.

In some embodiments of the disclosure, the manner for obtaining the number of DMRS ports in the parameter or whether to enable intra-slot frequency hopping includes: obtaining the number of DMRS ports or whether to enable intra-slot frequency hopping, dynamically indicated by the base station.

In some embodiments of the disclosure, the UE determines the at least one first DMRS symbol offset value according to the parameter, where the first DMRS symbol offset value is used to determine the position of the DMRS symbol in the special slot.

In some embodiments of the disclosure, when the PUSCH time-domain type included in the parameter is different, the manner for the UE to determine the at least one first DMRS symbol offset value according to the parameter is also different.

In detail, in some embodiments of the disclosure, when the PUSCH time-domain type included in the parameter is type B, the UE may determine the at least one first DMRS symbol offset value according to the mapping rule of type B.

In other embodiments of the disclosure, when the PUSCH time-domain type included in the parameter is type A, the UE may determine the at least one first DMRS symbol offset value according to the mapping rule of type A.

In other embodiments of the disclosure, when the PUSCH time-domain type included in the parameter is type A, the UE may determine the at least one first DMRS symbol offset value according to the mapping rule of type B.

In other embodiments of the disclosure, when the PUSCH time-domain type included in the parameter is type A, the UE may determine the at least one first DMRS symbol offset value according to the mapping rule of type B, in which the number of DMRS ports in the parameter is single and the number of available symbols in the special slot is less than 4.

The specific manners for determining the at least one first DMRS symbol offset value according to the mapping rule of type A and for determining the at least one first DMRS symbol offset value according to the mapping rule of type B are described in detail below.

In some embodiments of the disclosure, the manner for determining the at least one first DMRS symbol offset value according to the mapping rule of type B may include the following.

Manner 1: the at least one first DMRS symbol offset value is determined according to the number of the available symbols in the symbol resources and other parameter(s) in the parameter other than the symbol length for data transmission in the special slot.

Manner 2: the at least one first DMRS symbol offset value is determined according to the symbol length for data transmission in the special slot and other parameter(s) in the parameter other than the symbol length for data transmission in the special slot.

Further, the above manner 1 and manner 2 are introduced in detail.

First, in some embodiments of the disclosure, when using manner 1 and manner 2 to determine the at least one first DMRS symbol offset value, it needs use the PUSCH DMRS position locating table, where Table 4 is a first PUSCH DMRS position locating table in some embodiments of the disclosure. The UE may obtain the at least one first DMRS symbol offset value by looking up Table 4 according to the parameter.

TABLE 4

| | DM-RS positions $\bar{l}$ | | | | | | | |
|---|---|---|---|---|---|---|---|---|
| $l_d$ in | PUSCH mapping Type A DMRS-Additional Position | | | | PUSCH mapping Type B DMRS-Additional Position | | | |
| symbols | pos0 | pos1 | pos2 | pos3 | pos0 | pos1 | pos2 | pos3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

In some embodiments of the disclosure, $l_d$ may be the number of the available symbols in the symbol resources. In other embodiments of the disclosure, $l_d$ may be the symbol length for data transmission in the special slot. Based on this, the UE may determine the at least one first DMRS symbol offset value according to $l_d$, the PUSCH mapping type, and the DMRS-additional position. For example, when $l_d$=10, the PUSCH mapping type is Type B, and the DMRS-additional position=pos2, the at least one DMRS symbol offset value of $l_0$, 4, and 8 may be determined by looking up Table 4.

It should be noted that, in some embodiments of the disclosure, $l_0$ is determined according to the PUSCH mapping type. In detail, when the PUSCH mapping type is Type A, $l_0$=DMRS-type A position. When the PUSCH mapping type is Type B, $l_0$=0. Based on this, when mapping according to the mapping rule of Type B, $l_0$=0.

On this basis, in some embodiments of the disclosure, when using manner 1 to determine the at least one first DMRS symbol offset value, $l_d$ in the above Table 4 is the number of the available symbols in the symbol resources. The step of the UE determining the at least one first DMRS symbol offset value using manner 1 may include: looking up the above Table 4 according to the number of the available symbols in the symbol resources, the DMRS-additional position, and the PUSCH mapping Type B to perform the DMRS symbol mapping, to determine the at least one first DMRS symbol offset value.

In other embodiments of the disclosure, when using manner 1 to determine the at least one first DMRS symbol offset value, $l_d$ in the above Table 4 is the symbol length for data transmission in the special slot. The step for the UE determining the at least one first DMRS symbol offset value using manner 2 may include: looking up the above Table 4 according to the symbol length, the DMRS-additional position, and the PUSCH mapping Type B to perform the DMRS symbol mapping to determine the at least one first DMRS symbol offset value.

In some embodiments of the disclosure, the manner for determining the at least one first DMRS symbol offset value according to the mapping rule of type A may include the following.

The first manner is to determine the at least one first DMRS symbol offset value according to the number of the available symbols in the symbol resources and other parameter(s) in the parameter other than the symbol length for data transmission in the special slot.

The second manner is to determine the at least one first DMRS symbol offset value according to the symbol length for data transmission in the special slot and other parameter(s) in the parameter other than the symbol length for data transmission in the special slot.

Further, the first manner and the second manner above are introduced in detail.

First, in some embodiments of the disclosure, when using the first manner and the second manner to determine the at least one first DMRS symbol offset value, it needs to use the PUSCH DMRS position locating table in Table 4 above, in which the UE may obtain the at least one first DMRS symbol offset value by looking up Table 4 according to the above parameter.

In some embodiments of the disclosure, $l_d$ may be the number of the available symbols in the symbol resources. In other embodiments of the disclosure, $l_d$ may be the symbol length for data transmission in the special slot. Based on this, the UE may determine the at least one first DMRS symbol offset value according to $l_d$, the PUSCH mapping type, and the DMRS-additional position. For example, when $l_d$=10, the PUSCH mapping type is Type A, and the DMRS-additional position=pos2, the at least one DMRS symbol offset value of $l_0$, 6, and 9 may be determined by looking up Table 4.

It should be noted that, in some embodiments of the disclosure, $l_0$ is determined according to the PUSCH mapping type. In detail, when the PUSCH mapping type is Type A, $l_0$=DMRS-type A position. When the PUSCH mapping type is Type B, $l_0$=0. Based on this, when mapping according to the mapping rule of Type A, $l_0$=DMRS-type A position.

On this basis, in some embodiments of the disclosure, when the first manner is used to determine the at least one first DMRS symbol offset value, $l_d$ in the above Table 4 is the number of the available symbols in the symbol resources. The step for the UE determining the at least one first DMRS symbol offset value using the first manner may include: looking up the above table according to the number of the symbols available in the symbol resources, the DMRS-additional position, the PUSCH mapping Type A, and the DMRS-type A position to perform the DMRS symbol mapping, to determine the at least one first DMRS symbol offset value.

In other embodiments of the disclosure, when the second manner is used to determine the at least one first DMRS symbol offset value, $l_d$ in the above Table 4 is the symbol length for data transmission in the special slot. The step of the UE determining the at least one first DMRS symbol offset value using the second manner may include: looking up the above table according to the symbol length for data transmission in the special slot, the DMRS-additional position, the PUSCH mapping Type A, and the DMRS-type A position to perform the DMRS symbol mapping, to determine the at least one first DMRS symbol offset value.

In addition, it should be noted that, in some embodiments of the disclosure, before determining the at least one first DMRS symbol offset value, the following steps may also be included:

Step 1, the available symbols in the special slot are determined.

Step 2, the parameter configured and/or indicated by the base station is determined.

In some embodiments of the disclosure, for a detailed introduction of steps 1 to 2, reference may be made to relevant introductions in the foregoing embodiments, and details in embodiments of the disclosure are not repeated herein.

Step 3, at least one fourth DMRS symbol offset value in the special slot is determined according to the parameter, a sum of a symbol number of a first symbol in the symbol resources and each fourth DMRS symbol offset value is determined to obtain at least one fourth and value, and a symbol with a symbol number corresponding to the fourth sum value is determined as a fourth time-domain position of the DMRS.

In some embodiments of the disclosure, the UE may obtain the at least one fourth DMRS symbol offset value by looking up the above Table 4 according to the parameter, and when determining the fourth DMRS symbol offset value, $l_d$ in the above Table 4 is the symbol length for data transmission in the special slot. The principle of the manner for determining the fourth DMRS symbol offset value is the same as the manner for determining the first DMRS symbol offset value. For details, reference may be made to the description of the above embodiments, and the embodiments of the disclosure will not repeat them herein.

In some embodiments of the disclosure, after the at least one fourth DMRS symbol offset value is determined, the time-domain position of the DMRS in the special slot may be determined using a conventional manner. In detail, "determining a sum of a symbol number of a first symbol in the symbol resources and each fourth DMRS symbol offset value to obtain at least one fourth and value, and determining a symbol with a symbol number corresponding to the fourth sum value as a fourth time-domain position of the DMRS" in the above step 3 may be performed. The fourth time-domain position is the time-domain position of the DMRS determined in the special slot by the conventional manner.

Step 4, it is determined whether the fourth time-domain position satisfies a preset condition. When the preset condition is satisfied, the above step 203 is performed; and when the preset condition is not satisfied, step 5 is performed.

The preset conditions include at least one of:
condition 1, all the fourth time-domain position(s) conflicts with unavailable symbol(s) in the special slot;
condition 2. neither the fourth time-domain position(s) is located on an available symbol.

In some embodiments of the disclosure, the preset condition may be only any one of the above conditions. In other embodiments of the disclosure, the preset condition may be two of the above conditions. In some embodiments of the disclosure, when the preset condition is two of the above conditions, and when the fourth time-domain position satisfies any one of the preset conditions, it satisfies the preset condition.

In some embodiments of the disclosure, when the fourth time-domain position satisfies the preset condition, it means that none of the fourth time-domain position determined by the conventional manner can be used for uplink TBoMS, and the above-mentioned step 203 is to re-determine the DMRS time-domain position; when the fourth time-domain position does not satisfy the preset condition, it means that the fourth time-domain position has a time-domain position that may be used for uplink TBoMS, and thus step 5 may be performed.

Step 5, the DMRS is transmitted according to the time-domain position on the available symbols of the special slot in the fourth time-domain position.

Assuming that the unavailable symbol(s) of the special slot are symbol #0-symbol #2, and the determined fourth time-domain positions are symbol #1, symbol #5, and symbol #9, the DMRS may be transmitted according to symbol #5 and symbol #9.

Step 204, a time-domain position of a DMRS in the special slot is determined according to a first available symbol in the symbol resources allocated by the base station and the at least one first DMRS symbol offset value.

In some embodiments of the disclosure, when the manner for determining the at least one first DMRS symbol offset value in step 203 is different, the manner for determining the first time-domain position of the DMRS will also be different.

In detail, when manner 1 or the first manner is used to determine the at least one first DMRS symbol offset value, the manner for determining the first time-domain position of the DMRS may include: determining a sum of a symbol number of a first available symbol and each DMRS symbol offset value to obtain at least one first sum value, and determining a symbol with a symbol number corresponding to the first sum value as a first time-domain position of the DMRS.

For example, in some embodiments of the disclosure, it is assumed that the at least one first DMRS symbol offset value obtained by using manner 1 or the first manner in step 201 is $l_0$, 4, 8, and it is assumed that the symbol number of the first available symbol in symbol resources is symbol #1, and $l_0$=0, the determined first time-domain position of the DMRS may be symbol $\#(1+l_0)$=symbol $\#(1+0)$=symbol #1, symbol $\#(1+4)$=symbol #5, and symbol $\#(1+8)$=symbol #9.

In other embodiments of the disclosure, when manner 2 or the second manner is used to determine the at least one first DMRS symbol offset value in the above step 201, since the symbol length for data transmission in the special slot is greater than the number of the available symbols in the symbol resources, it will make the determined first DMRS symbol offset value larger, and when the first time-domain position of the DMRS is determined according to the first available symbol in the symbol resources and the at least one first DMRS symbol offset value, there may be a time-domain position in the determined first time-domain position of the DMRS beyond the symbol resources, which will affect the data transmission.

Therefore, in some embodiments of the disclosure, when the at least one first DMRS symbol offset value is determined by manner 2 or the second manner in the above step 201, after the at least one time-domain position is determined according to the first available symbol and the at least one first DMRS symbol offset value, it further needs to determine whether there is a time-domain position exceeding the symbol resources in the at least one time-domain position determined. In some embodiments of the disclosure, when there is the time-domain position exceeding the symbol resources, the time-domain position exceeding the symbol resources in the at least one time-domain position is discarded to obtain the remaining time-domain position(s), and the remaining time-domain position(s) is determined as the first time-domain position of the DMRS. In other embodiments of the disclosure, when there is no time-domain position exceeding the symbol resources, the at least one determined time-domain position is determined as the first time-domain position of the DMRS.

For example, it is assumed that the at least one time-domain position determined according to the first available symbol in the symbol resources and the at least one first DMRS symbol offset value may be symbol #1, symbol #5, and symbol #9, and the symbol resources are symbol #1~symbol #8. At this time, since symbol #9 exceeds the time-domain position of the symbol resources, symbol #9 is discarded, and only symbol #1 and symbol #5 are determined as the first time-domain positions of the DMRS.

In some embodiments of the disclosure, when the UE determines the time-domain position of the DMRS in the special slot, it may transmit the DMRS according to the time-domain position of the DMRS.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 3:
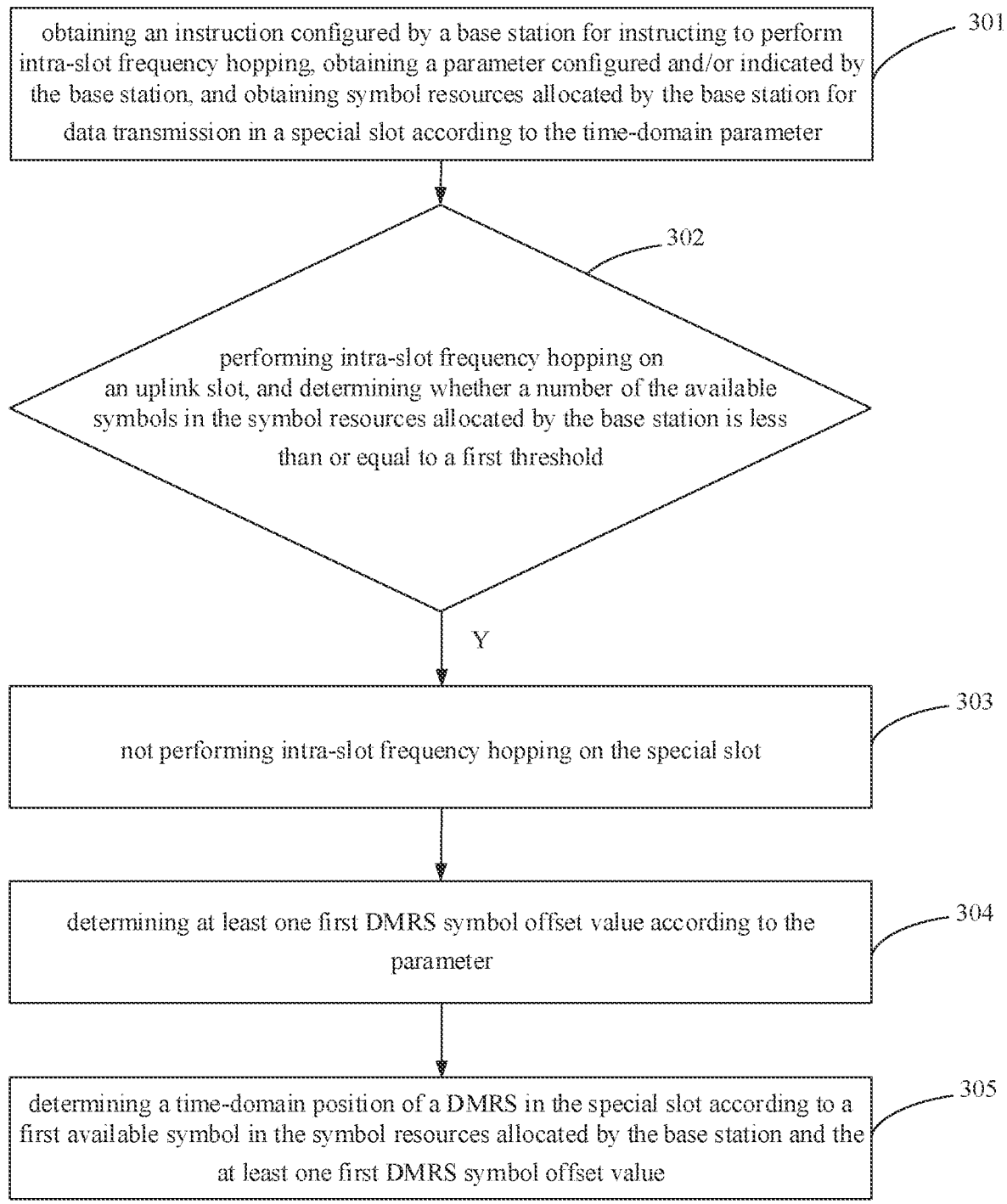
FIG. 3 is a schematic flowchart of a frequency hopping method according to still other embodiments of the disclosure.

FIG. 3 is a schematic flowchart of another frequency hopping method according to some embodiments of the disclosure. The method is performed by a UE. As illustrated in FIG. 3, the frequency hopping method may include the following steps.

Step 301, an instruction configured by a base station for instructing to perform intra-slot frequency hopping, is obtained, a parameter configured and/or indicated by the base station is obtained, and symbol resources allocated by the base station for data transmission in a special slot are obtained according to the parameter.

Step 302, intra-slot frequency hopping is performed on an uplink slot, available symbols in the special slot are determined, it is determined whether a number of the available symbols in the symbol resources allocated by the base station is less than or equal to a first threshold, and when the number of the available symbols in the symbol resources allocated by the base station is less than or equal to the first threshold, step 303 is performed.

In some embodiments of the disclosure, the first threshold may be configured to indicate a minimum number of symbols in one hop when intra-slot frequency hopping is performed on the special slot. For example, the first threshold is 3. In some embodiments of the disclosure, the first threshold may be indicated by the base station to the UE. In other embodiments of the disclosure, the first threshold may be determined by the UE according to a protocol.

In some embodiments of the disclosure, when the number of the available symbols in the symbol resources allocated by the base station is less than or equal to the first threshold, it means that the number of the available symbols in the symbol resources allocated by the current base station is not enough to realize one normal hop, step 303 may be performed.

Step 303, intra-slot frequency hopping is not performed on the special slot.

Step 304, at least one first DMRS symbol offset value is determined according to the parameter configured and/or indicated by the base station.

Step 305, a time-domain position of a DMRS in the special slot is determined according to a first available symbol in the symbol resources allocated by the base station and the at least one first DMRS symbol offset value.

For the detailed introduction of steps 301-305, reference may be made to the foregoing embodiments, and the embodiments of the disclosure will not repeat them herein.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 4:
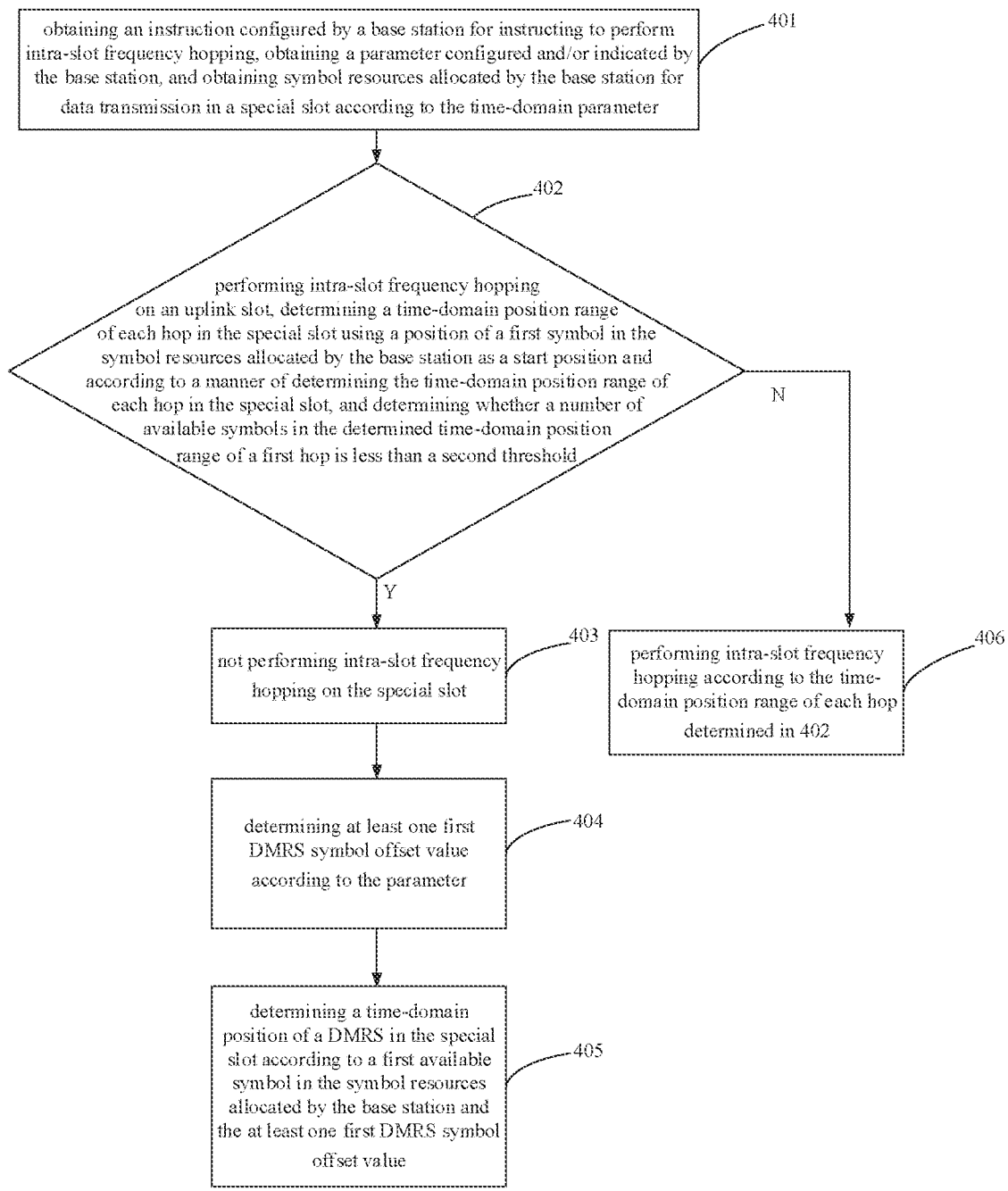
FIG. 4 is a schematic flowchart of a frequency hopping method according to yet other embodiments of the disclosure.

FIG. 4 is a schematic flowchart of another frequency hopping method according to some embodiments of the disclosure. The method is performed by a UE. As illustrated in FIG. 4, the frequency hopping method may include the following steps.

Step 401, an instruction configured by a base station for instructing to perform intra-slot frequency hopping, is obtained, a parameter configured and/or indicated by the base station is obtained, and symbol resources allocated by the base station for data transmission in a special slot are obtained according to the parameter.

Step 402, intra-slot frequency hopping is performed on an uplink slot, available symbols in the special slot are determined, a time-domain position range of each hop in the special slot is determined using a position of a first symbol in the symbol resources allocated by the base station as a start position and according to a time-domain position range determining manner for each hop in the uplink slot (that is, according to a manner of determining the time-domain position range of each hop in the uplink slot), it is determined whether a number of available symbols in the determined time-domain position range of a first hop is less than a second threshold, and when the number of available symbols in the determined time-domain position range of the first hop is less than the second threshold, step 403 is performed, and when the number of available symbols in the determined time-domain position range of the first hop is not less than the second threshold, step 406 is performed.

For example, in some embodiments of the disclosure, the second threshold may be 2. In some embodiments of the disclosure, the second threshold may be indicated by the base station to the UE. In other embodiments of the disclosure, the second threshold may be determined by the UE according to a protocol.

In some embodiments of the disclosure, when it is determined that the number of available symbols in the time-domain position range of the first hop is less than the second threshold, it indicates that the number of available symbols in the time-domain range of the first hop determined according to the manner of determining the time-domain position range of each hop in the uplink slot is smaller, which may cause the uplink TBoMS to be unable to be performed on the currently determined first hop, so step 403 needs to be performed; and when it is determined that the number of available symbols included in the time-domain position range of the first hop is greater than or equal to the second threshold, it indicates that the number of available symbols in the time-domain range of the first hop determined according to the manner for determining the time-domain position range of each hop in the uplink slot is larger, and data may be normally transmitted on the first hop, so step 406 may be performed.

Step 403, intra-slot frequency hopping on the special slot is not performed.

Step 404, at least one first DMRS symbol offset value is determined according to the parameter configured and/or indicated by the base station.

Step 405, a time-domain position of a DMRS in the special slot is determined according to a first available symbol in the symbol resources allocated by the base station and the at least one first DMRS symbol offset value.

Step 406, intra-slot frequency hopping is performed according to the time-domain position range of each hop in the special slot which is determined using the position of the first symbol in the symbol resources as the start position.

For the detailed introduction of steps 401-406, reference may be made to the foregoing embodiments, and the embodiments of the disclosure will not repeat them herein.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 5:
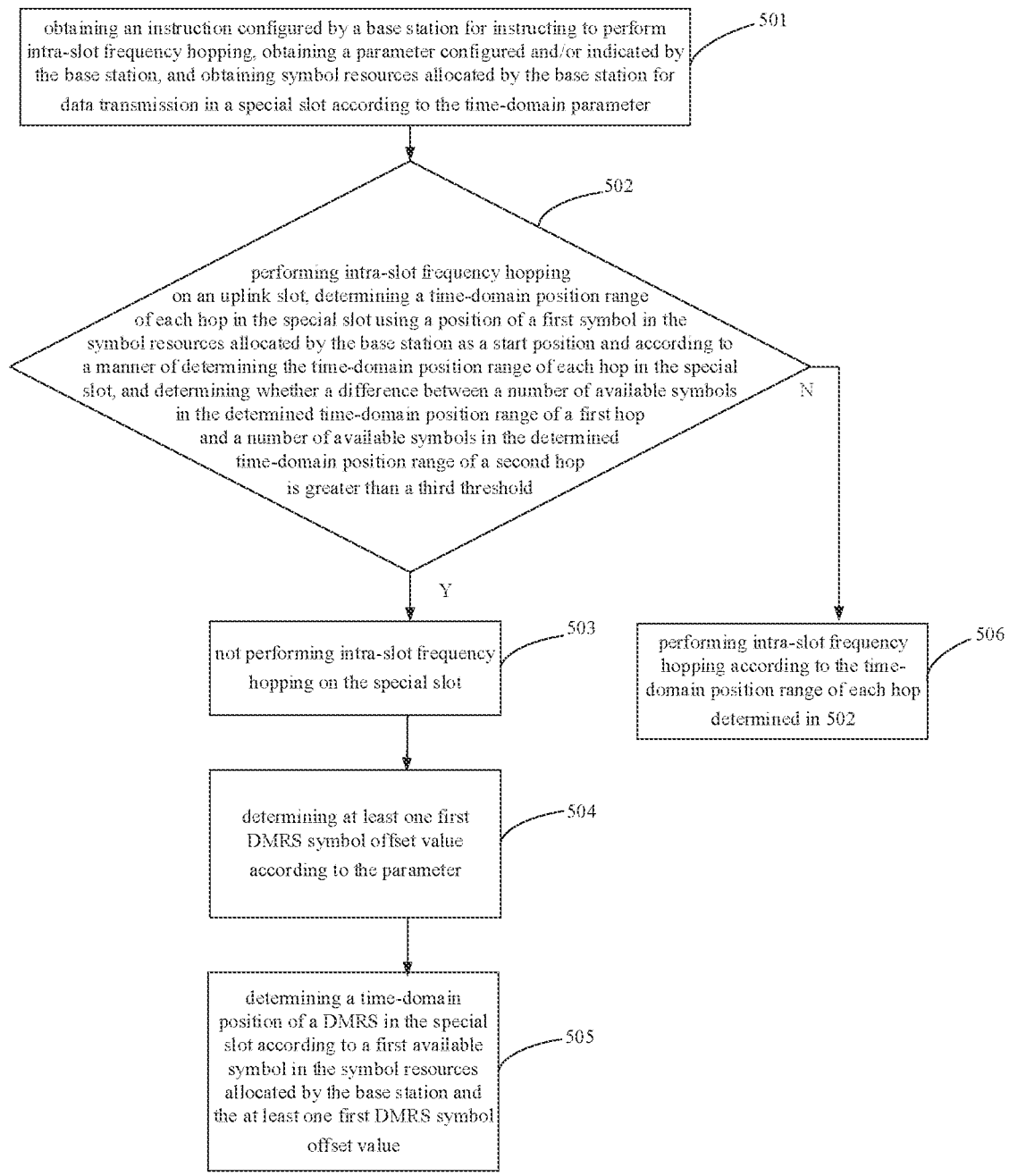
FIG. 5 is a schematic flowchart of a frequency hopping method according to yet other embodiments of the disclosure.

FIG. 5 is a schematic flowchart of another frequency hopping method according to some embodiments of the disclosure. The method is performed by a UE. As illustrated in FIG. 5, the frequency hopping method may include the following steps.

Step 501, an instruction configured by a base station for instructing to perform intra-slot frequency hopping, is obtained, a parameter configured and/or indicated by the base station is obtained, and symbol resources allocated by the base station for data transmission in a special slot are obtained according to the parameter.

Step 502, intra-slot frequency hopping is performed on an uplink slot, available symbols in the special slot are determined, a time-domain position range of each hop in the special slot is determined using a position of a first symbol in the symbol resources allocated by the base station as a start position and according to a manner of determining the time-domain position range of each hop in the uplink slot, it is determined whether a difference between a number of available symbols in the determined time-domain position range of a first hop and a number of available symbols in the determined time-domain position range of a second hop is greater than a third threshold, when it is determined the difference between the number of available symbols in the determined time-domain position range of the first hop and the number of available symbols in the determined time-domain position range of the second hop is greater than the third threshold, step 503 is performed, and when it is determined the difference between the number of available symbols in the determined time-domain position range of the first hop and the number of available symbols in the determined time-domain position range of the second hop is not greater than the third threshold, step 506 is performed.

In some embodiments of the disclosure, the third threshold may be indicated by the base station to the UE. In other embodiments of the disclosure, the third threshold may be determined by the UE according to a protocol.

In some embodiments of the disclosure, when it is determined the difference between the number of available symbols in the determined time-domain position range of the first hop and the number of available symbols in the determined time-domain position range of the second hop is greater than the third threshold, it means that the number of available symbols in the time-domain range of the first hop determined according to the manner of determining the time-domain position range of each hop in the uplink slot is smaller, which may cause the uplink TBoMS to be unable to be performed on the currently determined first hop, so step 503 needs to be performed; and when it is determined the difference between the number of available symbols in the determined time-domain position range of the first hop and the number of available symbols in the determined time-domain position range of the second hop is less than or equal to the third threshold, it means that the number of available symbols in the time-domain range of the first hop determined according to the manner of determining the time-domain position range of each hop in the uplink slot is larger, and data may be transmitted normally on the first hop, so step 506 may be performed.

Step 503, intra-slot frequency hopping on the special slot is not performed.

Step 504, at least one first DMRS symbol offset value is determined according to the parameter configured and/or indicated by the base station.

Step 505, a time-domain position of a DMRS in the special slot is determined according to a first available symbol in the symbol resources allocated by the base station and the at least one first DMRS symbol offset value.

Step 506, intra-slot frequency hopping is performed according to the time-domain position range of each hop in the special slot which is determined using the position of the first symbol in the symbol resources as the start position.

For the detailed introduction of steps 501-506, reference may be made to the foregoing embodiments, and the embodiments of the disclosure will not repeat them herein.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 6:
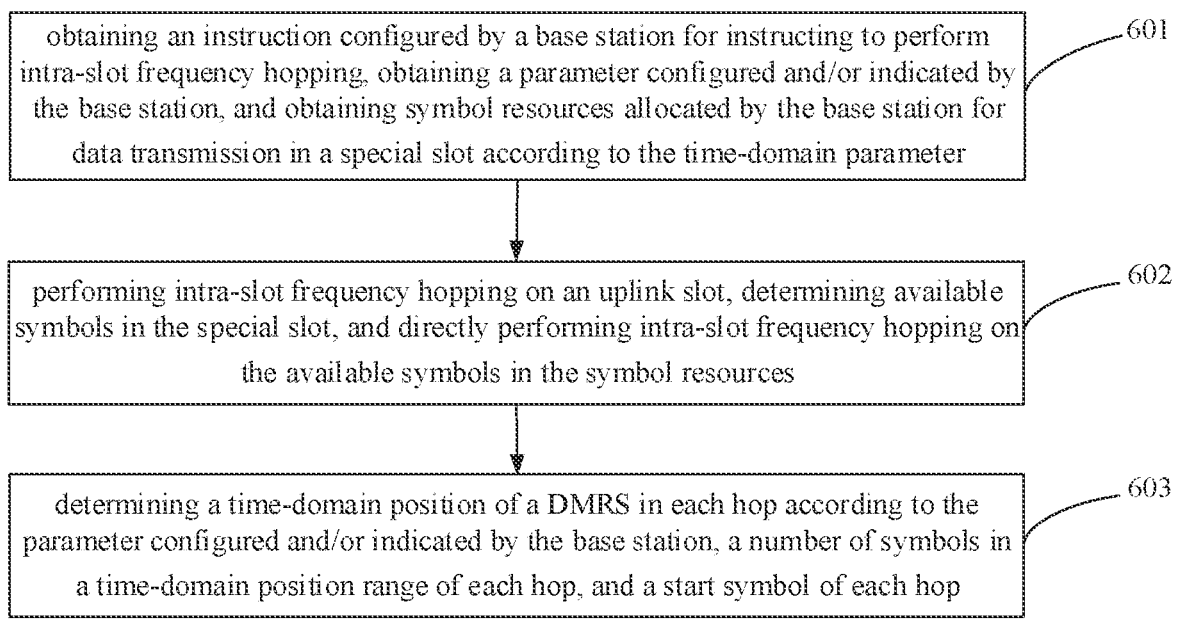
FIG. 6 is a schematic flowchart of a frequency hopping method according to yet other embodiments of the disclosure.

FIG. 6 is a schematic flowchart of another frequency hopping method according to some embodiments of the disclosure. The method is performed by a UE. As illustrated in FIG. 6, the frequency hopping method may include the following steps.

Step 601, an instruction configured by a base station for instructing to perform intra-slot frequency hopping, is obtained, a parameter configured and/or indicated by the base station is obtained, and symbol resources allocated by the base station for data transmission in a special slot are obtained according to the parameter.

For the detailed introduction of step 601, reference may be made to the foregoing embodiments, and the embodiments of the disclosure will not repeat them herein.

Step 602, intra-slot frequency hopping is performed on an uplink slot, available symbols in the special slot are determined, and it directly performs intra-slot frequency hopping on the available symbols in the symbol resources.

For the manner of determining the available symbols in the special slot, reference may be made to the description of the foregoing embodiments, and the embodiments of the disclosure will not repeat them herein.

In some embodiments of the disclosure, the manner for performing intra-slot frequency hopping on the available symbols in the symbol resources may include:
  determining a time-domain start position of a first hop in the special slot is: a position of a first available symbol in the symbol resources; and determining a time-domain end position of the first hop is: the position of the first available symbol in the symbol resources+floor (a number of the available symbols in the symbol resources÷2)−1; in which a floor function is a downward rounding function; and
  determining a time-domain start position of a second hop in the special slot is: the position of the first available symbol in the symbol resources+floor (the number of the available symbols in the symbol resources÷2); and determining a time-domain end position of the second hop is: the position of the first available symbol in the symbol resources+floor (the number of the available symbols in the symbol resources÷2)+the number of the available symbols in the symbol resources−floor (the number of the available symbols in the symbol resources÷2)−1.

For example, assuming that the symbol resources allocated by the base station for data transmission in the special slot are symbol #0~symbol #10, in which symbol #0~symbol #2 are unavailable symbols, the position of the first available symbol in the symbol resources may be determined as symbol #3, and the number of the available symbols in the symbol resources is 8. Based on this, the frequency hopping method in the symbol resources symbol #0~symbol #10 may be: determining the time-domain start position of the first hop as: symbol #3; and the time-domain end position of the first hop as: symbol #3+floor (8÷2)−1=symbol #6; and determining the time-domain start position of the second hop as: symbol #7; and the time-domain end position of the second hop as: symbol #3+floor (8÷2)+8-floor (8÷2)−1=symbol #10. That is, the time-domain position range of the first hop is symbol #3-symbol #6, and the time-domain position range of the second hop is symbol #7-symbol #10.

Step 603, a time-domain position of a DMRS in each hop is determined according to the parameter configured and/or indicated by the base station, a number of symbols in a time-domain position range of each hop, and a start symbol of each hop.

For details about the parameter, reference may be made to the foregoing description, and the embodiments of the disclosure will not repeat them herein.

In some embodiments of the disclosure, when the PUSCH mapping type in the parameter is type A, according to the mapping rule of type A, the time-domain position of the DMRS in each hop is determined according to the parameter configured and/or indicated by the base station, the number of symbols in the time-domain position range of each hop, and the start symbol of each hop. When the PUSCH mapping type in the parameter is type B, according to the mapping rule of type B, the time-domain position of the DMRS in each hop is determined according to the parameter configured and/or indicated by the base station, the number of symbols in the time-domain position range of each hop, and the start symbol of each hop.

The manner for determining the time-domain position of the DMRS in each hop according to the mapping rule of type A and the manner for determining the time-domain position of the DMRS in each hop according to the mapping rule of type B are introduced in detail below.

In some embodiments of the disclosure, no matter according to the mapping rule of type A or the mapping rule of type B, the determination of the time-domain position of the DMRS in each hop requires the use of the parameter, the number of symbols in the time-domain position range of each hop, and the start symbol of each hop by looking up a second PUSCH DMRS position locating table to determine the time-domain position of the DMRS in each hop. Table 5 is a second PUSCH DMRS position locating table according to some embodiments of the disclosure, and the UE may obtain the time-domain position of the DMRS in each hop by looking up Table 5 according to the parameter.

(that is, the value of $l_0$ corresponding to the PUSCH mapping Type A) in the parameter, and then a sum of the symbol number of the start symbol of the hop and each DMRS symbol offset values is determined to obtain at least one sum value, and a symbol with a symbol number corresponding to the sum value is determined as the time-domain position of the DMRS in the hop.

For example, assuming that the time-domain position of the DMRS in the second hop is determined, the start symbol of the second hop is symbol #7, the time-domain range of the second hop includes 4 (i.e. $l_d$=4), the PUSCH mapping Type is Type B, and the DMRS-additional position=pos1, according to $l_d$=4, PUSCH mapping Type B, pos1, and $2^{nd}$ hop, table 5 is looked up, and it may be determined that the DMRS symbol offset value in the second hop is 0, and symbol #7+0=symbol #7 may be determined as the time-domain position of the DMRS in the second hop.

Or, assuming that the time-domain position of the DMRS in the second hop is determined, the start symbol of the second hop is symbol #7, the time-domain range of the second hop includes 4 (i.e. $l_d$=4), the PUSCH mapping Type is Type A, the DMRS-additional position=pos1, and DMRS-type A position=2 (i.e. $l_0$=2), according to $l_d$=4, $l_0$=2, PUSCH mapping Type A, pos1, and 2nd hop, table 5 is looked up, and it may be determined that the DMRS symbol offset value in the second hop is 0, and symbol #7+0=symbol #7 may be determined as the time-domain position of the DMRS in the second hop.

Based on this, in some embodiments of the disclosure, the manner for determining the time-domain position of the DMRS in each hop according to the start symbol of each hop may include the following steps.

Step a: at least one second DMRS symbol offset value is determined according to the parameter configured and/or indicated by the base station and a number of symbols in the time-domain position range of the second hop.

Step b, a sum of a symbol number of a start symbol of the second hop and each second DMRS symbol offset value is determined to obtain at least one second sum value, and it is determined that the time-domain position of the DMRS in

TABLE 5

| | DMRS positions i | | | | | | | | | | | |
|---|---|---|---|---|---|---|---|---|---|---|---|---|
| | PUSCH mapping Type A | | | | | | | | PUSCH mapping Type B | | | |
| | $l_0$ = 2 | | | | $l_0$ = 3 | | | | $l_0$ = 0 | | | |
| | DMRS-Additional Position | | | | DMRS-Additional Position | | | | DMRS-Additional Position | | | |
| | pos0 | | pos1 | | pos0 | | pos1 | | pos0 | | pos1 | |
| $l_d$ in symbols | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ Hop | $1^{st}$ hop | $2^{nd}$ hop | $1^{st}$ hop | $2^{nd}$ hop |
| ≤3 | — | — | — | — | — | — | — | — | 0 | 0 | 0 | 0 |
| 4 | 2 | 0 | 2 | 0 | 3 | 0 | 3 | 0 | 0 | 0 | 0 | 0 |
| 5, 6 | 2 | 0 | 2 | 0, 4 | 3 | 0 | 3 | 0, 4 | 0 | 0 | 0, 4 | 0, 4 |
| 7 | 2 | 0 | 2, 6 | 0, 4 | 3 | 0 | 3 | 0, 4 | 0 | 0 | 0, 4 | 0, 4 |

In some embodiments of the disclosure, $l_d$ in Table 5 may be the number of symbols in the time-domain position range of each hop. When the UE needs to determine the time-domain position of the DMRS in a certain hop, it may first determine the number $l_d$ in the time-domain range of the hop, and then at least one DMRS symbol offset value of the hop is determined by combining the PUSCH mapping type, the DMRS-additional position, and DMRS-type A position the second hop is a symbol with a symbol number corresponding to the second sum value.

Step c, a sum of a symbol number of a start symbol of the first hop and each second DMRS symbol offset value is determined to obtain at least one third sum value, and it is determined that the time-domain position of the DMRS in the first hop is a symbol with a symbol number corresponding to the third sum value.

In other embodiments of the disclosure, the manner for determining the time-domain position of the DMRS in each hop according to the start symbol of each hop may include the following steps.

Step 1, at least one second DMRS symbol offset value is determined according to the parameter configured and/or indicated by the base station and a number of symbols in the time-domain position range of the second hop.

Step 2, a sum of a symbol number of a start symbol of the second hop and each second DMRS symbol offset value is determined to obtain at least one second sum value, and it is determined that the time-domain position of the DMRS in the second hop is a symbol with a symbol number corresponding to the second sum value.

Step 3, at least one third DMRS symbol offset value is determined according to the parameter configured and/or indicated by the base station and a number of symbols in the time-domain position range of the first hop.

Step 4, a sum of a symbol number of a start symbol of the first hop and each third DMRS symbol offset value is determined to obtain at least one third sum value, and it is determined that the time-domain position of the DMRS in the first hop is a symbol with a symbol number corresponding to the third sum value.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 7:
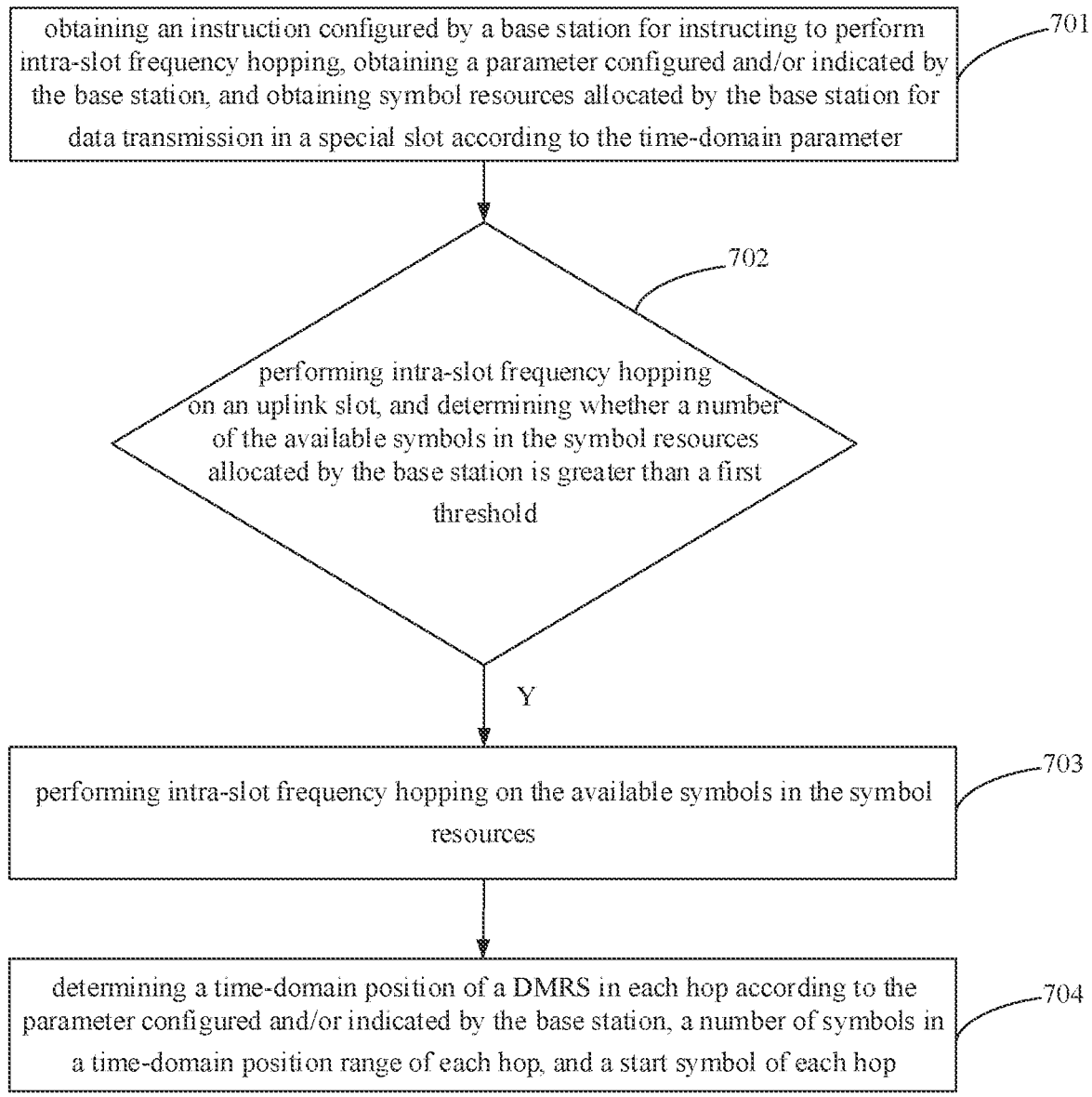
FIG. 7 is a schematic flowchart of a frequency hopping method according to yet other embodiments of the disclosure.

FIG. 7 is a schematic flowchart of another frequency hopping method according to some embodiments of the disclosure. The method is performed by a UE. As illustrated in FIG. 7, the frequency hopping method may include the following steps.

Step 701, an instruction configured by a base station for instructing to perform intra-slot frequency hopping, is obtained, a parameter configured and/or indicated by the base station is obtained, and symbol resources allocated by the base station for data transmission in a special slot are obtained according to the parameter.

Step 702, intra-slot frequency hopping is performed on an uplink slot, available symbols in the special slot are determined, it is determined whether a number of the available symbols in the symbol resources allocated by the base station is greater than a first threshold, and when the number of the available symbols in the symbol resources is greater than the first threshold, step 703 is performed.

In some embodiments of the disclosure, the first threshold may be configured to indicate a minimum number of symbols in one hop when intra-slot frequency hopping is performed on the special slot. For example, the first threshold is 3. In some embodiments of the disclosure, the first threshold may be indicated by the base station to the UE. In other embodiments of the disclosure, the first threshold may be determined by the UE according to a protocol.

In some embodiments of the disclosure, when the number of the available symbols in the symbol resources allocated by the base station is greater than the first threshold, it means that the number of the available symbols in the symbol resources allocated by the current base station is sufficient to realize one normal hop, and step 703 may be performed.

Step 703, intra-slot frequency hopping is performed on the available symbols in the symbol resources.

Step 704, a time-domain position of a DMRS in each hop is determined according to the parameter configured and/or indicated by the base station, a number of symbols in a time-domain position range of each hop, and a start symbol of each hop.

For the detailed introduction of steps 701-704, reference may be made to the foregoing embodiments, and the embodiments of the disclosure will not repeat them herein.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 8:
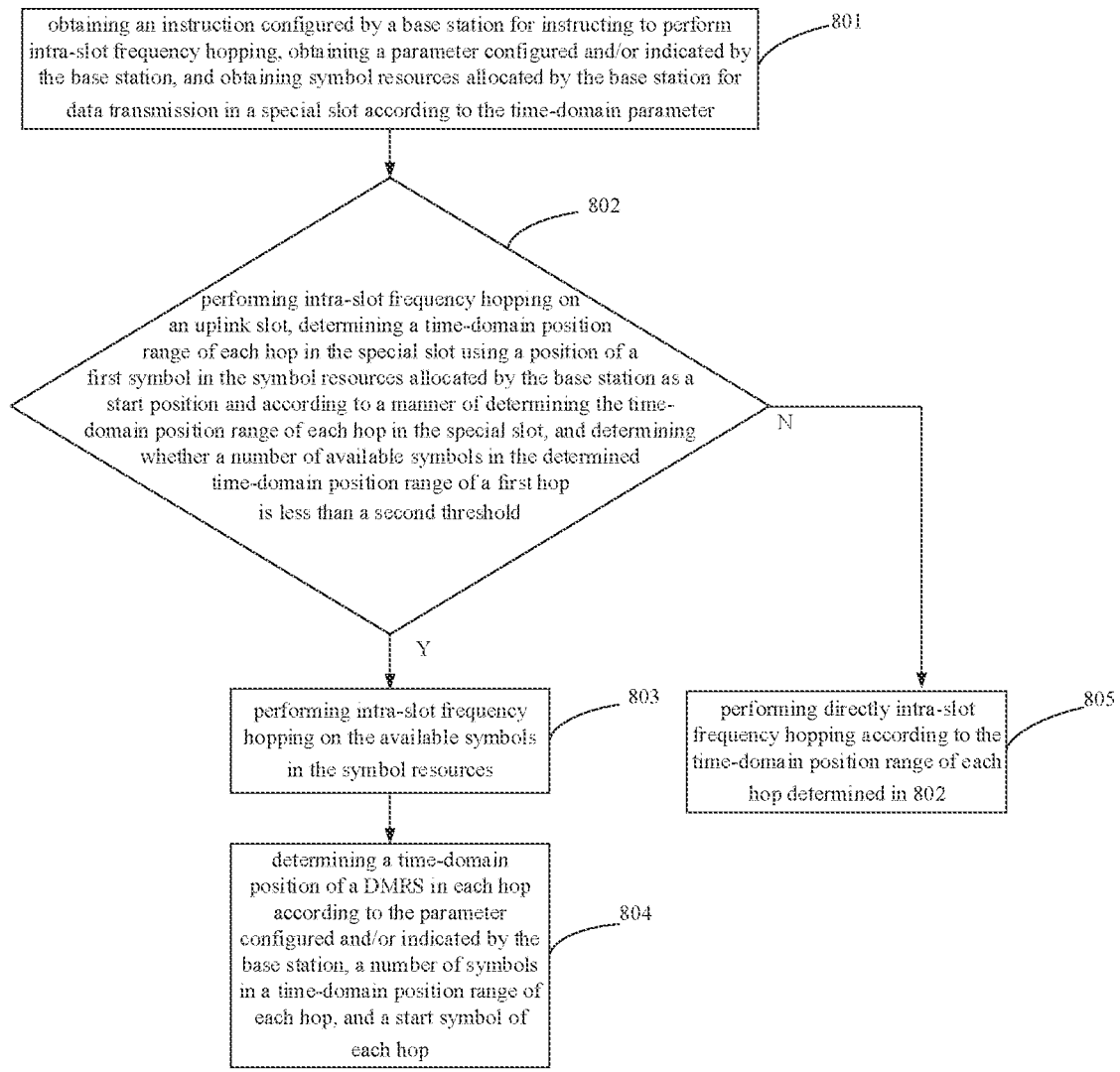
FIG. 8 is a schematic flowchart of a frequency hopping method according to yet other embodiments of the disclosure.

FIG. 8 is a schematic flowchart of another frequency hopping method according to some embodiments of the disclosure. The method is performed by a UE. As illustrated in FIG. 8, the frequency hopping method may include the following steps.

Step 801, an instruction configured by a base station for instructing to perform intra-slot frequency hopping, is obtained, a parameter configured and/or indicated by the base station is obtained, and symbol resources allocated by the base station for data transmission in a special slot are obtained according to the parameter.

Step 802, intra-slot frequency hopping is performed on an uplink slot, available symbols in the special slot are determined, a time-domain position range of each hop in the special slot is determined using a position of a first symbol in the symbol resources allocated by the base station as a start position and according to a manner of determining the time-domain position range of each hop in the uplink slot, it is determined whether a number of available symbols in the determined time-domain position range of a first hop is less than a second threshold, when it is determined that the number of available symbols in the determined time-domain position range of the first hop is less than the second threshold, step 803 is performed, and when it is determined that the number of available symbols in the determined time-domain position range of the first hop is not less than the second threshold, step 806 is performed. For example, in some embodiments of the disclosure, the second threshold may be 2. In some embodiments of the disclosure, the second threshold may be indicated by the base station to the UE. In other embodiments of the disclosure, the second threshold may be determined by the UE according to a protocol.

In some embodiments of the disclosure, when it is determined that the number of available symbols in the determined time-domain position range of the first hop is less than the second threshold, it means the number of available symbols in the time-domain range of the first hop determined according to the manner of determining the time-domain position range of each hop in the uplink slot is smaller, which may cause the uplink TBoMS to be unable to be performed on the currently determined first hop, and step 803 needs to be performed; and when it is determined that the number of available symbols in the determined time-domain position range of the first hop is greater than or equal to the second threshold, it means the number of available symbols in the time-domain range of the first hop determined according to the manner of determining the time-domain position range of each hop in the uplink slot is larger, and data may be transmitted normally on the first hop, so step 806 may be performed.

Step 803, intra-slot frequency hopping is performed on the available symbols in the symbol resources.

Step 804, a time-domain position of a DMRS in each hop is determined according to the parameter configured and/or indicated by the base station, a number of symbols in a time-domain position range of each hop, and a start symbol of each hop.

Step 805, intra-slot frequency hopping is performed according to the time-domain position range of each hop in the special slot determined using the position of the first symbol in the symbol resources as the start position.

For the detailed introduction of steps 801-805, reference may be made to the foregoing embodiments, and the embodiments of the disclosure will not repeat them herein.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 9:
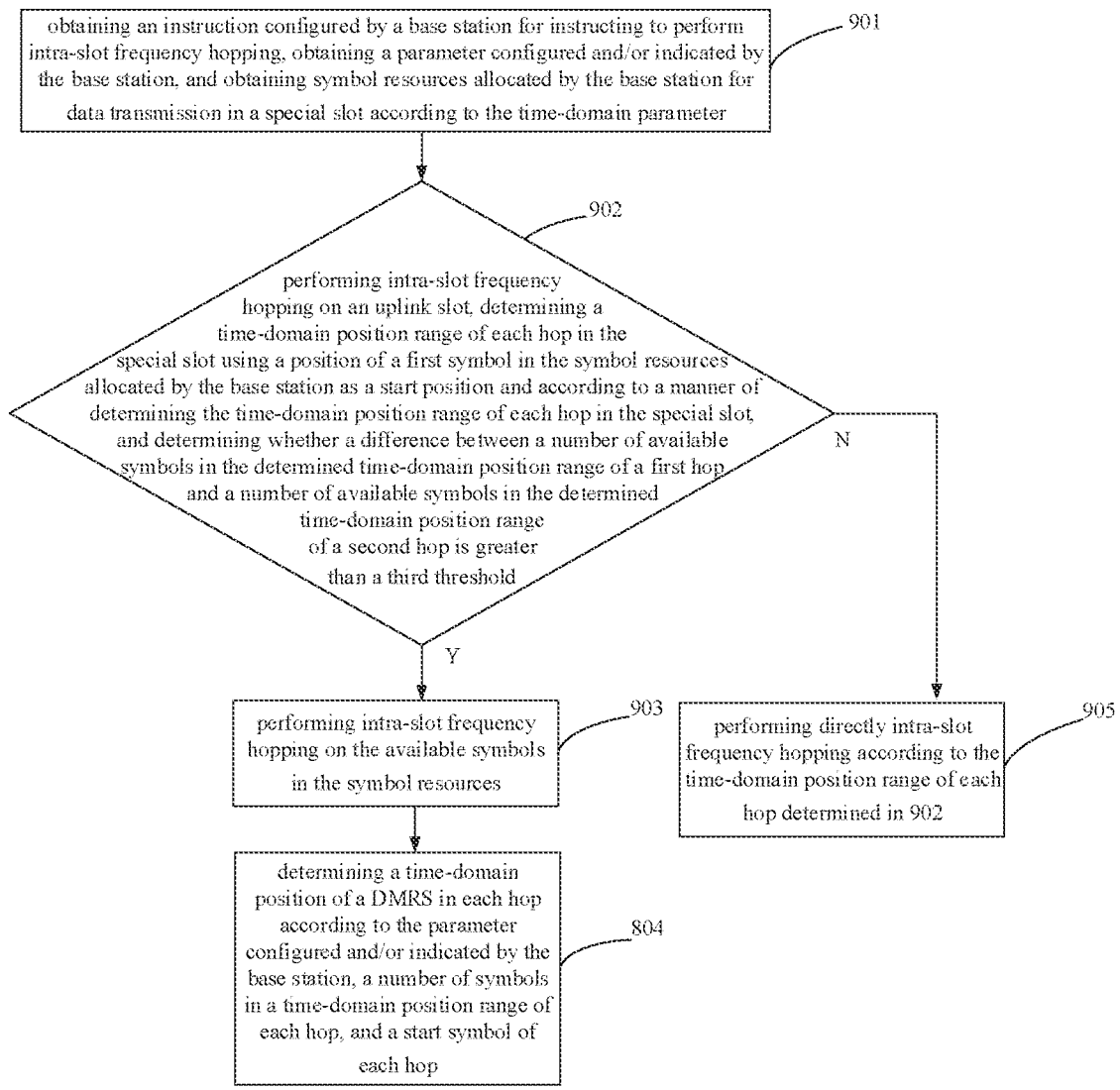
FIG. 9 is a schematic flowchart of a frequency hopping method according to yet other embodiments of the disclosure.

FIG. 9 is a schematic flowchart of another frequency hopping method according to some embodiments of the disclosure. The method is performed by a UE. As illustrated in FIG. 9, the frequency hopping method may include the following steps.

Step 901, an instruction configured by a base station for instructing to perform intra-slot frequency hopping, is obtained, and symbol resources allocated by the base station for data transmission in a special slot, are obtained.

Step 902, intra-slot frequency hopping is performed on an uplink slot, available symbols in the special slot are determined, a time-domain position range of each hop in the special slot is determined using a position of a first symbol in the symbol resources allocated by the base station as a start position according to a manner of determining the time-domain position range of each hop in the uplink slot, it is determined whether a difference between a number of available symbols in the determined time-domain position range of a first hop and a number of available symbols in the determined time-domain position range of a second hop is greater than a third threshold, when it is determined that the difference between the number of available symbols in the determined time-domain position range of the first hop and the number of available symbols in the determined time-domain position range of the second hop is greater than the third threshold, step 903 is performed, and when it is determined that the difference between the number of available symbols in the determined time-domain position range of the first hop and the number of available symbols in the determined time-domain position range of the second hop is not greater than the third threshold, step 904 is performed.

In some embodiments of the disclosure, the third threshold may be indicated by the base station to the UE. In other embodiments of the disclosure, the third threshold may be determined by the UE according to a protocol.

In some embodiments of the disclosure, when it is determined that the difference between the number of available symbols in the determined time-domain position range of the first hop and the number of available symbols in the determined time-domain position range of the second hop is greater than the third threshold, it means the number of available symbols in the time-domain range of the first hop determined according to the manner of determining the time-domain position range of each hop in the uplink slot is smaller, which may cause the uplink TBoMS to be unable to be performed on the currently determined first hop, and step 903 needs to be performed; and when it is determined that the difference between the number of available symbols in the determined time-domain position range of the first hop and the number of available symbols in the determined time-domain position range of the second hop is not greater than the third threshold, it means the number of available symbols in the time-domain range of the first hop determined according to the manner of determining the time-domain position range of each hop in the uplink slot is larger, and data may be transmitted normally on the first hop, so step 904 may be performed.

Step 903, intra-slot frequency hopping is performed on the available symbols in the symbol resources.

Step 904, a time-domain position of a DMRS in each hop is determined according to the parameter configured and/or indicated by the base station, a number of symbols in a time-domain position range of each hop, and a start symbol of each hop.

Step 905, intra-slot frequency hopping is performed according to the time-domain position range of each hop in the special slot determined using the position of the first symbol in the symbol resources as the start position.

For the detailed introduction of steps 901-905, reference may be made to the foregoing embodiments, and the embodiments of the disclosure will not repeat them herein.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 10:
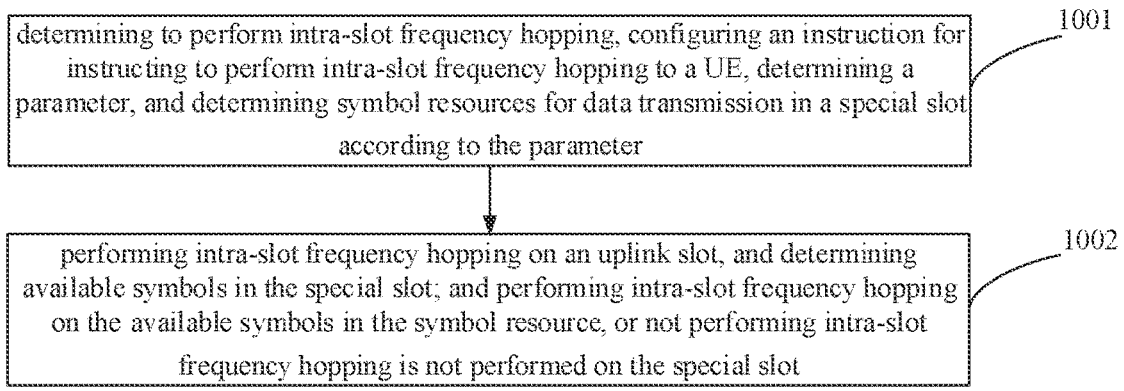
FIG. 10 is a schematic flowchart of a frequency hopping method according to yet other embodiments of the disclosure.

FIG. 10 is a schematic flowchart of a frequency hopping method according to some embodiments of the disclosure. The method is performed by a base station. As illustrated in FIG. 10, the frequency hopping method may include the following steps.

Step 1001, it determines to perform intra-slot frequency hopping, an instruction for instructing to perform intra-slot frequency hopping is configured to a UE, a parameter is determined, and symbol resources for data transmission in a special slot are determined according to the parameter.

In some embodiments of the disclosure, the parameter may include at least one of: a PUSCH mapping type, a symbol length for data transmission in the special slot, a start symbol position for data transmission in the special slot, a DMRS-additional position, a number of DMRS ports, whether to enable intra-slot frequency hopping, or a DMRS-type A position. In some embodiments of the disclosure, the PUSCH mapping types include type A and type B.

In some embodiments of the disclosure, the symbol resources allocated by the base station for data transmission in the special slot may be symbol resources for uplink TBoMS in the special slot. In some embodiments of the disclosure, the symbol resources for uplink TBoMS may include a start symbol position S and a symbol length L, and the symbol resources for uplink TBoMS may be symbols with positions between [S, S+L−1] in the special slot.

For the specific manner of determining the symbol resources for data transmission in the special slot according to the parameter, reference may be made to the foregoing embodiments, and details are not described herein in the embodiments of the disclosure.

Step 1002, intra-slot frequency hopping is performed on an uplink slot, and available symbols in the special slot are determined; and intra-slot frequency hopping is performed on the available symbols in the symbol resource, or intra-slot frequency hopping is not performed on the special slot.

In some embodiments of the disclosure, the manner for determining the available symbols in the special slot may include: determining unavailable symbol(s) in the special slot according to an SFI dynamic indication signaling and/or a semi-static slot format configuration signaling and/or other dynamic indication signaling and/or other RRC configuration signaling, sent by the base station, and determining that the available symbols are symbols in the special slot other than the unavailable symbol(s).

In some embodiments of the disclosure, the unavailable symbol(s) may include at least one of:

a guard symbol for downlink to uplink switching;
a downlink symbol for downlink transmission;
a symbol for SSB transmission;
a symbol allocated for a CSS;
a symbol occupied by a CI; or
a symbol for service transmission with a higher priority than current data transmission.

In some embodiments of the disclosure, when a certain symbol in the special slot satisfies any of the above conditions, it is determined that the symbol is the unavailable symbol.

It should be noted that, in some embodiments of the disclosure, the time-domain resources allocated by the base station in step 1001 above may include unavailable symbol(s). In other embodiments of the disclosure, the time-domain resources allocated by the base station in step 1001 above may not include unavailable symbol(s).

In some embodiments of the disclosure, when intra-slot frequency hopping is performed on the uplink slot, intra-slot frequency hopping may be performed on the available symbols in the symbol resources only. In other embodiments of the disclosure, when intra-slot frequency hopping is performed on the uplink slot, intra-slot frequency hopping may not be performed on the special slot.

It should also be noted that, in some embodiments of the disclosure, when intra-slot frequency hopping is not performed on the special slot, the frequency-domain position of the special slot is the same as the frequency-domain position of any hop in the uplink slot. For example, in some embodiments of the disclosure, the frequency-domain position of the special slot may be the same as the frequency-domain position of the second hop in the uplink slot.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 11:
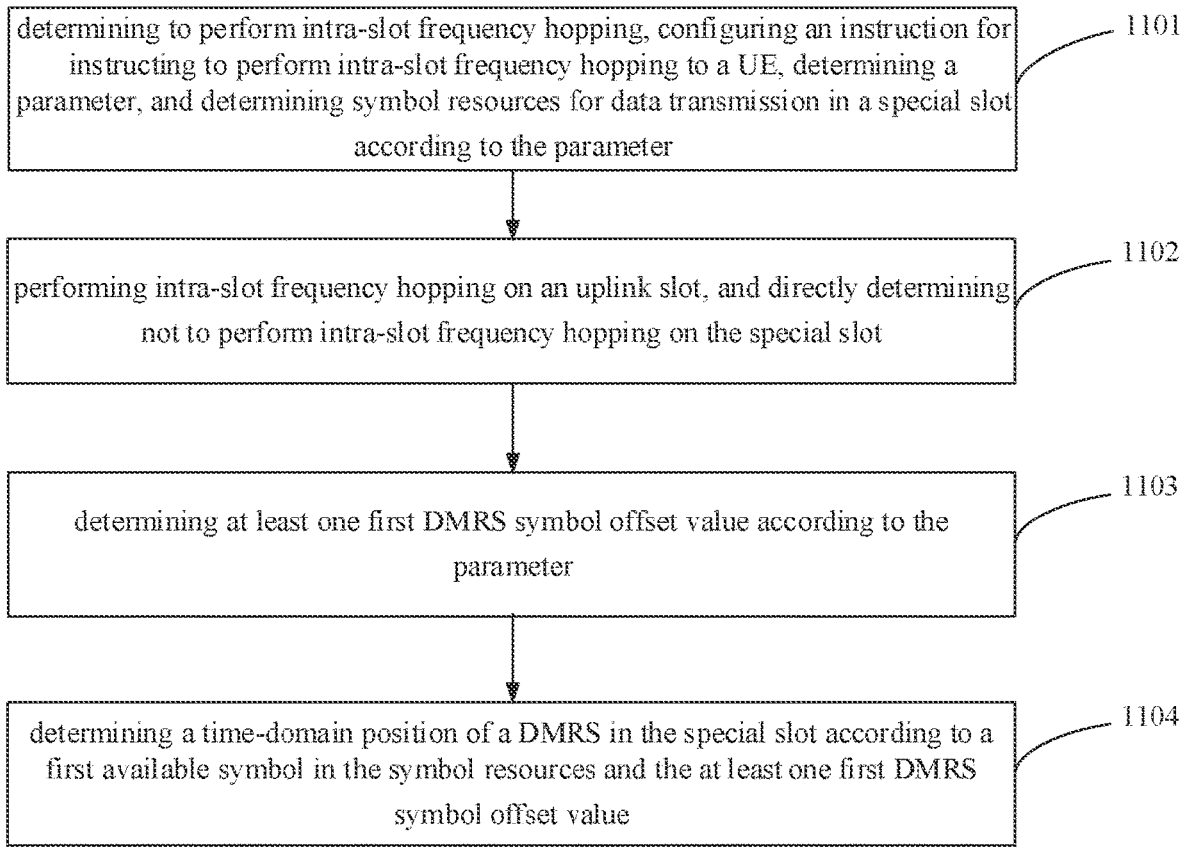
FIG. 11 is a schematic flowchart of a frequency hopping method according to yet other embodiments of the disclosure.

FIG. 11 is a schematic flowchart of another frequency hopping method according to some embodiments of the disclosure. The method is performed by a base station. As illustrated in FIG. 11, the frequency hopping method may include the following steps.

Step 1101, it determines to perform intra-slot frequency hopping, an instruction for instructing to perform intra-slot frequency hopping is configured to a UE, a parameter is determined, and symbol resources for data transmission in a special slot are determined according to the parameter.

Step 1102, intra-slot frequency hopping is performed on an uplink slot, and it directly determines not to perform intra-slot frequency hopping on the special slot.

Step 1103, at least one first DMRS symbol offset value is determined according to the parameter.

Step 1104, a time-domain position of a DMRS in the special slot is determined according to a first available symbol in the symbol resources and the at least one first DMRS symbol offset value.

In some embodiments of the disclosure, the manner for the base station to determine the time-domain position of the DMRS in the special slot is the same as the manner for the UE to determine the time-domain position of the DMRS in the special slot. Moreover, in some embodiments of the disclosure, when the base station determines the time-domain position of the DMRS in the special slot, it may receive and demodulate the DMRS according to the time-domain position of the DMRS.

For the detailed introduction of steps 1101-1104, reference may be made to the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 12:
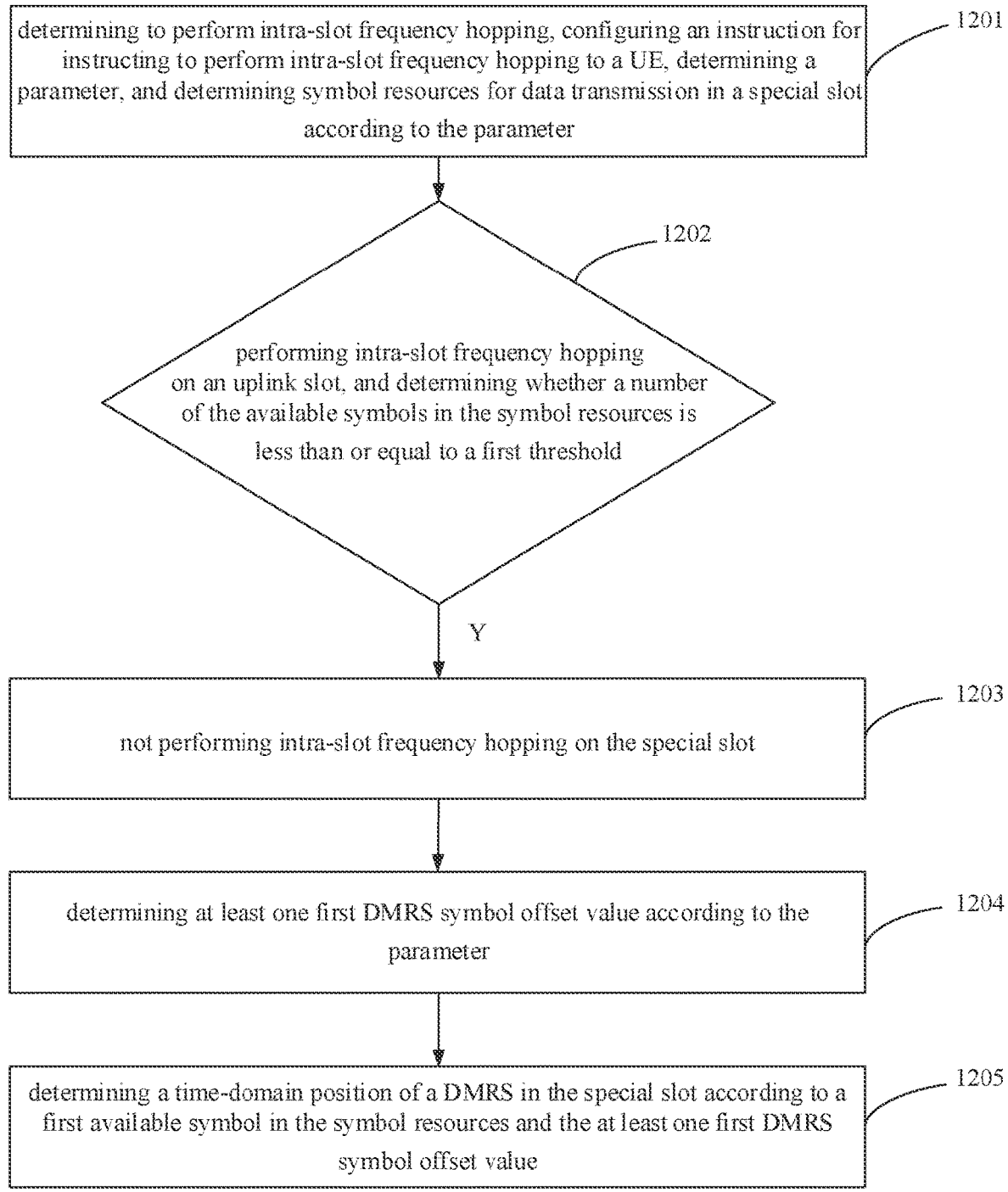
FIG. 12 is a schematic flowchart of a frequency hopping method according to yet other embodiments of the disclosure.

FIG. 12 is a schematic flowchart of another frequency hopping method according to some embodiments of the disclosure. The method is performed by a base station. As illustrated in FIG. 12, the frequency hopping method may include the following steps.

Step 1201, it determines to perform intra-slot frequency hopping, an instruction for instructing to perform intra-slot frequency hopping is configured to a UE, a parameter is determined, and symbol resources for data transmission in a special slot are determined according to the parameter.

Step 1202, intra-slot frequency hopping is performed on an uplink slot, available symbols in the special slot are determined, it is determined whether a number of the available symbols in the symbol resources is less than or equal to a first threshold, and when the number of the available symbols is less than or equal to the first threshold, step 1203 is performed.

Step 1203, intra-slot frequency hopping is not performed on the special slot.

Step 1204, at least one first DMRS symbol offset value is determined according to the parameter.

Step 1205, a time-domain position of a DMRS in the special slot is determined according to a first available symbol in the symbol resources and the at least one first DMRS symbol offset value.

For the detailed introduction of steps 1201-1205, reference may be made to the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 13:
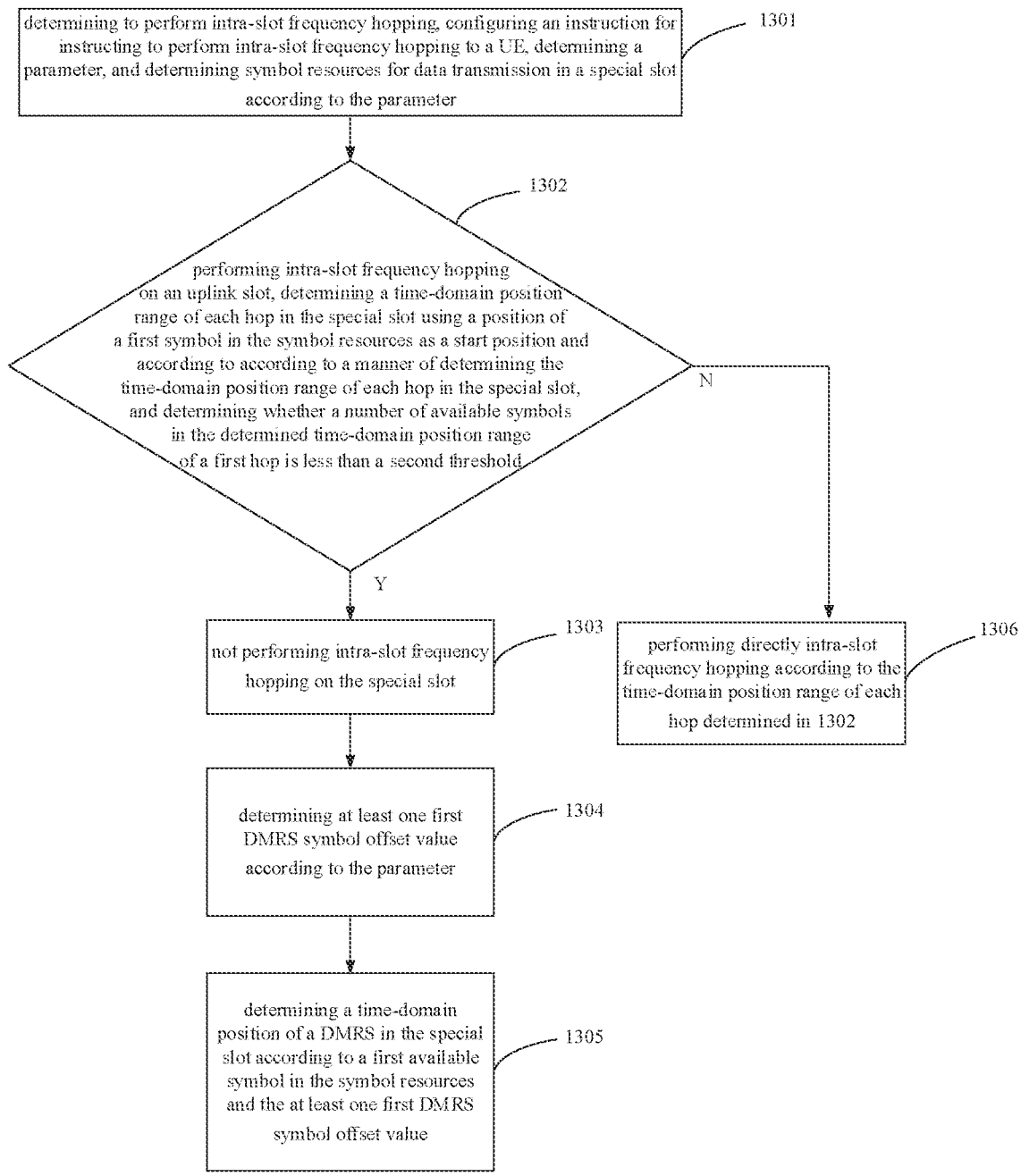
FIG. 13 is a schematic flowchart of a frequency hopping method according to yet other embodiments of the disclosure.

FIG. 13 is a schematic flowchart of another frequency hopping method according to some embodiments of the disclosure. The method is performed by a base station. As illustrated in FIG. 13, the frequency hopping method may include the following steps.

Step 1301, it determines to perform intra-slot frequency hopping, an instruction for instructing to perform intra-slot frequency hopping is configured to a UE, a parameter is determined, and symbol resources for data transmission in a special slot are determined according to the parameter.

Step 1302, intra-slot frequency hopping is performed on an uplink slot, available symbols in the special slot are determined, a time-domain position range of each hop in the special slot is determined using a position of a first symbol in the symbol resources as a start position and according to a time-domain position range determining manner for each hop in the uplink slot (that is, according to a manner of determining the time-domain position range of each hop in the uplink slot), it is determined whether a number of available symbols in the determined time-domain position range of a first hop is less than a second threshold, and when the number of available symbols in the determined time-domain position range of the first hop is less than the second threshold; and when the number of available symbols in the determined time-domain position range of the first hop is not less than the second threshold, step 1306 may be performed.

Step 1303, intra-slot frequency hopping on the special slot is not performed.

Step 1304, at least one first DMRS symbol offset value is determined according to the parameter.

Step 1305, a time-domain position of a DMRS in the special slot is determined according to a first available symbol in the symbol resources and the at least one first DMRS symbol offset value.

Step 1306, intra-slot frequency hopping is performed according to the time-domain position range of each hop in the special slot determined using the position of the first symbol in the symbol resources as the start position.

For the detailed introduction of steps 1301-1306, reference may be made to the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 14:
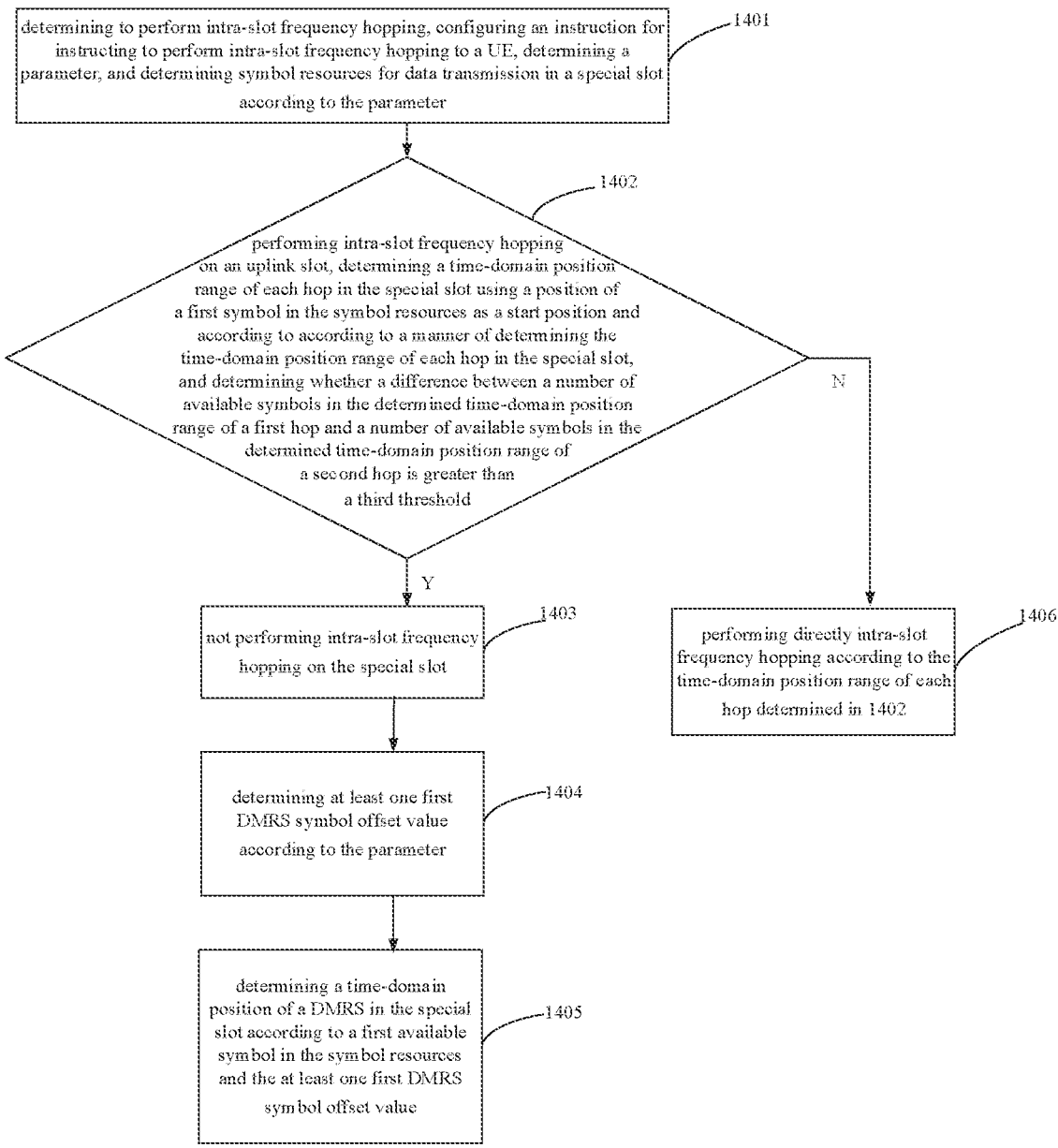
FIG. 14 is a schematic flowchart of a frequency hopping method according to yet other embodiments of the disclosure.

FIG. 14 is a schematic flowchart of another frequency hopping method according to some embodiments of the disclosure. The method is performed by a base station. As illustrated in FIG. 14, the frequency hopping method may include the following steps.

Step 1401, it determines to perform intra-slot frequency hopping, an instruction for instructing to perform intra-slot frequency hopping is configured to a UE, a parameter is determined, and symbol resources for data transmission in a special slot are determined according to the parameter.

Step 1402, intra-slot frequency hopping is performed on an uplink slot, available symbols in the special slot are determined, a time-domain position range of each hop in the special slot is determined using a position of a first symbol in the symbol resources as a start position and according to a manner of determining the time-domain position range of each hop in the uplink slot, it is determined whether a difference between a number of available symbols in the determined time-domain position range of a first hop and a number of available symbols in the determined time-domain position range of a second hop is greater than a third threshold, when it is determined the difference between the number of available symbols in the determined time-domain position range of the first hop and the number of available symbols in the determined time-domain position range of the second hop is greater than the third threshold, step 1403 is performed, and when it is determined the difference between the number of available symbols in the determined time-domain position range of the first hop and the number of available symbols in the determined time-domain position range of the second hop is not greater than the third threshold, step 1406 is performed.

Step 1403, intra-slot frequency hopping on the special slot is not performed.

Step 1404, at least one first DMRS symbol offset value is determined according to the parameter.

Step 1405, a time-domain position of a DMRS in the special slot is determined according to a first available symbol in the symbol resources and the at least one first DMRS symbol offset value.

Step 1406, intra-slot frequency hopping is performed according to the time-domain position range of each hop in the special slot determined using the position of the first symbol in the symbol resources as the start position.

For the detailed introduction of steps 1401-1406, reference may be made to the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 15:
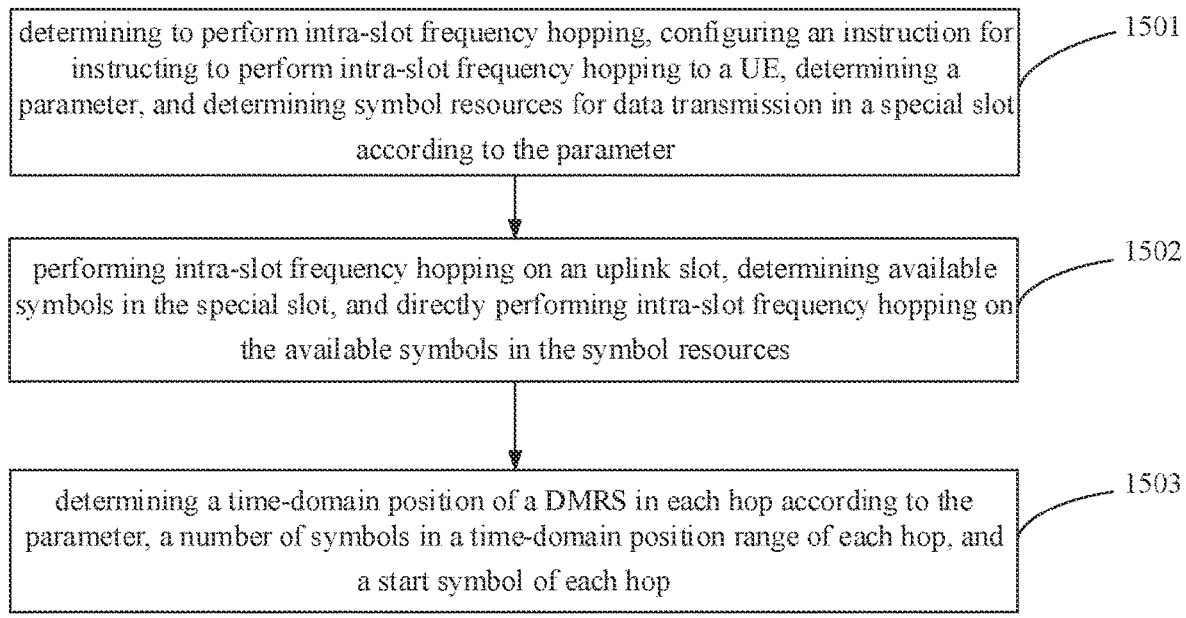
FIG. 15 is a schematic flowchart of a frequency hopping method according to yet other embodiments of the disclosure.

FIG. 15 is a schematic flowchart of another frequency hopping method according to some embodiments of the disclosure. The method is performed by a base station. As illustrated in FIG. 15, the frequency hopping method may include the following steps.

Step 1501, it determines to perform intra-slot frequency hopping, an instruction for instructing to perform intra-slot frequency hopping is configured to a UE, a parameter is determined, and symbol resources for data transmission in a special slot are determined according to the parameter.

Step 1502, intra-slot frequency hopping is performed on an uplink slot, available symbols in the special slot are determined, and intra-slot frequency hopping is directly performed on the available symbols in the symbol resources.

In some embodiments of the disclosure, the manner for the base station to perform intra-slot frequency hopping on the available symbols in the symbol resources is the same as the manner for the UE to perform intra-slot frequency hopping on the available symbols in the symbol resources.

Step 1503, a time-domain position of a DMRS in each hop is determined according to the parameter, a number of symbols in a time-domain position range of each hop, and a start symbol of each hop.

For the detailed introduction of steps 1501-1503, reference may be made to the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 16:
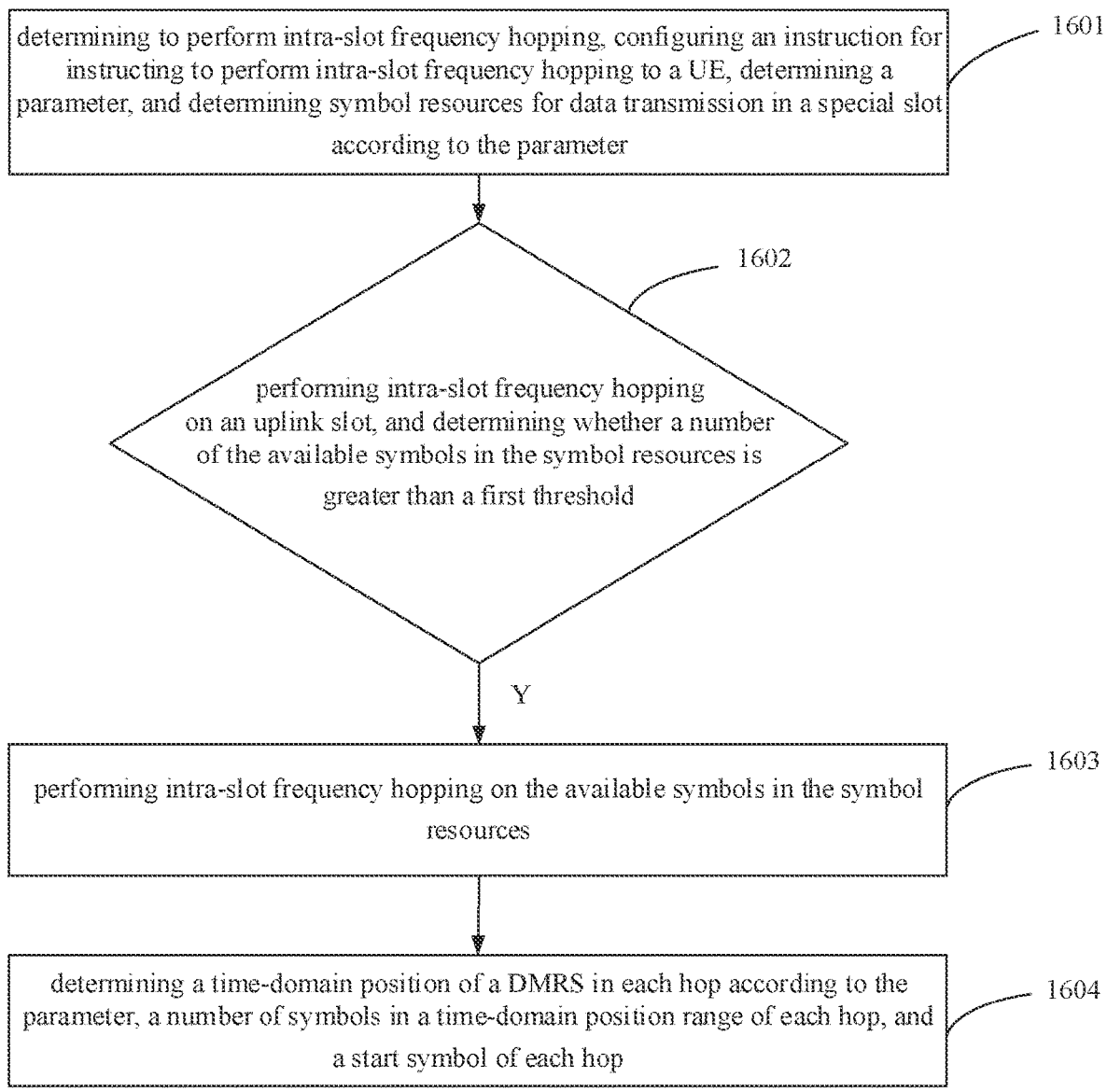
FIG. 16 is a schematic flowchart of a frequency hopping method according to yet other embodiments of the disclosure.

FIG. 16 is a schematic flowchart of another frequency hopping method according to some embodiments of the disclosure. The method is performed by a base station. As illustrated in FIG. 16, the frequency hopping method may include the following steps.

Step 1601, it determines to perform intra-slot frequency hopping, an instruction for instructing to perform intra-slot frequency hopping is configured to a UE, a parameter is determined, and symbol resources for data transmission in a special slot are determined according to the parameter.

Step 1602, intra-slot frequency hopping is performed on an uplink slot, available symbols in the special slot are determined, it is determined whether a number of the available symbols in the symbol resources allocated by the base station is greater than a first threshold, and when the number of the available symbols in the symbol resources is greater than the first threshold, step 1603 may be performed.

Step 1603, intra-slot frequency hopping is performed on the available symbols in the symbol resources.

Step 1604, a time-domain position of a DMRS in each hop is determined according to the parameter, a number of symbols in a time-domain position range of each hop, and a start symbol of each hop.

For the detailed introduction of steps 1601-1604, reference may be made to the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 17:
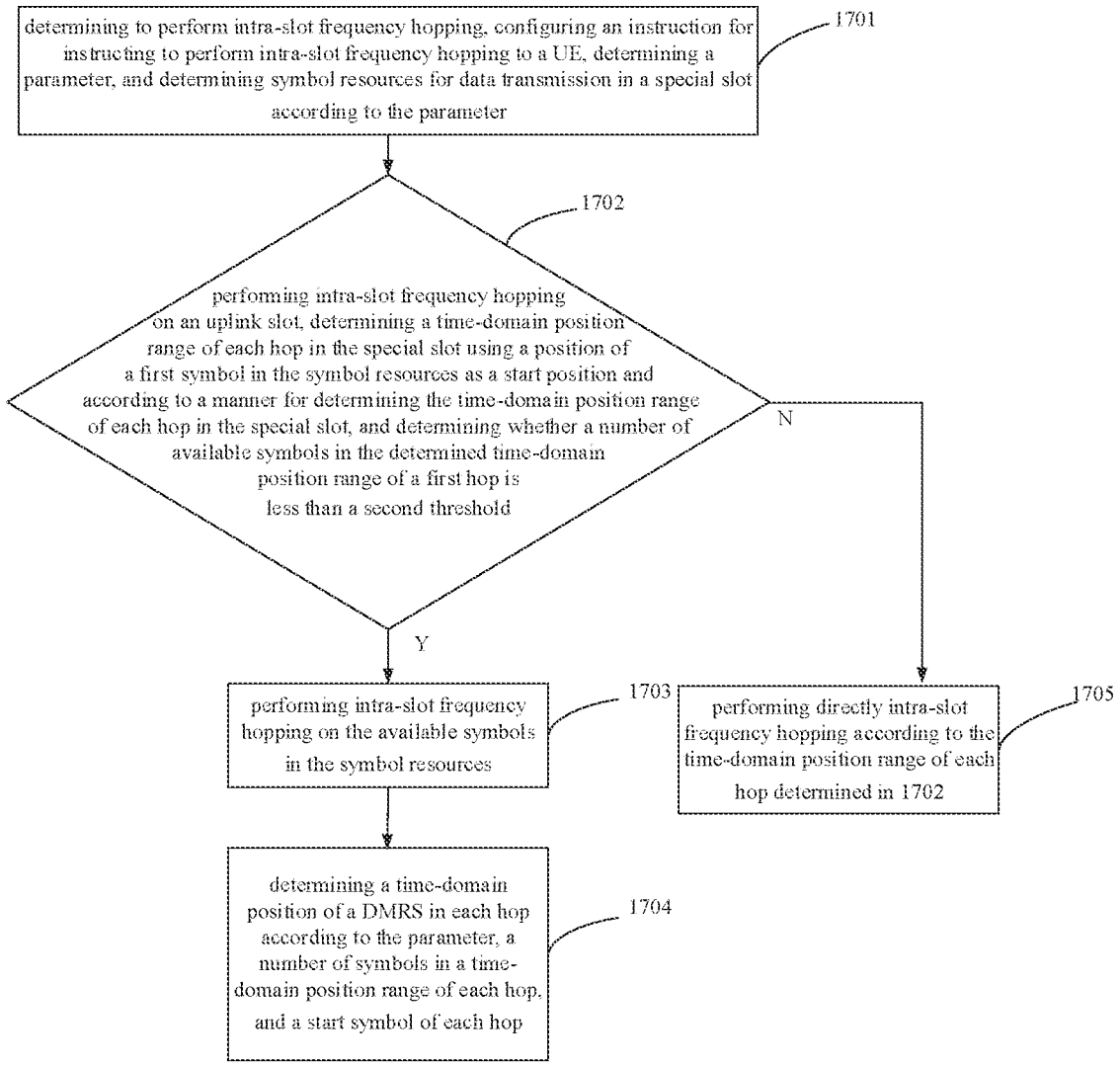
FIG. 17 is a schematic flowchart of a frequency hopping method according to yet other embodiments of the disclosure.

FIG. 17 is a schematic flowchart of another frequency hopping method according to some embodiments of the disclosure. The method is performed by a base station. As illustrated in FIG. 17, the frequency hopping method may include the following steps.

Step 1701, it determines to perform intra-slot frequency hopping, an instruction for instructing to perform intra-slot frequency hopping is configured to a UE, a parameter is determined, and symbol resources for data transmission in a special slot are determined according to the parameter.

Step 1702, intra-slot frequency hopping is performed on an uplink slot, available symbols in the special slot are determined, a time-domain position range of each hop in the special slot is determined using a position of a first symbol in the symbol resources as a start position and according to a manner for determining the time-domain position range of each hop in the uplink slot, it is determined whether a number of available symbols in the determined time-domain position range of a first hop is less than a second threshold, when it is determined that the number of available symbols in the determined time-domain position range of the first hop is less than the second threshold, step 1703 is performed, and when it is determined that the number of available symbols in the determined time-domain position range of the first hop is not less than the second threshold, step 1705 is performed.

Step 1703, intra-slot frequency hopping is performed on the available symbols in the symbol resources.

Step 1704, a time-domain position of a DMRS in each hop is determined according to the parameter, a number of symbols in a time-domain position range of each hop, and a start symbol of each hop.

Step 1705, intra-slot frequency hopping is performed according to the time-domain position range of each hop in the special slot determined using the position of the first symbol in the symbol resources as the start position.

For the detailed introduction of steps 1701-1705, reference may be made to the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 18:
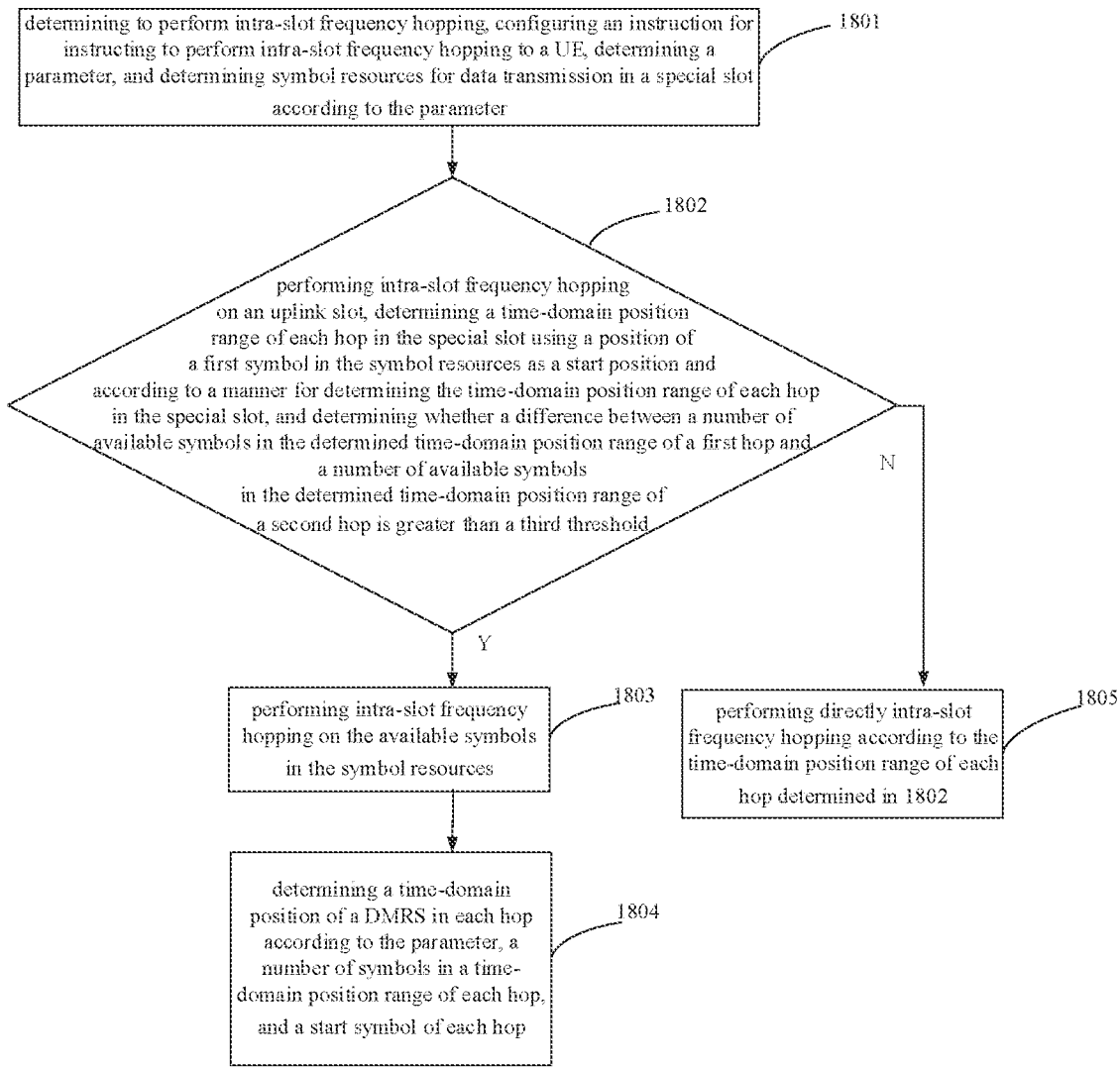
FIG. 18 is a schematic flowchart of a frequency hopping method according to yet other embodiments of the disclosure.

FIG. 18 is a schematic flowchart of another frequency hopping method according to some embodiments of the disclosure. The method is performed by a base station. As illustrated in FIG. 18, the frequency hopping method may include the following steps.

Step 1801, it determines to perform intra-slot frequency hopping, an instruction for instructing to perform intra-slot frequency hopping is configured to a UE, a parameter is determined, and symbol resources for data transmission in a special slot are determined according to the parameter.

Step 1802, intra-slot frequency hopping is performed on an uplink slot, available symbols in the special slot are determined, a time-domain position range of each hop in the special slot is determined using a position of a first symbol in the symbol resources as a start position and according to a manner for determining the time-domain position range of each hop in the uplink slot, it is determined whether a difference between a number of available symbols in the determined time-domain position range of a first hop and a number of available symbols in the determined time-domain position range of a second hop is greater than a third threshold, when it is determined that the difference between the number of available symbols in the determined time-domain position range of the first hop and the number of available symbols in the determined time-domain position range of the second hop is greater than the third threshold, step 1803 is performed, and when it is determined that the difference between the number of available symbols in the determined time-domain position range of the first hop and the number of available symbols in the determined time-domain position range of the second hop is not greater than the third threshold, step 1805 is performed.

Step 1803, intra-slot frequency hopping is performed on the available symbols in the symbol resources.

Step 1804, a time-domain position of a DMRS in each hop is determined according to the parameter, a number of symbols in a time-domain position range of each hop, and a start symbol of each hop.

Step 1805, intra-slot frequency hopping is performed according to the time-domain position range of each hop in the special slot determined using the position of the first symbol in the symbol resources as the start position.

For the detailed introduction of steps 1801-1805, reference may be made to the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 19:
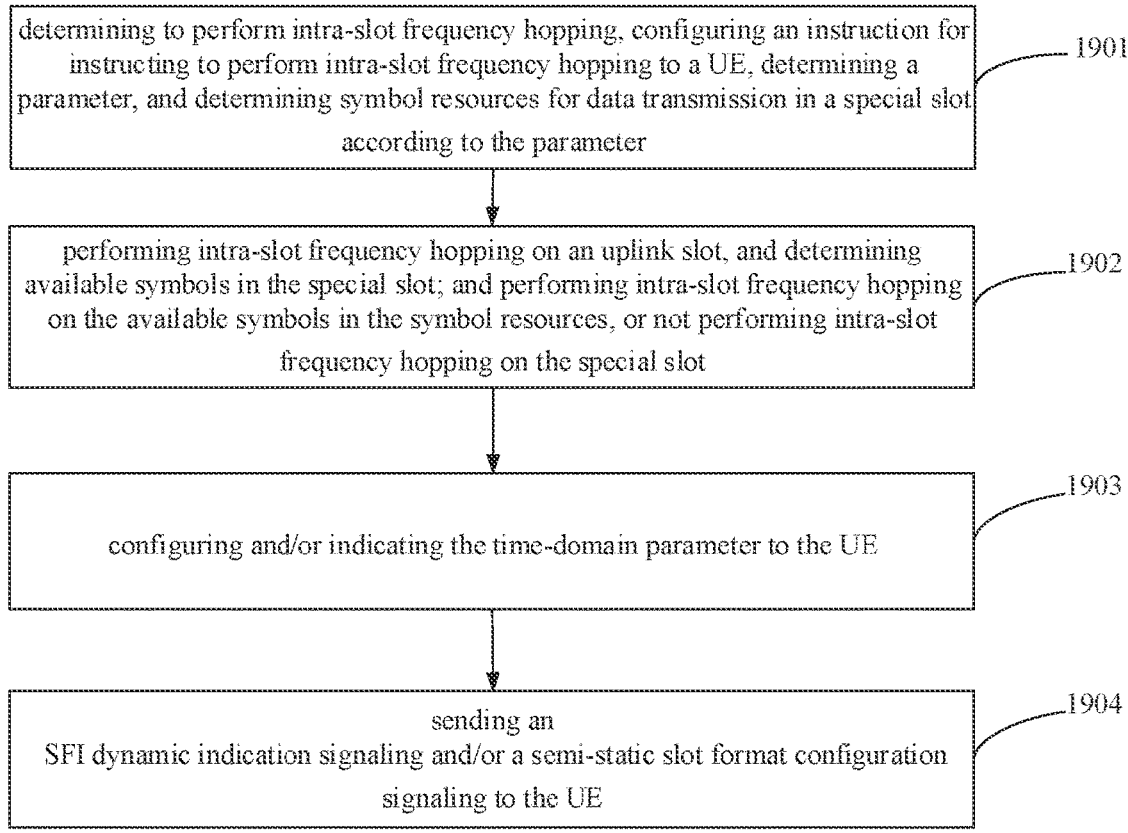
FIG. 19 is a schematic flowchart of a frequency hopping method according to yet other embodiments of the disclosure.

FIG. 19 is a schematic flowchart of another frequency hopping method according to some embodiments of the disclosure. The method is performed by a base station. As illustrated in FIG. 19, the frequency hopping method may include the following steps.

Step 1901, it determines to perform intra-slot frequency hopping, an instruction for instructing to perform intra-slot frequency hopping is configured to a UE, a parameter is determined, and symbol resources for data transmission in a special slot are determined according to the parameter.

Step 1902, intra-slot frequency hopping on an uplink slot is performed, available symbols in the special slot are determined, and intra-slot frequency hopping is performed on the available symbols in the symbol resource, or intra-slot frequency hopping is not performed on the special slot.

Step 1903, the parameter is configured and/or indicated to the UE.

In some embodiments of the disclosure, the base station may configure the parameter for the UE. In other embodiments of the disclosure, the base station may indicate the parameter to the UE. In yet other embodiments of the disclosure, the base station may configure and indicate the parameter to the UE.

For the detailed introduction of steps 1901-1903, reference may be made to relevant introductions in the foregoing embodiments, and the embodiments of the disclosure will not repeat them herein.

Step 1904, an SFI dynamic indication signaling and/or a semi-static slot format configuration signaling is sent to the UE.

In some embodiments of the disclosure, the base station may send the SFI dynamic indication signaling and/or the semi-static slot format configuration signaling to the UE, so that the UE may determine unavailable symbol(s) and available symbols in the special slot according to the SFI dynamic indication signaling and/or the semi-static slot format configuration signaling sent by the base station.

In some embodiments of the disclosure, the base station may send the SFI dynamic indication signaling to the UE. In other embodiments of the disclosure, the base station may send the semi-static slot format configuration signaling to the UE. In yet other embodiments of the disclosure, the base station may send the SFI dynamic indication signaling and the semi-static slot format configuration signaling to the UE.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 20:
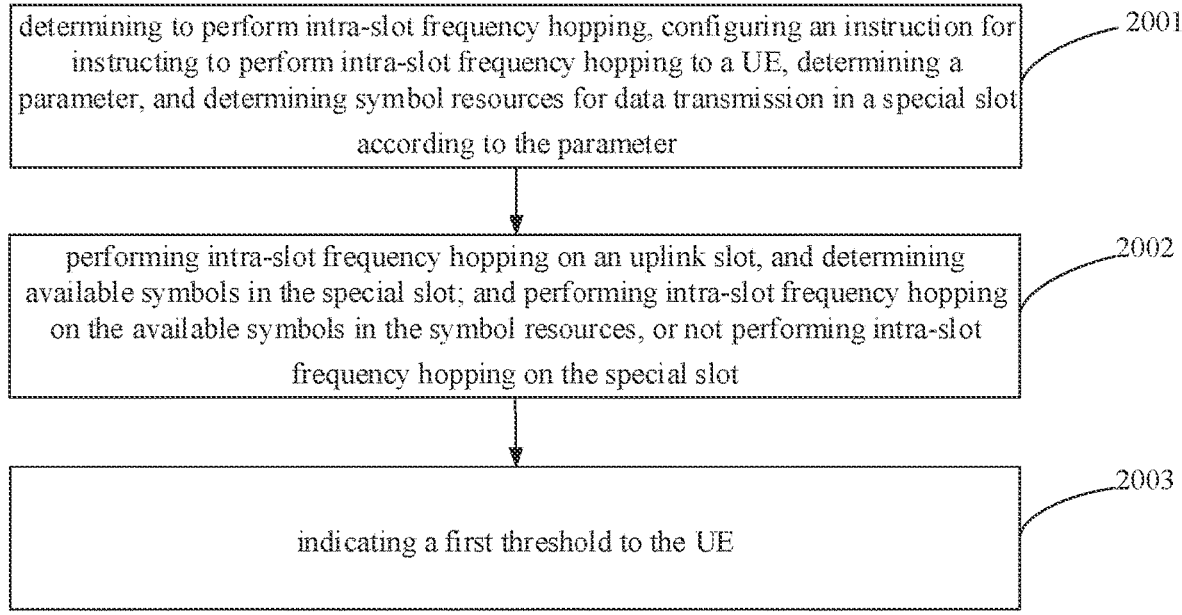
FIG. 20 is a schematic flowchart of a frequency hopping method according to yet other embodiments of the disclosure.

FIG. 20 is a schematic flowchart of another frequency hopping method according to some embodiments of the disclosure. The method is performed by a base station. As illustrated in FIG. 20, the frequency hopping method may include the following steps.

Step 2001, it determines to perform intra-slot frequency hopping, an instruction for instructing to perform intra-slot frequency hopping is configured to a UE, a parameter is determined, and symbol resources for data transmission in a special slot are determined according to the parameter.

Step 2002, intra-slot frequency hopping on an uplink slot is performed, available symbols in the special slot are determined, and intra-slot frequency hopping is performed on the available symbols in the symbol resource, or intra-slot frequency hopping is not performed on the special slot.

Step 2003, a first threshold is indicated to the UE.

For the detailed introduction of steps 2001 to 2003, reference may be made to relevant introductions in the above-mentioned embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 21:
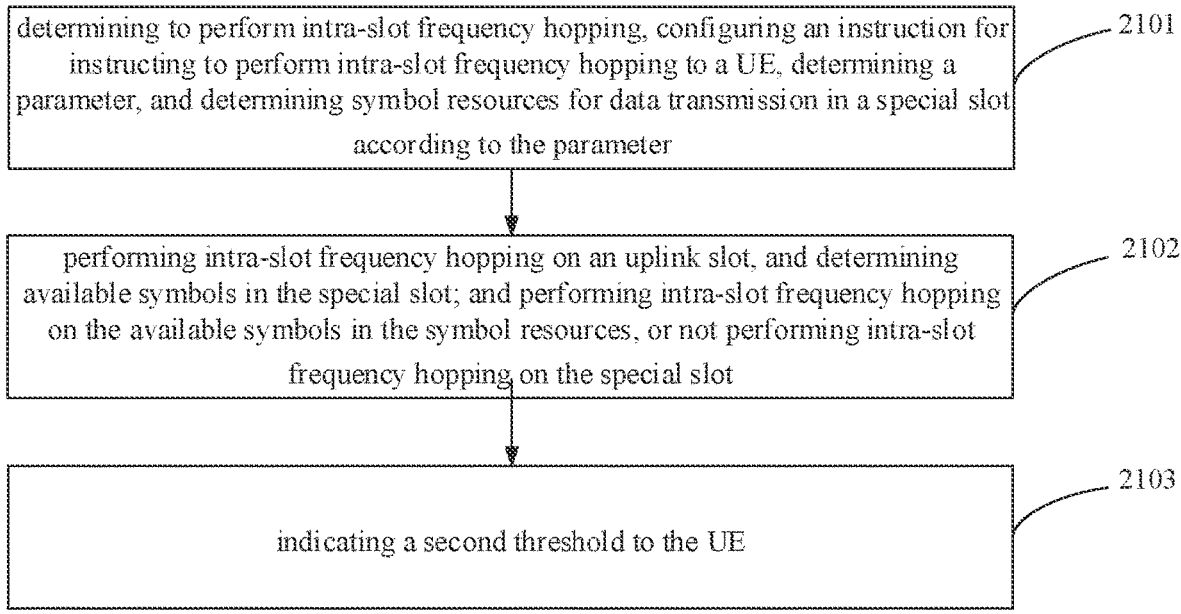
FIG. 21 is a schematic flowchart of a frequency hopping method according to yet other embodiments of the disclosure.

FIG. 21 is a schematic flowchart of another frequency hopping method according to some embodiments of the disclosure. The method is performed by a base station. As illustrated in FIG. 21, the frequency hopping method may include the following steps.

Step 2101, it determines to perform intra-slot frequency hopping, an instruction for instructing to perform intra-slot frequency hopping is configured to a UE, a parameter is determined, and symbol resources for data transmission in a special slot are determined according to the parameter.

Step 2102, intra-slot frequency hopping on an uplink slot is performed, available symbols in the special slot are determined, and intra-slot frequency hopping is performed on the available symbols in the symbol resource, or intra-slot frequency hopping is not performed on the special slot.

Step 2103, a second threshold is indicated to the UE.

For the detailed introduction of steps 2101 to 2103, reference may be made to relevant introductions in the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 22:
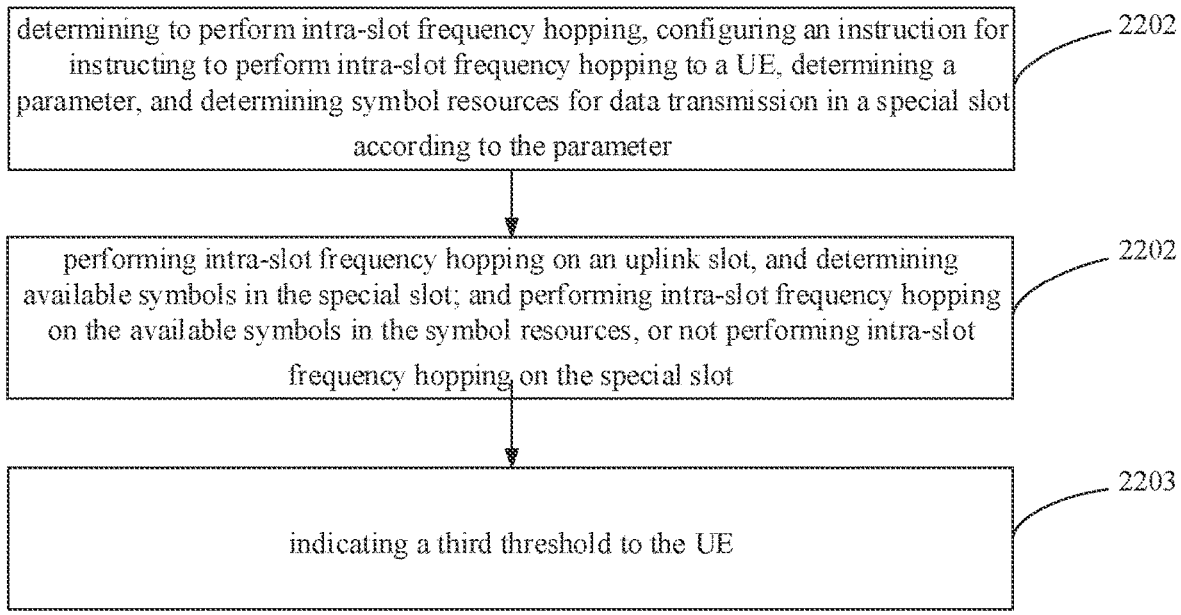
FIG. 22 is a schematic flowchart of a frequency hopping method according to yet other embodiments of the disclosure.

FIG. 22 is a schematic flowchart of another frequency hopping method according to some embodiments of the disclosure. The method is performed by a base station. As illustrated in FIG. 22, the frequency hopping method may include the following steps.

Step 2201, it determines to perform intra-slot frequency hopping, an instruction for instructing to perform intra-slot frequency hopping is configured to a UE, a parameter is determined, and symbol resources for data transmission in a special slot are determined according to the parameter.

Step 2202, intra-slot frequency hopping on an uplink slot is performed, available symbols in the special slot are determined, and intra-slot frequency hopping is performed on the available symbols in the symbol resource, or intra-slot frequency hopping is not performed on the special slot.

Step 2203, a third threshold is indicated to the UE.

For the detailed introduction of steps 2201 to 2203, reference may be made to relevant introductions in the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 23:
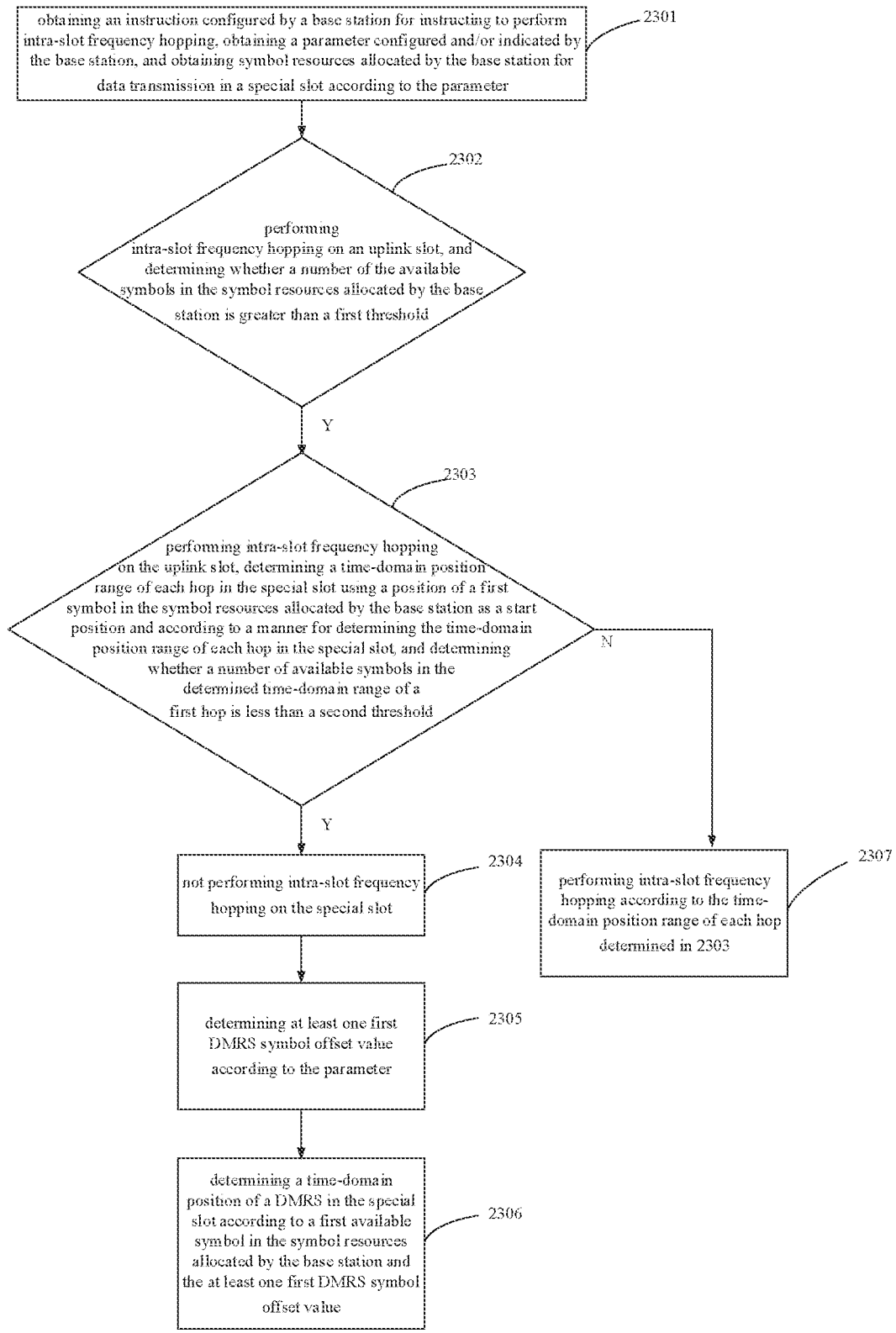
FIG. 23 is a schematic flowchart of a frequency hopping method according to yet other embodiments of the disclosure.

FIG. 23 is a schematic flowchart of another frequency hopping method according to some embodiments of the disclosure. The method is performed by a UE. As illustrated in FIG. 23, the frequency hopping method may include the following steps.

Step 2301, an instruction configured by a base station for instructing to perform intra-slot frequency hopping is obtained, a parameter configured and/or indicated by the base station is obtained, and symbol resources allocated by the base station for data transmission in a special slot are obtained according to the parameter.

Step 2302, intra-slot frequency hopping is performed on an uplink slot, available symbols in the special slot are determined, and it is determined whether a number of the available symbols in the symbol resources allocated by the base station is greater than a first threshold, and if so, step 2303 is performed.

Step 2303, intra-slot frequency hopping is performed on the uplink slot, available symbols in the special slot are determined, a time-domain position range of each hop in the special slot is determined using a position of a first symbol in the symbol resources allocated by the base station as a start position and according to a manner for determining the time-domain position range of each hop in the uplink slot, it is determined whether a number of available symbols in the determined time-domain range of a first hop is less than a second threshold, and if so, step 2304 is performed, otherwise, step 2307 is performed.

Step 2304, intra-slot frequency hopping is not performed on the special slot.

Step 2305, at least one first DMRS symbol offset value is determined according to a parameter configured and/or indicated by the base station.

Step 2306, a time-domain position of a DMRS in the special slot is determined according to a first available symbol in the symbol resources allocated by the base station and the at least one first DMRS symbol offset value.

Step 2307, intra-slot frequency hopping is performed according to the time-domain position range of each hop in the special slot determined using the position of the first symbol in the symbol resources as the start position.

For the detailed introduction of steps 2301-2307, reference may be made to the foregoing embodiments, and the embodiments of the disclosure will not repeat them herein.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 24:
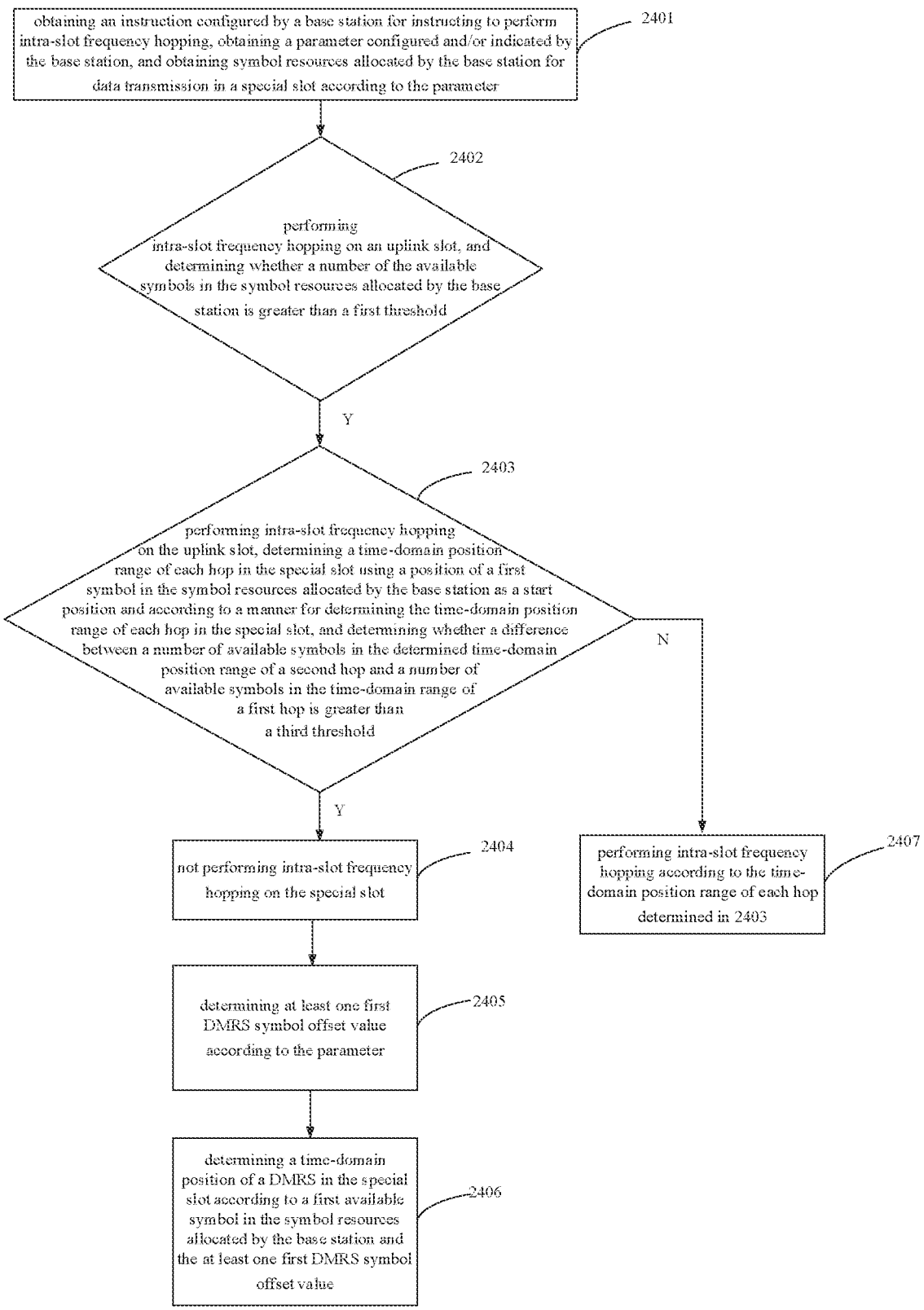
FIG. 24 is a schematic flowchart of a frequency hopping method according to yet other embodiments of the disclosure.

FIG. 24 is a schematic flowchart of another frequency hopping method according to some embodiments of the disclosure. The method is performed by a UE. As illustrated in FIG. 24, the frequency hopping method may include the following steps.

Step 2401, an instruction configured by a base station for instructing to perform intra-slot frequency hopping is obtained, a parameter configured and/or indicated by the base station is obtained, and symbol resources allocated by the base station for data transmission in a special slot are obtained according to the parameter.

Step 2402, intra-slot frequency hopping is performed on an uplink slot, available symbols in the special slot are determined, and it is determined whether a number of the available symbols in the symbol resources allocated by the base station is greater than a first threshold, and if so, step 2403 is performed.

Step 2403, intra-slot frequency hopping is performed on the uplink slot, available symbols in the special slot are determined, a time-domain position range of each hop in the special slot is determined using a position of a first symbol in the symbol resources allocated by the base station as a start position and according to a manner for determining the time-domain position range of each hop in the uplink slot, it is determined whether a difference between a number of available symbols in the determined time-domain position range of a second hop and a number of available symbols in the time-domain range of a first hop is greater than a third threshold, and if so, step 2404 is performed, otherwise, step 2407 is performed.

Step 2404, intra-slot frequency hopping is not performed on the special slot.

Step 2405, at least one first DMRS symbol offset value is determined according to a parameter configured and/or indicated by the base station.

Step 2406, a time-domain position of a DMRS in the special slot is determined according to a first available symbol in the symbol resources allocated by the base station and the at least one first DMRS symbol offset value.

Step 2407, intra-slot frequency hopping is performed according to the time-domain position range of each hop in the special slot determined using the position of the first symbol in the symbol resources as the start position.

For the detailed introduction of steps 2401-2407, reference may be made to the foregoing embodiments, and the embodiments of the disclosure will not repeat them herein.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 25:
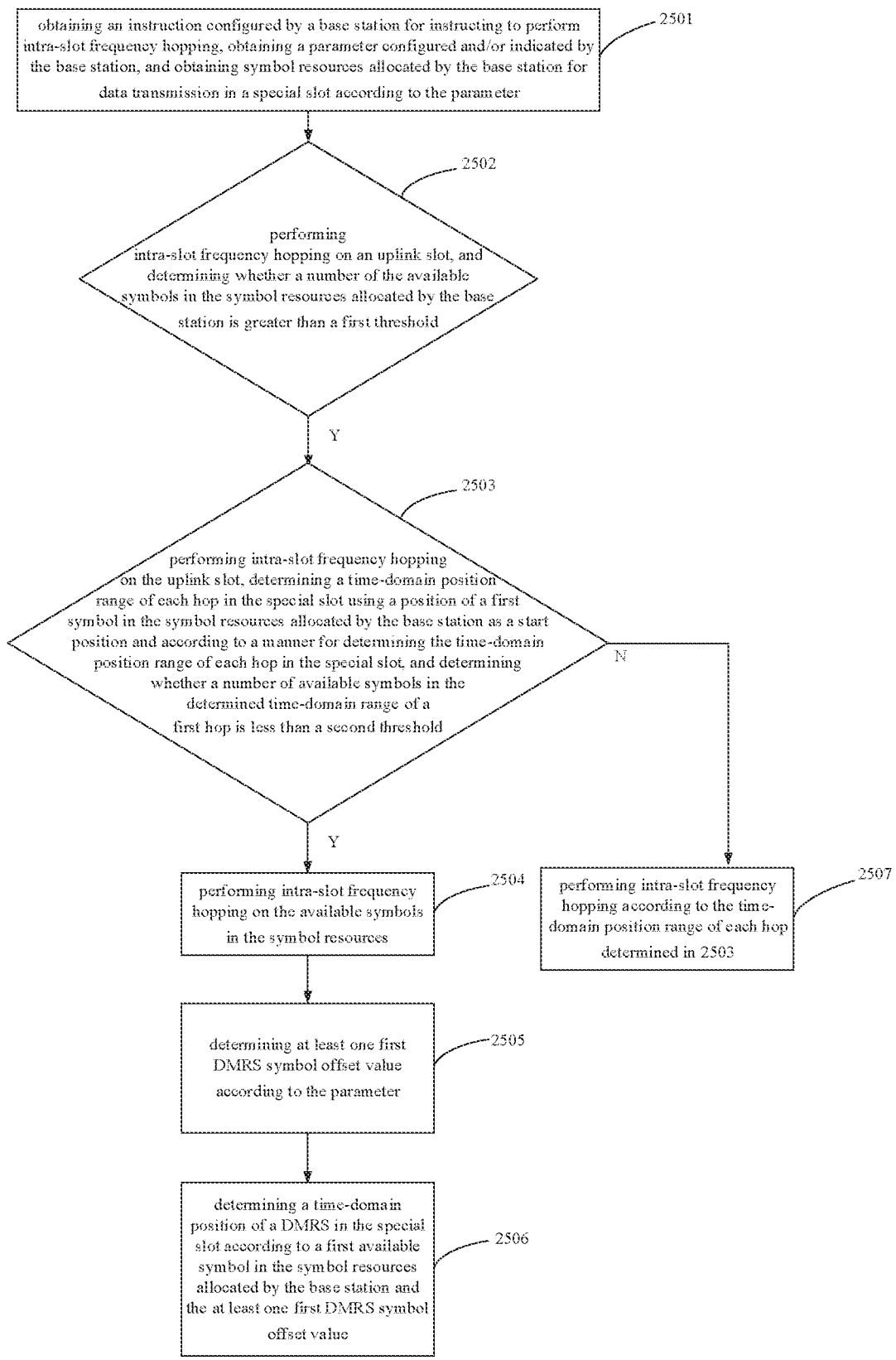
FIG. 25 is a schematic flowchart of a frequency hopping method according to yet other embodiments of the disclosure.

FIG. 25 is a schematic flowchart of another frequency hopping method according to some embodiments of the disclosure. The method is performed by a UE. As illustrated in FIG. 25, the frequency hopping method may include the following steps.

Step 2501, an instruction configured by a base station for instructing to perform intra-slot frequency hopping is obtained, a parameter configured and/or indicated by the base station is obtained, and symbol resources allocated by the base station for data transmission in a special slot are obtained according to the parameter.

Step 2502, intra-slot frequency hopping is performed on an uplink slot, available symbols in the special slot are determined, and it is determined whether a number of the available symbols in the symbol resources allocated by the base station is greater than a first threshold, and if so, step 2503 is performed.

Step 2503, intra-slot frequency hopping is performed on the uplink slot, available symbols in the special slot are determined, a time-domain position range of each hop in the special slot is determined using a position of a first symbol in the symbol resources allocated by the base station as a start position and according to a manner for determining the time-domain position range of each hop in the uplink slot, it is determined whether the number of available symbols in the determined time-domain range of the first hop is less than a second threshold, and if so step 2504 is performed, otherwise, step 2507 is performed.

Step 2504, intra-slot frequency hopping is performed on the available symbols in the symbol resources.

Step 2505, at least one first DMRS symbol offset value is determined according to a parameter configured and/or indicated by the base station.

Step 2506, a time-domain position of a DMRS in the special slot is determined according to a first available symbol in the symbol resources allocated by the base station and the at least one first DMRS symbol offset value.

Step 2507, intra-slot frequency hopping is performed according to the time-domain position range of each hop in the special slot determined using the position of the first symbol in the symbol resources as the start position.

For the detailed introduction of steps 2501-2507, reference may be made to the foregoing embodiments, and the embodiments of the disclosure will not repeat them herein.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 26:
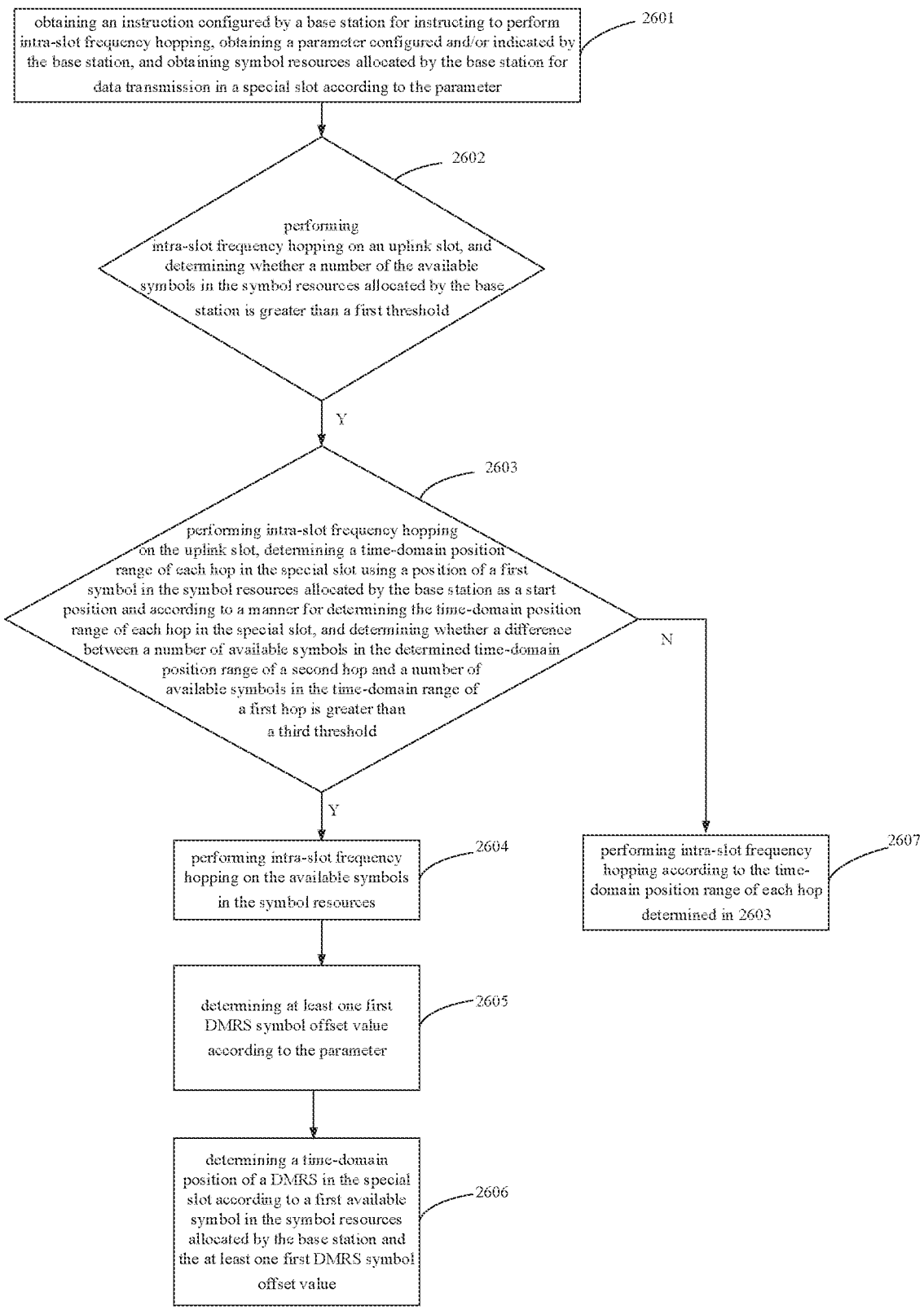
FIG. 26 is a schematic flowchart of a frequency hopping method according to yet other embodiments of the disclosure.

FIG. 26 is a schematic flowchart of another frequency hopping method according to some embodiments of the disclosure. The method is executed by the UE. As illustrated in FIG. 26, the frequency hopping method may include the following steps.

Step 2601, an instruction configured by a base station for instructing to perform intra-slot frequency hopping is obtained, a parameter configured and/or indicated by the base station is obtained, and symbol resources allocated by the base station for data transmission in a special slot are obtained according to the parameter.

Step 2602, intra-slot frequency hopping is performed on an uplink slot, available symbols in the special slot are determined, and it is determined whether a number of the available symbols in the symbol resources allocated by the base station is greater than a first threshold, and if so, step 2603 is performed.

Step 2603, intra-slot frequency hopping is performed on the uplink slot, available symbols in the special slot are determined, a time-domain position range of each hop in the special slot is determined using a position of a first symbol in the symbol resources allocated by the base station as a start position and according to a manner for determining the time-domain position range of each hop in the uplink slot, it is determined whether a difference between a number of available symbols in the determined time-domain position range of the second hop and a number of available symbols in the time-domain range of the first hop is greater than a third threshold, and if so, step 2604 is performed, otherwise, step 2607 is performed.

Step 2604, intra-slot frequency hopping is performed on the available symbols in the symbol resources.

Step 2605, at least one first DMRS symbol offset value is determined according to a parameter configured and/or indicated by the base station.

Step 2606, a time-domain position of a DMRS in the special slot is determined according to a first available symbol in the symbol resources allocated by the base station and the at least one first DMRS symbol offset value.

Step 2607, intra-slot frequency hopping is performed according to the time-domain position range of each hop in the special slot determined using the position of the first symbol in the symbol resources as the start position.

For the detailed introduction of steps 2601-2607, reference may be made to the foregoing embodiments, and the embodiments of the disclosure will not repeat them herein.

In conclusion, in the frequency hopping method provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 27:
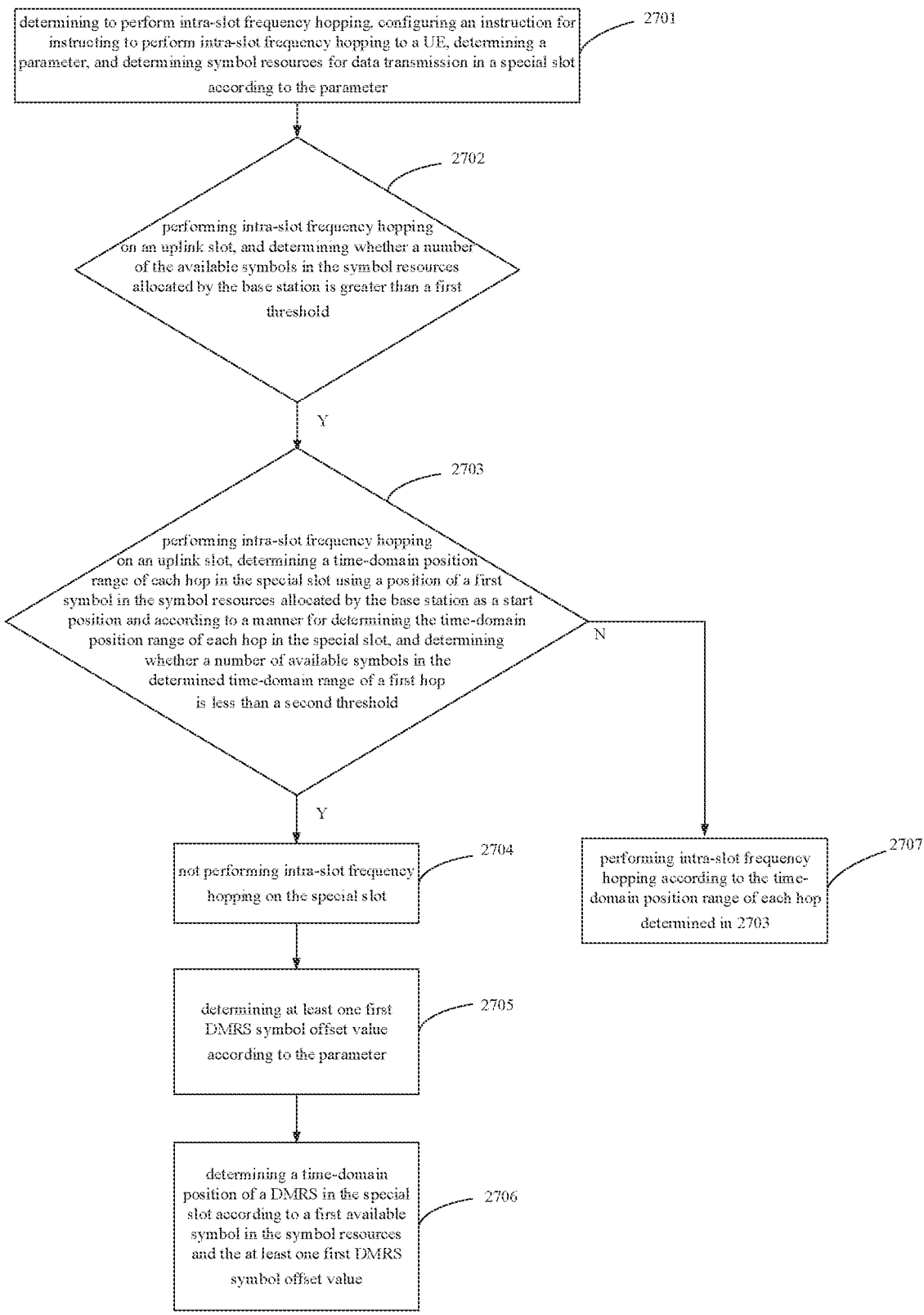
FIG. 27 is a schematic flowchart of a frequency hopping method according to yet other embodiments of the disclosure.

FIG. 27 is a schematic flowchart of another frequency hopping method according to some embodiments of the disclosure. The method is performed by a base station. As illustrated in FIG. 27, the frequency hopping method may include the following steps.

Step 2701, it determines to perform intra-slot frequency hopping, an instruction for instructing to perform intra-slot frequency hopping is configured to a UE, a parameter is determined, and symbol resources for data transmission in a special slot are determined according to the parameter.

Step 2702, intra-slot frequency hopping is performed on an uplink slot, available symbols in the special slot are determined, and it is determined whether a number of the available symbols in the symbol resources allocated by the base station is greater than a first threshold, and if so, step 2703 is performed.

Step 2703, intra-slot frequency hopping is performed on the uplink slot, available symbols in the special slot are determined, a time-domain position range of each hop in the special slot is determined using a position of a first symbol in the symbol resources allocated by the base station as a start position and according to a manner for determining the time-domain position range of each hop in the uplink slot, it is determined whether a number of available symbols in the determined time-domain range of a first hop is less than a second threshold, and if so step 2704 is performed, otherwise, step 2707 is performed.

Step 2704, intra-slot frequency hopping is not performed on the special slot.

Step 2705, at least one first DMRS symbol offset value is determined according to the parameter.

Step 2706, a time-domain position of a DMRS in the special slot is determined according to a first available symbol in the symbol resources and the at least one first DMRS symbol offset value.

Step 2707, intra-slot frequency hopping is performed according to the time-domain position range of each hop in the special slot determined using the position of the first symbol in the symbol resources as the start position.

For the detailed introduction of steps 2701-2707, reference may be made to the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 28:
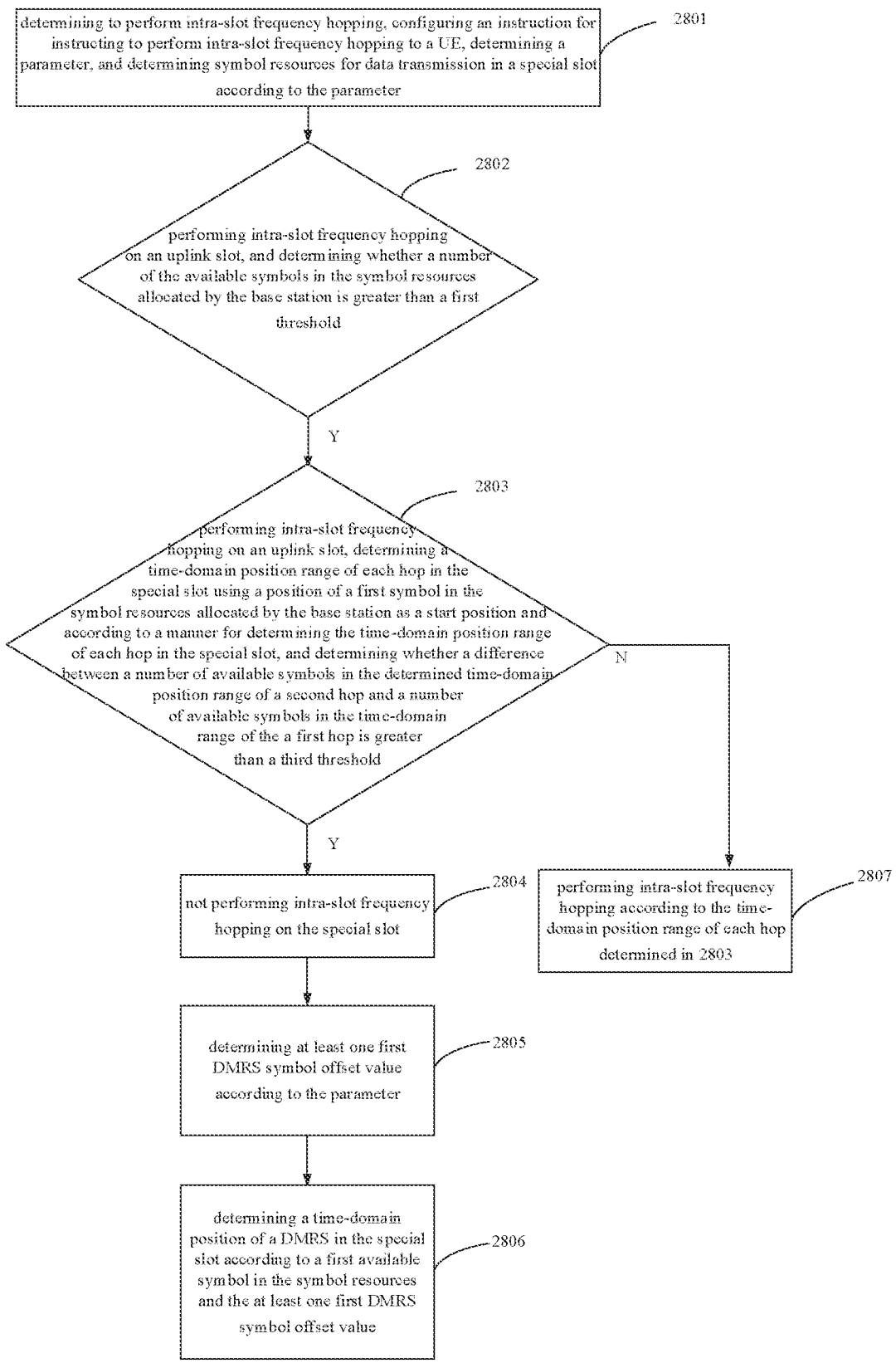
FIG. 28 is a schematic flowchart of a frequency hopping method according to yet other embodiments of the disclosure.

FIG. 28 is a schematic flowchart of another frequency hopping method according to some embodiments of the disclosure. The method is performed by a base station. As illustrated in FIG. 28, the frequency hopping method may include the following steps.

Step 2801, it determines to perform intra-slot frequency hopping, an instruction for instructing to perform intra-slot frequency hopping is configured to a UE, a parameter is determined, and symbol resources for data transmission in a special slot are determined according to the parameter.

Step 2802, intra-slot frequency hopping is performed on an uplink slot, available symbols in the special slot are determined, and it is determined whether a number of the available symbols in the symbol resources allocated by the base station is greater than a first threshold, and if so, step 2803 is performed.

Step 2803, intra-slot frequency hopping is performed on the uplink slot, available symbols in the special slot are determined, a time-domain position range of each hop in the special slot is determined using a position of a first symbol in the symbol resources allocated by the base station as a start position and according to a manner for determining the time-domain position range of each hop in the uplink slot, it is determined whether a difference between a number of available symbols in the determined time-domain position range of a second hop and a number of available symbols in the time-domain range of the a first hop is greater than a third threshold, and if so, step 2804 is performed, otherwise, step 2807 is performed.

Step 2804, intra-slot frequency hopping is not performed on the special slot.

Step 2805, at least one first DMRS symbol offset value is determined according to the parameter.

Step 2806, a time-domain position of a DMRS in the special slot is determined according to a first available symbol in the symbol resources and the at least one first DMRS symbol offset value.

Step 2807, intra-slot frequency hopping is performed according to the time-domain position range of each hop in the special slot determined using the position of the first symbol in the symbol resources as the start position.

For the detailed introduction of steps 2801-2807, reference may be made to the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 29:
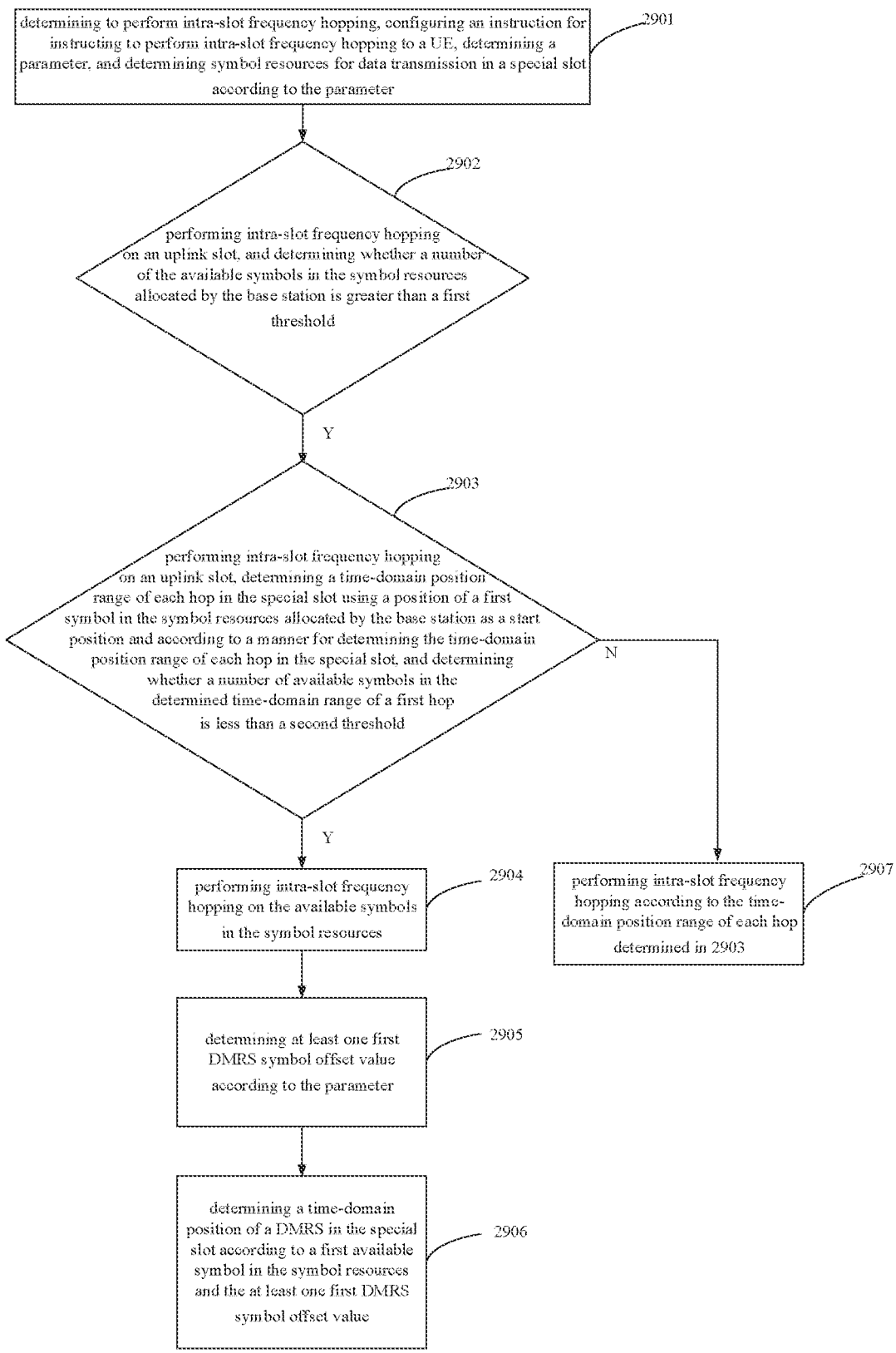
FIG. 29 is a schematic flowchart of a frequency hopping method according to yet other embodiments of the disclosure.

FIG. 29 is a schematic flowchart of another frequency hopping method according to some embodiments of the disclosure. The method is performed by a base station. As illustrated in FIG. 29, the frequency hopping method may include the following steps.

Step 2901, it determines to perform intra-slot frequency hopping, an instruction for instructing to perform intra-slot frequency hopping is configured to a UE, a parameter is determined, and symbol resources for data transmission in a special slot are determined according to the parameter.

Step 2902, intra-slot frequency hopping is performed on an uplink slot, available symbols in the special slot are determined, and it is determined whether a number of the available symbols in the symbol resources allocated by the base station is greater than a first threshold, and if so, step 2903 is performed.

Step 2903, intra-slot frequency hopping is performed on the uplink slot, available symbols in the special slot are determined, a time-domain position range of each hop in the special slot is determined using a position of a first symbol in the symbol resources allocated by the base station as a start position and according to a manner for determining the time-domain position range of each hop in the uplink slot, it is determined whether a number of available symbols in the determined time-domain range of a first hop is less than a second threshold, and if so step 2904 is performed, otherwise, step 2907 is performed.

Step 2904, intra-slot frequency hopping is performed on the available symbols in the symbol resources.

Step 2905, at least one first DMRS symbol offset value is determined according to the parameter.

Step 2906, a time-domain position of a DMRS in the special slot is determined according to a first available symbol in the symbol resources and the at least one first DMRS symbol offset value.

Step 2907, intra-slot frequency hopping is performed according to the time-domain position range of each hop in the special slot determined using the position of the first symbol in the symbol resources as the start position.

For the detailed introduction of steps 2901-2907, reference may be made to the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 30:
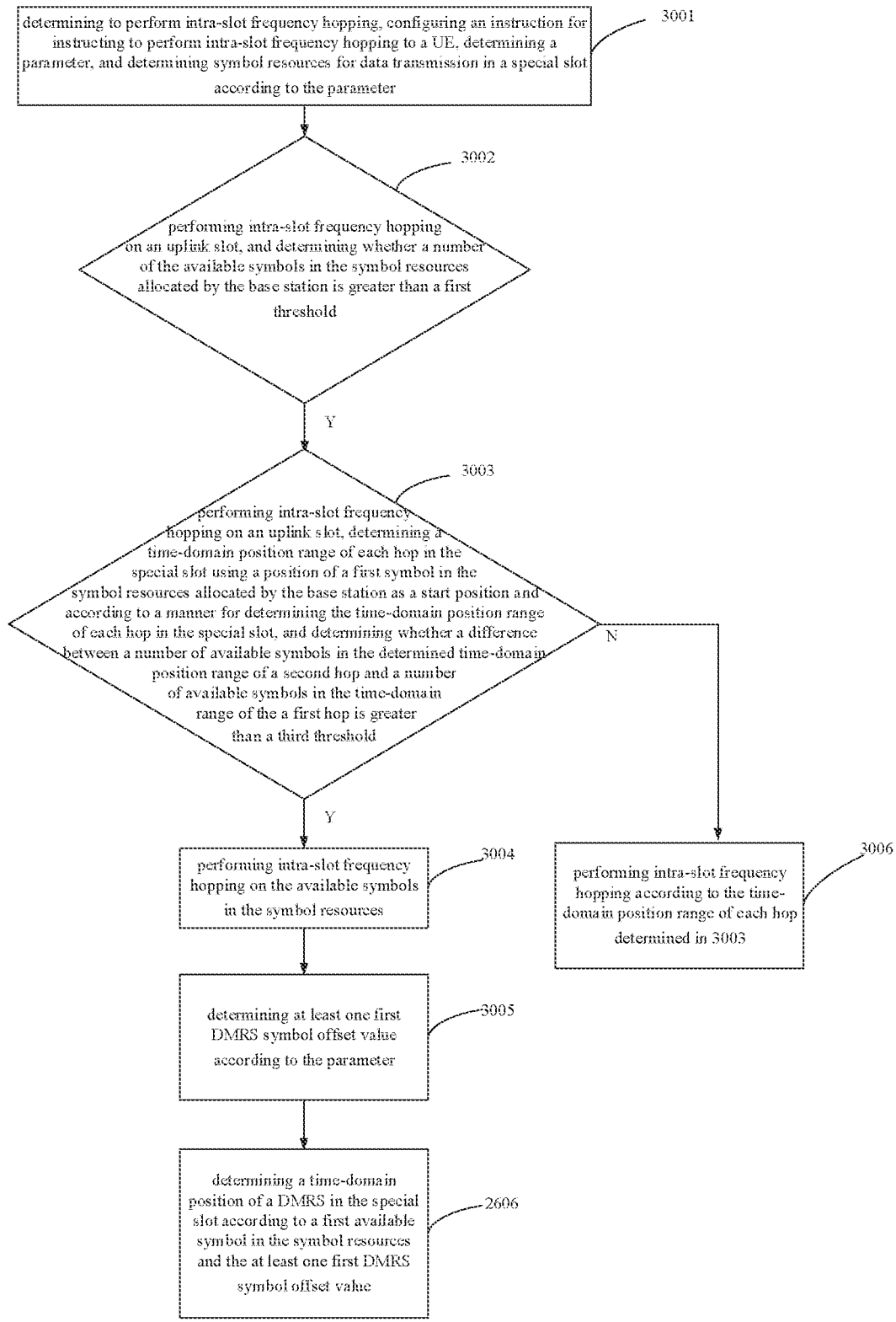
FIG. 30 is a schematic flowchart of a frequency hopping method according to yet other embodiments of the disclosure.

FIG. 30 is a schematic flowchart of another frequency hopping method according to some embodiments of the disclosure. The method is performed by a base station. As illustrated in FIG. 30, the frequency hopping method may include the following steps.

Step 3001, it determines to perform intra-slot frequency hopping, an instruction for instructing to perform intra-slot frequency hopping is configured to a UE, a parameter is determined, and symbol resources for data transmission in a special slot are determined according to the parameter.

Step 3002, intra-slot frequency hopping is performed on an uplink slot, available symbols in the special slot are determined, it is determined whether a number of the available symbols in the symbol resources allocated by the base station is greater than a first threshold, and if so, step 3003 is performed.

Step 3003, intra-slot frequency hopping is performed on the uplink slot, available symbols in the special slot are determined, a time-domain position range of each hop in the special slot is determined using a position of a first symbol in the symbol resources allocated by the base station as a start position and according to a manner for determining the time-domain position range of each hop in the uplink slot, it is determined whether a difference between a number of available symbols in the determined time-domain position range of a second hop and a number of available symbols in the time-domain range of a first hop is greater than a third threshold, and if so, step 3004 is performed, otherwise, step 3007 is performed.

Step 3004, intra-slot frequency hopping is performed on the available symbols in the symbol resources.

Step 3005, at least one first DMRS symbol offset value is determined according to the parameter.

Step 3006, a time-domain position of a DMRS in the special slot is determined according to a first available symbol in the symbol resources and the at least one first DMRS symbol offset value.

Step 3007, intra-slot frequency hopping is performed according to the time-domain position range of each hop in the special slot determined using the position of the first symbol in the symbol resources as the start position.

For the detailed introduction of steps 3001-3007, reference may be made to the foregoing embodiments, and the embodiments of the disclosure will not repeat them herein.

In conclusion, in the frequency hopping method provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Figure 31:
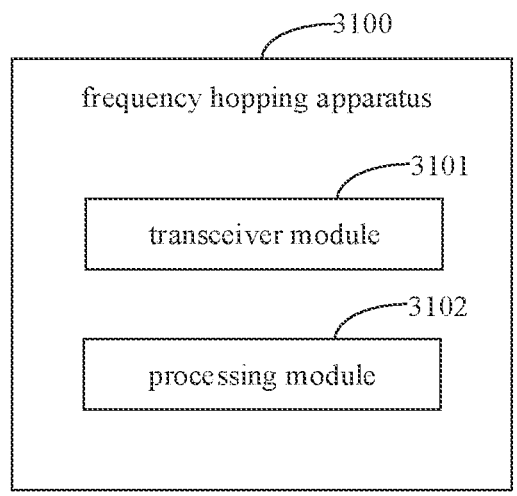
FIG. 31 is a schematic block diagram of a frequency hopping apparatus according to some embodiments of the disclosure.

FIG. 31 is a schematic block diagram of a frequency hopping apparatus according to some embodiments of the disclosure. As illustrated in FIG. 31, the apparatus 3100 may include a transceiver module 3101 and a processing module 3102.

The transceiver module 3101 is configured to obtain an instruction configured by a base station for instructing to perform intra-slot frequency hopping and obtain symbol resources allocated by the base station for data transmission in a special slot.

The processing module 3102 is configured to perform intra-slot frequency hopping on an uplink slot and determine available symbols in the special slot; and perform intra-slot frequency hopping on the available symbols in the symbol resources or not perform intra-slot frequency hopping on the special slot.

In conclusion, in the frequency hopping apparatus provided in embodiments of the disclosure, the UE may obtain the instruction configured by the base station for instructing to perform intra-slot frequency hopping and obtain the symbol resources allocated by the base station for data transmission in the special slot; perform intra-slot frequency hopping on the uplink slot and determine the available symbols in the special slot; and perform intra-slot frequency hopping on the available symbols in the symbol resources, or not perform intra-slot frequency hopping on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Optionally, in some embodiments of the disclosure, the processing module is further configured to: determine unavailable symbol(s) in the special slot according to an SFI dynamic indication signaling and/or a semi-static slot format configuration signaling; and determine that the available symbols are symbols in the special slot other than the unavailable symbol(s).

The unavailable symbol(s) includes at least one of: a guard symbol for downlink to uplink switching; a downlink symbol for downlink transmission; a symbol for SSB transmission; a symbol allocated for a CSS; a symbol occupied by a CI; or a symbol for service transmission with a higher priority than current data transmission.

Optionally, in other embodiments of the disclosure, the processing module is further configured to: in response to a number of the available symbols in the symbol resources is less than or equal to a first threshold, determine not performing intra-slot frequency hopping on the special slot, the first threshold for indicating a minimum number of symbols in one hop when intra-slot frequency hopping is performed on the special slot and the first threshold being indicated by the base station or determined by a protocol.

Optionally, in other embodiments of the disclosure, the processing module is further configured to: determine a time-domain position range of each hop in the special slot using a position of a first symbol in the symbol resources as a start position; in response to a number of available symbols in the determined time-domain position range of a first hop is less than a second threshold, determine not performing intra-slot frequency hopping on the special slot; and in response to the number of available symbols in the determined time-domain position range of the first hop is not less than the second threshold, perform intra-slot frequency hopping according to the time-domain position range of each hop in the special slot determined using the position of the first symbol in the symbol resources as the start position.

The second threshold is indicated by the base station or determined by a protocol.

Optionally, in other embodiments of the disclosure, the processing module is further configured to: determine a time-domain position range of each hop in the special slot using a position of a first symbol in the symbol resources as a start position; in response to a difference between a number of available symbols in the determined time-domain position range of a first hop and a number of available symbols in the determined time-domain position range of a second hop is greater than a third threshold, determine not performing intra-slot frequency hopping on the special slot; and in response to the difference between the number of available symbols in the determined time-domain position range of the first hop and the number of available symbols in the determined time-domain position range of the second hop is not greater than the third threshold, perform intra-slot frequency hopping according to the time-domain position range of each hop in the special slot determined using the position of the first symbol in the symbol resources as the start position.

The third threshold is indicated by the base station or determined by a protocol.

Optionally, in other embodiments of the disclosure, the processing module is further configured to: obtain the instruction for instructing to perform intra-slot frequency hopping; and determine not performing intra-slot frequency hopping on the special slot.

Optionally, in other embodiments of the disclosure, the apparatus is further configured to: determine at least one first DMRS symbol offset value according to a parameter configured and/or indicated by the base station; and determine a time-domain position of a DMRS in the special slot according to a first available symbol in the symbol resources allocated by the base station and the at least one first DMRS symbol offset value.

Optionally, in other embodiments of the disclosure, the apparatus is further configured to: determine a sum of a symbol number of the first available symbol and each first DMRS symbol offset value to obtain at least one first sum value; and determine that the time-domain position of the DMRS is a symbol with a symbol number corresponding to the first sum value.

Optionally, in other embodiments of the disclosure, the parameter includes at least one of: a PUSCH mapping type, in which the PUSCH mapping type includes type A and type B; a symbol length for data transmission in the special slot; a start symbol position for data transmission in the special slot; a DMRS-additional position; a number of DMRS ports; whether to enable intra-slot frequency hopping; or a DMRS-type A position.

Optionally, in other embodiments of the disclosure, a frequency-domain position of the special slot is the same as a frequency-domain position of any hop in the uplink slot.

Optionally, in other embodiments of the disclosure, the frequency-domain position of the special slot is the same as a frequency-domain position of a second hop in the uplink slot.

Optionally, in other embodiments of the disclosure, the processing module is further configured to: in response to a number of the available symbols in the symbol resources is greater than a first threshold, perform intra-slot frequency hopping on the available symbols in the symbol resources, the first threshold for indicating a minimum number of symbols in one hop when intra-slot frequency hopping is performed on the special slot and the first threshold being indicated by the base station or determined by a protocol.

Optionally, in other embodiments of the disclosure, the processing module is further configured to: determine a time-domain position range of each hop in the special slot using a position of a first symbol in the symbol resources as a start position; in response to a number of available symbols in the determined time-domain position range of a first hop is less than a second threshold, perform intra-slot frequency hopping on the available symbols in the symbol resources; and in response to the number of available symbols in the determined time-domain position range of the first hop is not less than the second threshold, perform intra-slot frequency hopping according to the time-domain position range of each hop in the special slot determined using the position of the first symbol in the symbol resources as the start position.

The second threshold is indicated by the base station or determined by a protocol.

Optionally, in other embodiments of the disclosure, the processing module is further configured to: determine a time-domain position range of each hop in the special slot using a position of a first symbol in the symbol resources as a start position; in response to a difference between a number of available symbols in the determined time-domain position range of a first hop and a number of available symbols in the determined time-domain position range of a second hop is greater than a third threshold, perform intra-slot frequency hopping on the available symbols in the symbol resources; and in response to the difference between the number of available symbols in the determined time-domain position range of the first hop and the number of available symbols in the determined time-domain position range of the second hop is not greater than the third threshold, perform intra-slot frequency hopping according to the time-domain position range of each hop in the special slot determined using the position of the first symbol in the symbol resources as the start position.

The third threshold is indicated by the base station or determined by a protocol.

Optionally, in other embodiments of the disclosure, the processing module is further configured to: after obtaining the instruction for instructing to perform intra-slot frequency hopping, perform intra-slot frequency hopping on the available symbols in the symbol resources.

Optionally, in other embodiments of the disclosure, the processing module is further configured to: determine a time-domain start position of a first hop in the special slot is: a position of a first available symbol in the symbol resources; determine a time-domain end position of the first hop is: the position of the first available symbol in the symbol resources+floor (a number of the available symbols in the symbol resources÷2)−1; in which a floor function is a downward rounding function; determine a time-domain start position of a second hop in the special slot is: the position of the first available symbol in the symbol resources+floor (the number of the available symbols in the symbol resources÷2); and determine a time-domain end position of the second hop is: the position of the first available symbol in the symbol resources+floor (the number of the available symbols in the symbol resources÷2)+the number of the available symbols in the symbol resources−floor (the number of the available symbols in the symbol resources÷2)−1.

Optionally, in other embodiments of the disclosure, the apparatus is further configured to: determine a time-domain position of a DMRS in each hop according to a parameter configured and/or indicated by the base station, a number of symbols in a time-domain position range of each hop, and a start symbol of each hop.

Optionally, in other embodiments of the disclosure, the apparatus is further configured to: determine at least one second DMRS symbol offset value according to the parameter configured and/or indicated by the base station and a number of symbols in a time-domain position range of a second hop; determine a sum of a symbol number of a start symbol of the second hop and each second DMRS symbol offset value to obtain at least one second sum value, determine that the time-domain position of the DMRS in the second hop is a symbol with a symbol number corresponding to the second sum value; determine a sum of a symbol number of a start symbol of a first hop and each second DMRS symbol offset value to obtain at least one third sum value; and determine that the time-domain position of the DMRS in the first hop is a symbol with a symbol number corresponding to the third sum value.

Optionally, in other embodiments of the disclosure, the apparatus is further configured to: determine at least one second DMRS symbol offset value according to the parameter configured and/or indicated by the base station and a number of symbols in a time-domain position range of a second hop; determine a sum of a symbol number of a start symbol of the second hop and each second DMRS symbol offset value to obtain at least one second sum value, determine that the time-domain position of the DMRS in the second hop is a symbol with a symbol number corresponding to the second sum value; determine at least one third DMRS symbol offset value according to the parameter configured and/or indicated by the base station and a number of symbols in a time-domain position range of a first hop; determine a sum of a symbol number of a start symbol of the first hop and each third DMRS symbol offset value to obtain at least one third sum value; and determine that the time-domain position of the DMRS in the first hop is a symbol with a symbol number corresponding to the third sum value.

Optionally, in other embodiments of the disclosure, the parameter incudes at least one of: a PUSCH mapping type, in which the PUSCH mapping type includes type A and type B; a symbol length for data transmission in the special slot; a start symbol position for data transmission in the special slot; a DMRS-additional position; a number of DMRS ports; or a DMRS-type A position.

Optionally, in other embodiments of the disclosure, the apparatus is further configured to: in response to the PUSCH mapping type in the parameter is type A, according to a mapping rule of type A, determine the time-domain position of the DMRS in each hop according to the parameter configured and/or indicated by the base station, the number of symbols in the time-domain position range of each hop, and the start symbol of each hop; and in response to the PUSCH mapping type in the parameter is type B, according to a mapping rule of type B, determine the time-domain position of the DMRS in each hop according to the parameter configured and/or indicated by the base station, the number of symbols in the time-domain position range of each hop, and the start symbol of each hop.

Figure 32:
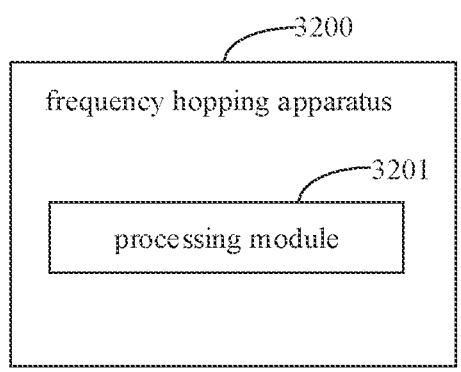
FIG. 32 is a schematic block diagram of a frequency hopping apparatus according to other embodiments of the disclosure.

FIG. 32 is a schematic block diagram of a frequency hopping apparatus according to other embodiments of the disclosure. As illustrated in FIG. 32, the apparatus 3200 may include a processing module 3201.

The processing module 3201 is configured to determine to perform intra-slot frequency hopping, configure an instruction for instructing to perform intra-slot frequency hopping to a UE, determine a parameter, and determine symbol resources for data transmission in a special slot according to the parameter.

The processing module 3201 is configured to perform intra-slot frequency hopping on an uplink slot and determine available symbols in the special slot; and perform intra-slot frequency hopping on the available symbols in the symbol resources or not perform intra-slot frequency hopping on the special slot.

In conclusion, in the frequency hopping apparatus provided in embodiments of the disclosure, the base station may determine the symbol resources for data transmission in the special slot; and when the base station determines to perform intra-slot frequency hopping, it may perform intra-slot frequency hopping on the uplink slot, and determine the available symbols in the special slot; and intra-slot frequency hopping is performed on the available symbols in the symbol resources or intra-slot frequency hopping is not performed on the special slot. It may be seen that, in the embodiments of the disclosure, when it needs to perform intra-slot frequency hopping on the uplink slot, it may not to perform intra-slot frequency hopping on the special slot, so that an occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping. In the embodiments of the disclosure, when it needs to perform intra-slot frequency hopping on the uplink slot, intra-slot frequency hopping may be performed on the available symbols in the special slot only, which may ensure a sufficient number of available symbols in each hop in the special slot and also avoid the occurrence of "when performing intra-slot frequency hopping on the special slot, uplink TBoMS may not be performed on the first hop due to a large number of unavailable symbol(s) in the first hop" may be avoided, thereby avoiding the waste of resources, saving costs, and ensuring the stability of frequency hopping.

Optionally, in some embodiments of the disclosure, the processing module is further configured to: determine unavailable symbol(s) in the special slot; and determine that the available symbols are symbols in the special slot other than the unavailable symbol(s).

The unavailable symbol(s) include at least one of: a guard symbol for downlink to uplink switching; a downlink symbol for downlink transmission; a symbol for SSB transmission; a symbol allocated for a CSS; a symbol occupied by a CI; or a symbol for service transmission with a higher priority than current data transmission.

Optionally, in other embodiments of the disclosure, the processing module is further configured to: in response to a number of the available symbols in the symbol resources is less than or equal to a first threshold, determine not performing intra-slot frequency hopping on the special slot, the first threshold for indicating a minimum number of symbols in one hop when intra-slot frequency hopping is performed on the special slot and the first threshold being determined by the base station or by a protocol.

Optionally, in other embodiments of the disclosure, the processing module is further configured to: determine a time-domain position range of each hop in the special slot using a position of a first symbol in the symbol resources as a start position according to the symbol resources; in response to a number of available symbols in the determined time-domain position range of a first hop is less than a second threshold, determine not performing intra-slot frequency hopping on the special slot; and in response to the number of available symbols in the determined time-domain position range of the first hop is not less than the second threshold, perform intra-slot frequency hopping according to the time-domain position range of each hop in the special slot determined using the position of the first symbol in the symbol resources as the start position.

The second threshold is determined by the base station or by a protocol.

Optionally, in other embodiments of the disclosure, the processing module is further configured to: determine a time-domain position range of each hop in the special slot using a position of a first symbol in the symbol resources as a start position according to the symbol resources; in response to a difference between a number of available symbols in the determined time-domain position range of a first hop and a number of available symbols in the determined time-domain position range of a second hop is greater than a third threshold, determine not performing intra-slot frequency hopping on the special slot; and in response to the difference between the number of available symbols in the determined time-domain position range of the first hop and the number of available symbols in the determined time-domain position range of the second hop is not greater than the third threshold, perform intra-slot frequency hopping according to the time-domain position range of each hop in the special slot determined using the position of the first symbol in the symbol resources as the start position.

The third threshold is determined by the base station or by a protocol.

Optionally, in other embodiments of the disclosure, the processing module is further configured to: determine to perform intra-slot frequency hopping; and determine to not perform intra-slot frequency hopping on the special slot.

Optionally, in other embodiments of the disclosure, the apparatus is further configured to: determine at least one first DMRS symbol offset value according to the parameter; and determine a time-domain position of a DMRS in the special slot according to a first available symbol in the symbol resources allocated by the base station and the at least one first DMRS symbol offset value.

Optionally, in other embodiments of the disclosure, the apparatus is further configured to: determine a sum of a symbol number of the first available symbol and each first DMRS symbol offset value to obtain at least one first sum value; and determine that the time-domain position of the DMRS is a symbol with a symbol number corresponding to the first sum value.

Optionally, in other embodiments of the disclosure, the parameter includes at least one of: a PUSCH mapping type, in which the PUSCH mapping type includes type A and type B; a symbol length for data transmission in the special slot; a start symbol position for data transmission in the special slot; a DMRS-additional position; a number of DMRS ports; or a DMRS-type A position.

Optionally, in other embodiments of the disclosure, a frequency-domain position of the special slot is the same as a frequency-domain position of any hop in the uplink slot.

Optionally, in other embodiments of the disclosure, the frequency-domain position of the special slot is the same as a frequency-domain position of a second hop in the uplink slot.

Optionally, in other embodiments of the disclosure, the processing module is further configured to: in response to a number of the available symbols in the symbol resources is greater than a first threshold, perform intra-slot frequency hopping on the available symbols in the symbol resources, the first threshold for indicating a minimum number of symbols in one hop when intra-slot frequency hopping is performed on the special slot and the first threshold being determined by the base station or by a protocol.

Optionally, in other embodiments of the disclosure, the processing module is further configured to: determine a time-domain position range of each hop in the special slot using a position of a first symbol in the symbol resources as a start position according to the symbol resources; in response to a number of available symbols in the determined time-domain position range of a first hop is less than a second threshold, perform intra-slot frequency hopping on the available symbols in the symbol resources; and in response to the number of available symbols in the determined time-domain position range of the first hop is not less than the second threshold, perform intra-slot frequency hopping according to the time-domain position range of each hop in the special slot determined using the position of the first symbol in the symbol resources as the start position.

The second threshold is determined by the base station or by a protocol.

Optionally, in other embodiments of the disclosure, the processing module is further configured to: determine a time-domain position range of each hop in the special slot using a position of a first symbol in the symbol resources as a start position according to the symbol resources; in response to a difference between a number of available symbols in the determined time-domain position range of a first hop and a number of available symbols in the determined time-domain position range of a second hop is greater than a third threshold, perform intra-slot frequency hopping on the available symbols in the symbol resources; and in response to the difference between the number of available symbols in the determined time-domain position range of the first hop and the number of available symbols in the determined time-domain position range of the second hop is not greater than the third threshold, perform intra-slot frequency hopping according to the time-domain position range of each hop in the special slot determined using the position of the first symbol in the symbol resources as the start position.

The third threshold is determined by the base station or by a protocol.

Optionally, in other embodiments of the disclosure, the processing module is further configured to: after obtaining the instruction for instructing to perform intra-slot frequency hopping, perform intra-slot frequency hopping on the available symbols in the symbol resources.

Optionally, in other embodiments of the disclosure, the processing module is further configured to: determine a time-domain start position of a first hop in the special slot is: a position of a first available symbol in the symbol resources; and determine a time-domain end position of the first hop is: the position of the first available symbol in the symbol resources+floor (a number of the available symbols in the symbol resources÷2)−1; in which a floor function is a downward rounding function; and determine a time-domain start position of a second hop in the special slot is: the position of the first available symbol in the symbol resources+floor (the number of the available symbols in the symbol resources÷2); and determine a time-domain end position of the second hop is: the position of the first available symbol in the symbol resources+floor (the number of the available symbols in the symbol resources÷2)+the number of the available symbols in the symbol resources−floor (the number of the available symbols in the symbol resources÷2)−1.

Optionally, in other embodiments of the disclosure, the apparatus is further configured to: determine a time-domain position of a DMRS in each hop according to the parameter, a number of symbols in a time-domain position range of each hop, and a start symbol of each hop.

Optionally, in other embodiments of the disclosure, the apparatus is further configured to: determine at least one second DMRS symbol offset value according to the parameter and a number of symbols in a time-domain position range of a second hop; determine a sum of a symbol number of a start symbol of the second hop and each second DMRS symbol offset value to obtain at least one second sum value, and determine that the time-domain position of the DMRS in the second hop is a symbol with a symbol number corresponding to the second sum value; and determine a sum of a symbol number of a start symbol of a first hop and each second DMRS symbol offset value to obtain at least one third sum value, and determine that the time-domain position of the DMRS in the first hop is a symbol with a symbol number corresponding to the third sum value.

Optionally, in other embodiments of the disclosure, the apparatus is further configured to: determine at least one second DMRS symbol offset value according to the parameter and a number of symbols a time-domain position range of a second hop; determine a sum of a symbol number of a start symbol of the second hop and each second DMRS symbol offset value to obtain at least one second sum value, and determine that the time-domain position of the DMRS in the second hop is a symbol with a symbol number corresponding to the second sum value; determine at least one third DMRS symbol offset value according to the parameter and a number of symbols in a time-domain position range of a first hop; and determine a sum of a symbol number of a start symbol of the first hop and each third DMRS symbol offset value to obtain at least one third sum value, and determine that the time-domain position of the DMRS in the first hop is a symbol with a symbol number corresponding to the third sum value.

Optionally, in other embodiments of the disclosure, the parameter includes at least one of: a PUSCH mapping type, in which the PUSCH mapping type includes type A and type B; a symbol length for data transmission in the special slot; a DMRS-additional position; a number of DMRS ports; or a DMRS-type A position.

Optionally, in other embodiments of the disclosure, the apparatus is further configured to: in response to the PUSCH mapping type in the parameter is type A, according to a mapping rule of type A, determine the time-domain position of the DMRS in each hop according to the parameter, the number of symbols in the time-domain position range of each hop, and the start symbol of each hop; and in response to the PUSCH mapping type in the parameter is type B, according to a mapping rule of type B, determine the time-domain position of the DMRS in each hop according to the parameter, the number of symbols in the time-domain position range of each hop, and the start symbol of each hop.

Optionally, in other embodiments of the disclosure, the apparatus is further configured to: configure and/or indicate the parameter to the UE.

Optionally, in other embodiments of the disclosure, the apparatus is further configured to: send an SFI dynamic indication signaling and/or a semi-static slot format configuration signaling to the UE.

A computer storage medium provided in embodiments of the disclosure stores an executable program. When the executable program is executed by the processor, it may realize any of the methods in FIG. 1 to FIG. 9 and FIG. 23 to FIG. 26 or FIG. 10 to FIG. 22 and FIG. 27 to FIG. 30.

In order to realize the above-mentioned embodiments, the disclosure also provides a computer program product. The computer program product includes a computer program. When the program is executed by a processor, it may realize any of the methods in FIG. 1 to FIG. 9 and FIG. 23 to FIG. 26 or FIG. 10 to FIG. 22 and FIG. 27 to FIG. 30.

In addition, in order to realize the above-mentioned embodiments, the disclosure also provides a computer program. When the program is executed by a processor, it may realize any of the methods in FIG. 1 to FIG. 9 and FIG. 23 to FIG. 26 or FIG. 10 to FIG. 22 and FIG. 27 to FIG. 30.

Figure 33:
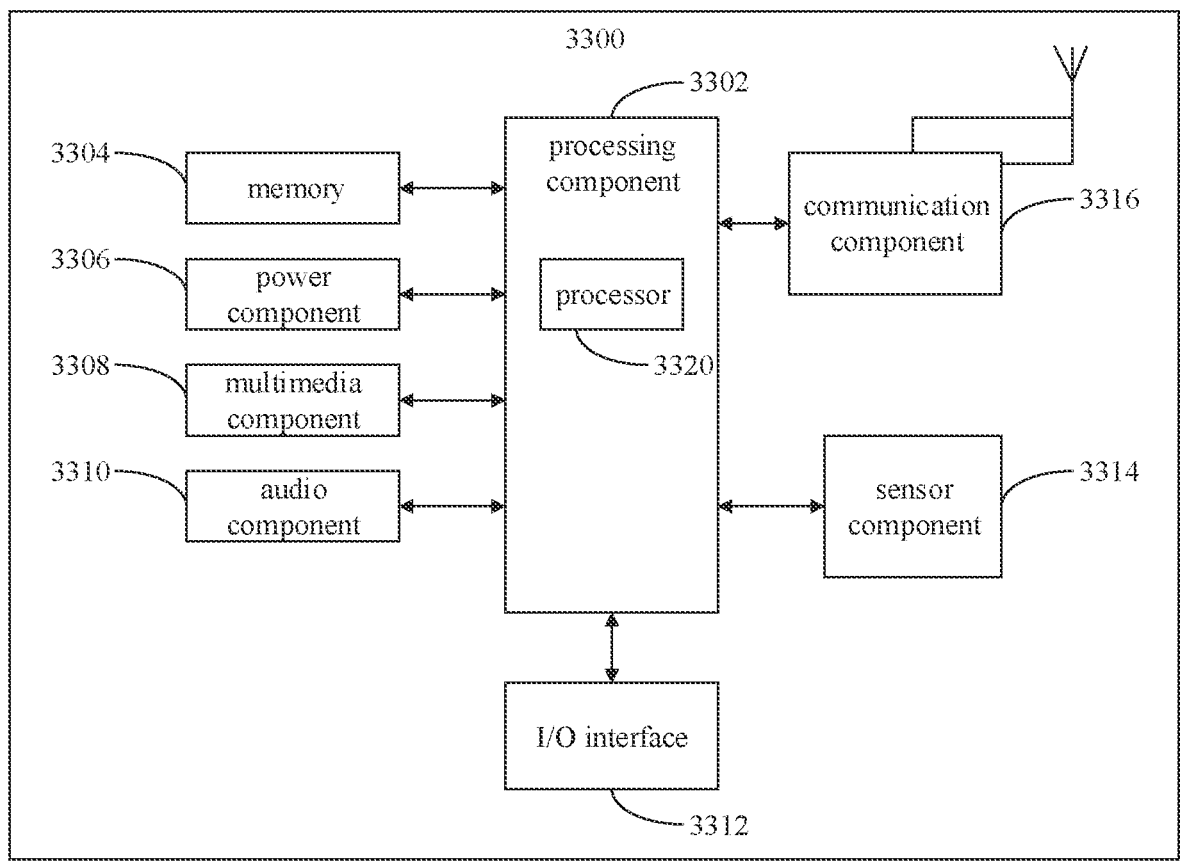
FIG. 33 is a block diagram of a UE according to some embodiments of the disclosure.

FIG. 33 is a block diagram of a user equipment UE 3300 according to some embodiments of the disclosure. For example, the UE 3300 may be a mobile phone, a computer, a digital broadcast terminal, a messaging device, a gaming console, a tablet, a medical device, exercise equipment, a personal digital assistant, and the like.

Referring to FIG. 33, the UE 3300 may include one or more of the following components: a processing component 3302, a memory 3304, a power component 3306, a multimedia component 3308, an audio component 3310, an input/output (I/O) interface 3312, a sensor component 3313, and a communication component 3316.

The processing component 3302 typically controls overall operations of the UE 3300, such as the operations associated with display, telephone calls, data communications, camera operations, and recording operations. The processing component 3302 may include one or more processors 3320 to execute instructions to perform all or part of the steps in the above described methods. Moreover, the processing component 3302 may include one or more modules which facilitate the interaction between the processing component 3302 and other components. For instance, the processing component 3302 may include a multimedia module to facilitate the interaction between the multimedia component 3308 and the processing component 3302.

The memory 3304 is configured to store various types of data to support the operation of the UE 3300. Examples of such data include instructions for any applications or methods operated on the UE 3300, contact data, phonebook data, messages, pictures, video, etc. The memory 3304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3306 provides power to various components of the UE 3300. The power component 3306 may include a power management system, one or more power sources, and any other components associated with the generation, management, and distribution of power in the UE 3300.

The multimedia component 3308 includes a screen providing an output interface between the UE 3300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3308 includes a front camera and/or a rear camera. The front camera and the rear camera may receive an external multimedia datum while the UE 3300 is in an operation mode, such as a photographing mode or a video mode. Each of the front camera and the rear camera may be a fixed optical lens system or have focus and optical zoom capability.

The audio component 3310 is configured to output and/or input audio signals. For example, the audio component 3310 includes a microphone ("MIC") configured to receive an external audio signal when the UE 3300 is in an operation mode, such as a call mode, a recording mode, and a voice recognition mode. The received audio signal may be further stored in the memory 3304 or transmitted via the communication component 3316. In some embodiments, the audio component 3310 further includes a speaker to output audio signals.

The I/O interface 3312 provides an interface between the processing component 3302 and peripheral interface modules, such as a keyboard, a click wheel, buttons, and the like. The buttons may include, but are not limited to, a home button, a volume button, a starting button, and a locking button.

The sensor component 3313 includes one or more sensors to provide status assessments of various aspects of the UE 3300. For instance, the sensor component 3313 may detect an open/closed status of the UE 3300, relative positioning of components, e.g., the display and the keypad, of the UE 3300, a change in position of the UE 3300 or a component of the UE 3300, a presence or absence of user contact with the UE 3300, an orientation or an acceleration/deceleration of the UE 3300, and a change in temperature of the UE 3300. The sensor component 3313 may include a proximity sensor configured to detect the presence of nearby objects without any physical contact. The sensor component 3313 may also include a light sensor, such as a CMOS or CCD image sensor, for use in imaging applications. In some embodiments, the sensor component 3313 may also include an accelerometer sensor, a gyroscope sensor, a magnetic sensor, a pressure sensor, or a temperature sensor.

The communication component 3316 is configured to facilitate communication, wired or wirelessly, between the UE 3300 and other devices. The UE 3300 can access a wireless network based on a communication standard, such as Wi-Fi, 2G, or 3G, or a combination thereof. In some embodiments, the communication component 3316 receives a broadcast signal or broadcast associated information from an external broadcast management system via a broadcast channel. In some embodiments, the communication component 3316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the UE 3300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

Figure 34:
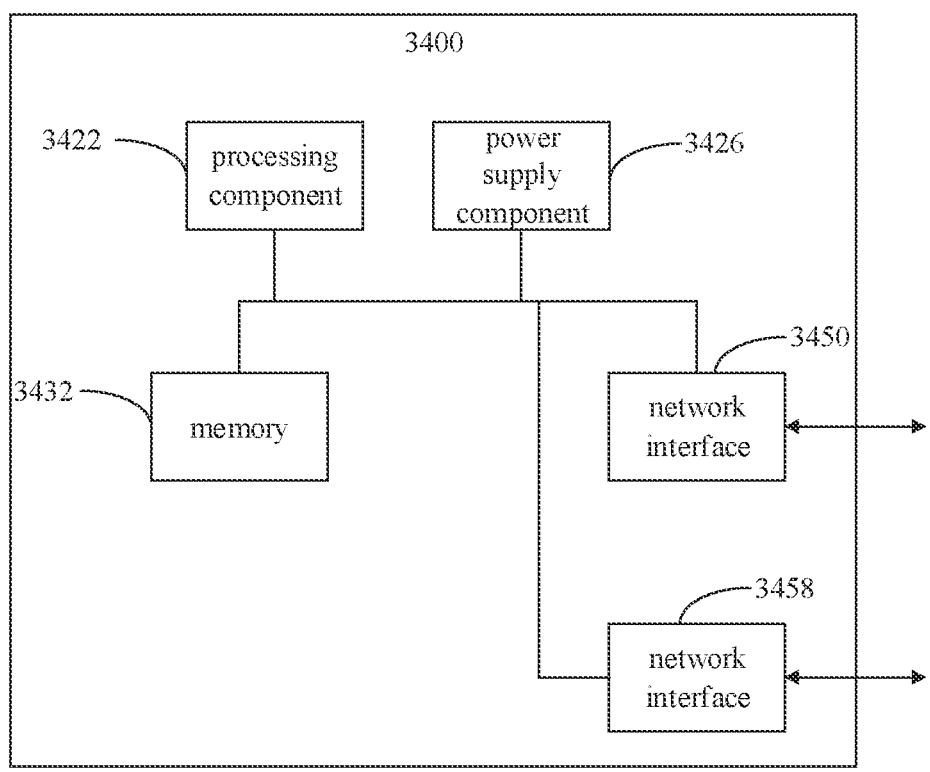
FIG. 34 is a block diagram of a base station according to some embodiments of the disclosure.

FIG. 34 is a block diagram of a base station 3400 according to some embodiments of the disclosure. For example, the base station 3400 may be provided as a base station. Referring to FIG. 34, the base station 3400 includes a processing component 3411, which further includes at least one processor, and a memory resource represented by a memory 3432 for storing instructions executable by the processing component 3422, such as application programs. The application programs stored in the memory 3432 may include one or more modules each corresponding to a set of instructions. In addition, the processing component 3415 is configured to execute instructions, so as to execute any of the aforementioned methods applied to the base station, for example, the method in FIG. 1.

The base station 3400 may also include a power supply component 3434 configured to perform power management of the base station 3400, a wired or wireless network interface 3450 configured to connect the base station 3400 to a network, and an I/O interface 3458. The base station 3400 may operate according to an operating system stored in the memory 3432, such as Windows Server™, Mac OS X™, Unix™, Linux™, Free BSD™ or the like.

In the above embodiments provided in the disclosure, the methods provided in the embodiments of the disclosure are introduced from the perspectives of the base station and the UE respectively. In order to realize the various functions in the methods provided in the foregoing embodiments of the disclosure, the base station and the UE may include hardware structures and software modules, and implement the above functions in the form of hardware structures, software modules, or hardware structures plus software modules. A certain function among the above-mentioned functions may be implemented in the form of a hardware structure, a software module, or a hardware structure plus a software module.

A communication device is provided in some embodiments of the disclosure. The communication device may include a transceiver module and a processing module. The transceiver module may include a transmitting module and/or a receiving module. The transmitting module is used to realize the transmitting function. The receiving module is used to realize the receiving function. The transceiver may realize the transmitting function and/or the receiving function.

The communication device may be a terminal device (such as the terminal device in the foregoing method embodiments), or a device in the terminal device, or a device that may be matched and used with the terminal device. Alternatively, the communication device may be a network device, or a device in the network device, or a device that may be matched and used with the network device.

Another communication device is provided in some embodiments of the disclosure. The communication device may be a network device, or a terminal device (such as the terminal device in the aforementioned method embodiment), or a chip, a chip system, or a processor that supports the network device to implement the above method, or it may be a terminal device that supports a chip, a chip system, or a processor for realizing the above method. The device can be used to implement the methods described in the above method embodiments, and for details, reference should be made to the descriptions in the above method embodiments.

The communication device may include one or more processors. The processor may be a general-purpose processor, a special-purpose processor, or the like. For example, it may be a baseband processor or a central processing unit. The baseband processor may be used to process communication protocols and communication data. The central processing unit may be used to control the communication device (such as a base station, a baseband chip, a terminal device, a terminal device chip, a DU, a CU, or the like), execute a computer program, process data of the computer program, and the like.

Optionally, the communication device may further include one or more memories on which a computer program may be stored. The processor executes the computer program, so that the communication device executes the methods described in the above method embodiments. Optionally, data may also be stored in the memory. The communication device and the memory may be provided separately or integrated together.

Optionally, the communication device may further include a transceiver and an antenna. The transceiver may be referred to as a transceiver unit, a transceiver, a transceiver circuit, or the like, which is used to implement a transceiver function. The transceiver may include a receiver and a transmitter. The receiver may be called a receiver or a receiving circuit or the like, for implementing a receiving function. The transmitter may be called a transmitter or a transmitting circuit or the like for implementing a transmitting function.

Optionally, the communication device may further include one or more interface circuits. The interface circuit is used to receive code instructions and transmit them to the processor. The processor executes the code instructions to cause the communication device to perform the methods described in the above method embodiments.

The communication device is the terminal device: the processor is used to execute the methods in FIG. 1 to FIG. 4.

The communication device is the network device: the processor 1001 is used to execute the methods in FIG. 5 to FIG. 8.

In an implementation, the processor may include a transceiver for implementing receiving and transmitting functions. For example, the transceiver may be a transceiver circuit, or an interface, or an interface circuit. The transceiver circuit, or the interface, or the interface circuit for implementing receiving and transmitting functions may be separate or integrated. The above-mentioned transceiver circuit, interface, or interface circuit may be used for reading and writing code/data, or the above-mentioned transceiver circuit, interface, or interface circuit may be used for signal transmission.

In an implementation manner, the processor may store a computer program, and the computer program runs on the processor to enable the communication device to execute the methods described in the above method embodiments. The computer program may be embodied in the processor, in which the processor may be implemented by hardware.

In an implementation manner, the communication device may include a circuit. The circuit may implement the functions of sending or receiving or communicating in the foregoing method embodiments. The processor and the transceiver described in the disclosure may be implemented in an integrated circuits (IC), an analog IC, a radio frequency integrated circuit (RFIC), a mixed-signal IC, an application specific integrated circuit (ASIC), a printed circuit board (PCB), electronic equipment, or the like. The processor and the transceiver may also be fabricated using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

The communication device described in the above embodiments may be a network device or a terminal device but the scope of the communication device described in the disclosure is not limited thereto and the structure of the communication device may not be limited by FIG. 10. The communication device may be a stand-alone device or part of a larger device. For example, the communication means may be:

(1) a stand-alone IC, or a chip, or a chip system, or a chip subsystem;
(2) a set of one or more ICs, optionally, the set may also include a storage component for storing data and computer programs;
(3) an ASIC, such as a modem;
(4) a module that may be embedded in other devices;
(5) a receiver, a terminal device, an intelligent terminal device, a cellular phone, a wireless device, a handset, a mobile unit, an in-vehicle device, a network device, a cloud device, an artificial intelligence device, etc.;
(6) others.

For the case that the communication device may be the chip or the chip system, the chip includes a processor and an interface. The number of processors may be one or more, and the number of interfaces may be more than one.

Optionally, the chip also includes a memory, which is used to store necessary computer programs and data.

Those skilled in the art may also understand that various illustrative logical blocks and steps listed in the embodiments of the disclosure may be implemented in electronic hardware, computer software, or a combination thereof. Whether such function is implemented in hardware or software depends on specific applications and overall system design requirements. Those skilled in the art may use various manners to implement functions for each specific application, but such implementation should not be understood as exceeding the protection scope of the embodiments of the disclosure.

Some embodiments of the disclosure also provide a system for determining a duration of a side link. The system includes the communication apparatus as a terminal device (such as the first terminal device in the foregoing first embodiment) in the foregoing embodiments and a communication apparatus as a network device. Or the system includes the communication device as a terminal device (such as the first terminal device in the foregoing method embodiments) in the foregoing embodiments and a communication device as a network device.

The disclosure also provides a computer-readable storage medium on which instructions are stored, and when the instructions are executed by a computer, functions of any of the above method embodiments are realized.

The disclosure also provides a computer program product, which realizes functions of any of the above method embodiments when the computer program product is executed by a computer.

In the above-mentioned embodiments, it may be implemented in whole or in part by software, hardware, firmware, or any combination thereof. When it is implemented in software, it may be implemented in whole or in part in a form of computer program product. The computer program product includes one or more computer programs. When the computer programs are loaded and executed on the computer, flows or functions according to the embodiments of the disclosure may be generated in whole or in part. The computer may be a general purpose computer, a special purpose computer, a computer network, or other programmable device. The computer programs may be stored on a computer-readable storage medium or transferred from one computer-readable storage medium to another computer-readable storage medium, for example, the computer programs may be transferred from a website site, a computer, a server, or a data center over a wire (e.g. coaxial cable, optical fiber, digital subscriber line (DSL)) or wireless (e.g. infrared, wireless, microwave) means to another website site, another computer, another server, or another data center. The computer-readable storage medium may be any available medium that may be accessed by a computer or a data storage device such as a server, a data center, or the like that includes an integration of one or more available media. The available medium may be a magnetic medium (e.g., floppy disk, hard disk, magnetic tape), an optical medium (e.g., high-density digital video disc (DVD)), a semiconductor medium (e.g., solid state disk (SSD)), or the like.

Those skilled in the art may understand that the first, second, and other numeral numbers involved in the disclosure are only for the convenience of description, and are not used to limit the scope of the embodiments of the disclosure, which also represent a sequence.

At least one in this disclosure may also be described as one or more, which is not limited in this disclosure. A plurality of or multiple in this disclosure may be two, three, four, or more, which is not limited in this disclosure. In the embodiments of the disclosure, for a type of technical features, the technical features are distinguished by "first", "second", "third", "A", "B", "C" and "D", etc. There is no order or order of magnitude for the technical features described in "first", "second", "third", "A", "B", "C" and "D", etc.

Those skilled in the art may clearly understand that, for the convenience and brevity of description, the specific working processes of the above-described systems, devices, and units may refer to the corresponding processes in the foregoing method embodiments, which will not be repeated herein.

The above are only specific implementations of the disclosure, but the scope of the disclosure is not limited to this. Those skilled in the art who is familiar with the technical scope disclosed in the disclosure may easily think of changes or replacements, which should cover within the scope of this disclosure. Therefore, the scope of the disclosure shall be subject to the scope of the claims.

What is claimed is:

1. A frequency hopping method, performed by a user equipment (UE), comprising:
    obtaining an instruction configured by a base station for instructing to perform intra-slot frequency hopping;
    obtaining symbol resources allocated by the base station for data transmission in a special slot;
    performing intra-slot frequency hopping on an uplink slot and determining available symbols in the special slot; and
    performing intra-slot frequency hopping on the available symbols in the symbol resources, or not performing intra-slot frequency hopping on the special slot.

2. The method according to claim 1, wherein determining the available symbols in the special slot comprises:
    determining one or more unavailable symbols in the special slot according to a slot format indication (SFI) dynamic indication signaling and/or a semi-static slot format configuration signaling; and
    determining that the available symbols are symbols in the special slot other than the one or more unavailable symbols;
    wherein the one or more unavailable symbols comprise at least one of:
    a guard symbol for downlink to uplink switching;
    a downlink symbol for downlink transmission;
    a symbol for synchronization signal block (SSB) transmission;
    a symbol allocated for a common search space (CSS);
    a symbol occupied by a cancel indication (CI); or
    a symbol for service transmission with a higher priority than current data transmission.

3. The method according to claim 2, wherein not performing intra-slot frequency hopping on the special slot comprises:
    determining a number of the available symbols in the symbol resources is less than or equal to a first threshold, and determining not performing intra-slot frequency hopping on the special slot, the first threshold for indicating a minimum number of symbols in one hop when intra-slot frequency hopping is performed on the special slot and the first threshold being indicated by the base station or determined by a protocol.

4. The method according to claim 2, wherein not performing intra-slot frequency hopping on the special slot comprises:
    determining a time-domain position range of each hop in the special slot using a position of a first symbol in the symbol resources as a start position;
    determining a number of available symbols in the determined time-domain position range of a first hop is less than a second threshold, and determining not performing intra-slot frequency hopping on the special slot; and
    determining the number of available symbols in the determined time-domain position range of the first hop is not less than the second threshold, and performing intra-slot frequency hopping according to the time-domain position range of each hop in the special slot determined using the position of the first symbol in the symbol resources as the start position;
    wherein the second threshold is indicated by the base station or determined by a protocol.

5. The method according to claim 2, wherein not performing intra-slot frequency hopping on the special slot comprises:
    determining a time-domain position range of each hop in the special slot using a position of a first symbol in the symbol resources as a start position;
    determining a difference between a number of available symbols in the determined time-domain position range of a first hop and a number of available symbols in the determined time-domain position range of a second hop is greater than a third threshold, and determining not performing intra-slot frequency hopping on the special slot; and
    determining the difference between the number of available symbols in the determined time-domain position range of the first hop and the number of available symbols in the determined time-domain position range of the second hop is not greater than the third threshold, and performing intra-slot frequency hopping according to the time-domain position range of each hop in the special slot determined using the position of the first symbol in the symbol resources as the start position;
    wherein the third threshold is indicated by the base station or determined by a protocol.

6. The method according to claim 2, wherein not performing intra-slot frequency hopping on the special slot comprises:
    obtaining the instruction for instructing to perform intra-slot frequency hopping; and
    determining not performing intra-slot frequency hopping on the special slot.

7. The method according to claim 2, further comprising:
    determining at least one first demodulation reference signal (DMRS) symbol offset value according to a parameter configured and/or indicated by the base station; and
    determining a time-domain position of a DMRS in the special slot according to a first available symbol in the symbol resources allocated by the base station and the at least one first DMRS symbol offset value.

8. The method according to claim 7, wherein determining the time-domain position of the DMRS in the special slot according to the first available symbol in the symbol resources allocated by the base station and the at least one first DMRS symbol offset value comprises:
 determining a sum of a symbol number of the first available symbol and each first DMRS symbol offset value to obtain at least one first sum value; and
 determining that the time-domain position of the DMRS is a symbol with a symbol number corresponding to the first sum value.

9. The method according to claim 2, wherein performing intra-slot frequency hopping on the available symbols in the symbol resources comprises:
 determining a number of the available symbols in the symbol resources is greater than a first threshold, and performing intra-slot frequency hopping on the available symbols in the symbol resources, the first threshold for indicating a minimum number of symbols in one hop when intra-slot frequency hopping is performed on the special slot and the first threshold being indicated by the base station or determined by a protocol.

10. The method according to claim 9, wherein performing intra-slot frequency hopping on the available symbols in the symbol resources comprises:
 determining a time-domain start position of a first hop in the special slot is: a position of a first available symbol in the symbol resources;
 determining a time-domain end position of the first hop is: the position of the first available symbol in the symbol resources+floor (a number of the available symbols in the symbol resources+2)−1; wherein a floor function is a downward rounding function;
 determining a time-domain start position of a second hop in the special slot is: the position of the first available symbol in the symbol resources+floor (the number of the available symbols in the symbol resources+2); and
 determining a time-domain end position of the second hop is: the position of the first available symbol in the symbol resources+floor (the number of the available symbols in the symbol resources+2)+the number of the available symbols in the symbol resources−floor (the number of the available symbols in the symbol resources+2)−1.

11. The method according to claim 10, further comprising:
 determining a time-domain position of a DMRS in each hop according to a parameter configured and/or indicated by the base station, a number of symbols in a time-domain position range of each hop, and a start symbol of each hop.

12. The method according to claim 11, wherein determining the time-domain position of the DMRS in each hop comprises:
 determining at least one second DMRS symbol offset value according to the parameter configured and/or indicated by the base station and a number of symbols in a time-domain position range of a second hop;
 determining a sum of a symbol number of a start symbol of the second hop and each second DMRS symbol offset value to obtain at least one second sum value,
 determining that the time-domain position of the DMRS in the second hop is a symbol with a symbol number corresponding to the second sum value;
 determining a sum of a symbol number of a start symbol of a first hop and each second DMRS symbol offset value to obtain at least one third sum value; and
 determining that the time-domain position of the DMRS in the first hop is a symbol with a symbol number corresponding to the third sum value, or wherein determining the time-domain position of the DMRS in each hop comprises:
 determining at least one second DMRS symbol offset value according to the parameter configured and/or indicated by the base station and a number of symbols in a time-domain position range of a second hop;
 determining a sum of a symbol number of a start symbol of the second hop and each second DMRS symbol offset value to obtain at least one second sum value,
 determining that the time-domain position of the DMRS in the second hop is a symbol with a symbol number corresponding to the second sum value;
 determining at least one third DMRS symbol offset value according to the parameter configured and/or indicated by the base station and a number of symbols in a time-domain position range of a first hop;
 determining a sum of a symbol number of a start symbol of the first hop and each third DMRS symbol offset value to obtain at least one third sum value; and
 determining that the time-domain position of the DMRS in the first hop is a symbol with a symbol number corresponding to the third sum value.

13. The method according to claim 2, wherein performing intra-slot frequency hopping on the available symbols in the symbol resources comprises:
 determining a time-domain position range of each hop in the special slot using a position of a first symbol in the symbol resources as a start position;
 determining a number of available symbols in the determined time-domain position range of a first hop is less than a second threshold, and performing intra-slot frequency hopping on the available symbols in the symbol resources; and
 determining the number of available symbols in the determined time-domain position range of the first hop is not less than the second threshold, and performing intra-slot frequency hopping according to the time-domain position range of each hop in the special slot determined using the position of the first symbol in the symbol resources as the start position;
 wherein the second threshold is indicated by the base station or determined by a protocol.

14. The method according to claim 2, wherein performing intra-slot frequency hopping on the available symbols in the symbol resources comprises:
 determining a time-domain position range of each hop in the special slot using a position of a first symbol in the symbol resources as a start position;
 determining a difference between a number of available symbols in the determined time-domain position range of a first hop and a number of available symbols in the determined time-domain position range of a second hop is greater than a third threshold, and performing intra-slot frequency hopping on the available symbols in the symbol resources; and
 determining the difference between the number of available symbols in the determined time-domain position range of the first hop and the number of available symbols in the determined time-domain position range of the second hop is not greater than the third threshold, and performing intra-slot frequency hopping according to the time-domain position range of each hop in the special slot determined using the position of the first symbol in the symbol resources as the start position;

wherein the third threshold is indicated by the base station or determined by a protocol.

15. The method according to claim 2, wherein performing intra-slot frequency hopping on the available symbols in the symbol resources comprises:
after obtaining the instruction for instructing to perform intra-slot frequency hopping, performing intra-slot frequency hopping on the available symbols in the symbol resources.

16. A non-transitory computer-readable storage medium storing instructions that, when executed by a processor of a user equipment, cause the user equipment to perform the method of claim 1.

17. A frequency hopping method, performed by a base station, comprising:
determining to perform intra-slot frequency hopping, and configuring an instruction for instructing to perform intra-slot frequency hopping to a user equipment (UE);
determining a parameter, and determining symbol resources for data transmission in a special slot according to the parameter;
performing intra-slot frequency hopping on an uplink slot, and determining available symbols in the special slot; and
performing intra-slot frequency hopping on the available symbols in the symbol resources, or not performing intra-slot frequency hopping on the special slot.

18. A non-transitory computer-readable storage medium storing instructions that, when executed by a processor of a base station, cause the base station to perform the method of claim 17.

19. A user equipment, comprising:
a processor; and
a memory storing a computer program executable by the processor,
wherein the processor is configured to:
obtain an instruction configured by a base station for instructing to perform intra-slot frequency hopping;
obtain symbol resources allocated by the base station for data transmission in a special slot;
perform intra-slot frequency hopping on an uplink slot and determining available symbols in the special slot; and
perform intra-slot frequency hopping on the available symbols in the symbol resources, or not perform intra-slot frequency hopping on the special slot.

20. A base station, comprising:
a processor; and
a memory storing a computer program executable by the processor,
wherein the processor is configured to perform the method of claim 17.

* * * * *